US007908602B2

(12) United States Patent
Alcorn et al.

(10) Patent No.: US 7,908,602 B2
(45) Date of Patent: Mar. 15, 2011

(54) INTERNET-BASED EDUCATION SUPPORT SYSTEM, METHOD AND MEDIUM PROVIDING SECURITY ATTRIBUTES IN MODULAR, EXTENSIBLE COMPONENTS

(75) Inventors: Robert L. Alcorn, Arlington, VA (US); Scott N. Perian, Boulder, CO (US); John S. Fontaine, Arlington, VA (US); Daniel F. Rinzel, Jr., Arlington, VA (US); Dorothy R. Brown, Arlington, VA (US); Christopher Etesse, Burke, VA (US); David Yaskin, Arlington, VA (US)

(73) Assignee: Blackboard Inc., Washington, DC (US)

( * ) Notice: Subject to any disclaimer, the term of this patent is extended or adjusted under 35 U.S.C. 154(b) by 1538 days.

(21) Appl. No.: 10/643,074

(22) Filed: Aug. 19, 2003

(65) Prior Publication Data

US 2004/0153508 A1    Aug. 5, 2004

Related U.S. Application Data

(63) Continuation-in-part of application No. 09/608,208, filed on Jun. 30, 2000, now Pat. No. 6,988,138.

(60) Provisional application No. 60/449,507, filed on Feb. 25, 2003, provisional application No. 60/406,304, filed on Aug. 28, 2002, provisional application No. 60/404,276, filed on Aug. 19, 2002, provisional application No. 60/141,283, filed on Jun. 30, 1999, provisional application No. 60/141,864, filed on Jul. 1, 1999, provisional application No. 60/187,890, filed on Mar. 8, 2000.

(51) Int. Cl.
*G06F 9/445* (2006.01)

(52) U.S. Cl. .................. 717/174; 709/219; 715/826
(58) Field of Classification Search .................. 709/219; 715/826; 717/174
See application file for complete search history.

(56) References Cited

U.S. PATENT DOCUMENTS

| 4,236,209 A | 11/1980 | Lombardo, Jr. et al. |
| 4,724,521 A | 2/1988 | Carron et al. |
| 4,727,589 A | 2/1988 | Hirose et al. |
| 4,935,870 A | 6/1990 | Burk, Jr. et al. |
| 5,002,491 A | 3/1991 | Abrahamson et al. |
| 5,263,869 A | 11/1993 | Ziv-El |
| 5,434,913 A | 7/1995 | Tung et al. |
| 5,437,555 A | 8/1995 | Ziv-El |
| 5,441,415 A | 8/1995 | Lee et al. |
| 5,490,247 A | 2/1996 | Tung et al. |

(Continued)

FOREIGN PATENT DOCUMENTS

JP    10-154183    6/2006

(Continued)

OTHER PUBLICATIONS

Philip Heller and Simon Roberts, "JAVA 2 Developer's Handbook", SYBEX, Sep. 1998.*

(Continued)

*Primary Examiner* — Wei Y Zhen
*Assistant Examiner* — Phillip H Nguyen
(74) *Attorney, Agent, or Firm* — McDermott Will & Emery LLP

(57) ABSTRACT

A system, method and medium for providing and/or installing extensions to enhance functionality of a computer system. User roles may be provided or associated with extensible components in determining user access to the enhanced functionality.

16 Claims, 57 Drawing Sheets

U.S. PATENT DOCUMENTS

| | | | |
|---|---|---|---|
| 5,515,296 A | 5/1996 | Agarwal | |
| 5,537,141 A | 7/1996 | Harper et al. | |
| 5,664,126 A | 9/1997 | Hirakawa et al. | |
| 5,694,601 A | 12/1997 | White | |
| 5,727,950 A | 3/1998 | Cook et al. | |
| 5,734,828 A | 3/1998 | Pendse et al. | |
| 5,764,900 A | 6/1998 | Morris et al. | |
| 5,764,901 A | 6/1998 | Skarbo et al. | |
| 5,768,510 A | 6/1998 | Gish | |
| 5,778,367 A | 7/1998 | Wesinger, Jr. et al. | |
| 5,778,368 A | 7/1998 | Hogan et al. | |
| 5,787,247 A | 7/1998 | Norin et al. | |
| 5,793,967 A | 8/1998 | Simciak et al. | |
| 5,799,150 A | 8/1998 | Hamilton et al. | |
| 5,810,605 A | 9/1998 | Siefert | |
| 5,812,776 A | 9/1998 | Gifford | |
| 5,815,659 A | 9/1998 | Umetsu et al. | |
| 5,815,664 A | 9/1998 | Asano | |
| 5,835,911 A | 11/1998 | Nakagawa et al. | |
| 5,848,239 A | 12/1998 | Ando | |
| 5,848,246 A | 12/1998 | Gish | |
| 5,859,971 A | 1/1999 | Bittinger et al. | |
| 5,878,233 A | 3/1999 | Schloss | |
| 5,890,162 A | 3/1999 | Huckins | |
| 5,896,533 A | 4/1999 | Ramos et al. | |
| 5,903,727 A | 5/1999 | Nielsen | |
| 5,905,866 A | 5/1999 | Nakabayashi et al. | |
| 5,909,589 A * | 6/1999 | Parker et al. | 712/32 |
| 5,918,010 A | 6/1999 | Appleman et al. | |
| 5,918,012 A | 6/1999 | Astiz et al. | |
| 5,931,908 A | 8/1999 | Gerba et al. | |
| 5,937,163 A | 8/1999 | Lee et al. | |
| 5,946,699 A | 8/1999 | Sawashima et al. | |
| 5,949,492 A | 9/1999 | Mankovitz | |
| 5,956,485 A | 9/1999 | Perlman | |
| 5,964,832 A | 10/1999 | Kisor | |
| 5,973,683 A | 10/1999 | Cragun et al. | |
| 5,983,199 A | 11/1999 | Kaneko | |
| 5,987,510 A | 11/1999 | Imai et al. | |
| 5,999,975 A | 12/1999 | Kittaka et al. | |
| 6,006,018 A | 12/1999 | Burnett et al. | |
| 6,006,251 A | 12/1999 | Toyouchi et al. | |
| 6,006,279 A * | 12/1999 | Hayes | 719/328 |
| 6,012,083 A | 1/2000 | Savitzky et al. | |
| 6,012,098 A | 1/2000 | Bayeh et al. | |
| 6,014,695 A | 1/2000 | Yamashita et al. | |
| 6,016,500 A | 1/2000 | Waldo et al. | |
| 6,023,724 A | 2/2000 | Bhatia | |
| 6,023,765 A | 2/2000 | Kuhn | |
| 6,026,402 A | 2/2000 | Vossen et al. | |
| 6,026,430 A | 2/2000 | Butman et al. | |
| 6,035,330 A | 3/2000 | Astiz et al. | |
| 6,038,590 A | 3/2000 | Gish | |
| 6,047,313 A | 4/2000 | Hashimoto et al. | |
| 6,049,826 A | 4/2000 | Beser | |
| 6,052,730 A | 4/2000 | Felciano et al. | |
| 6,055,512 A | 4/2000 | Dean et al. | |
| 6,058,394 A | 5/2000 | Bakow | |
| 6,058,421 A | 5/2000 | Fijolek et al. | |
| 6,065,038 A | 5/2000 | Chen | |
| 6,070,185 A | 5/2000 | Anupam et al. | |
| 6,088,679 A | 7/2000 | Barkley | |
| 6,144,991 A * | 11/2000 | England | 709/205 |
| 6,201,948 B1 | 3/2001 | Cook et al. | |
| 6,202,066 B1 | 3/2001 | Barkley et al. | |
| 6,289,512 B1 * | 9/2001 | Edwards et al. | 717/178 |
| 6,301,462 B1 | 10/2001 | Freeman et al. | |
| 6,334,141 B1 | 12/2001 | Varma et al. | |
| 6,338,086 B1 | 1/2002 | Curtis et al. | |
| 6,347,333 B2 | 2/2002 | Eisendrath et al. | |
| 6,351,777 B1 | 2/2002 | Simonoff | |
| 6,356,908 B1 * | 3/2002 | Brown et al. | 707/3 |
| 6,357,010 B1 | 3/2002 | Viets et al. | |
| 6,381,579 B1 | 4/2002 | Gervais et al. | |
| 6,405,192 B1 * | 6/2002 | Brown et al. | 707/722 |
| 6,430,549 B1 | 8/2002 | Gershfield et al. | |
| 6,453,353 B1 | 9/2002 | Win et al. | |
| 6,463,460 B1 | 10/2002 | Simonoff | |
| 6,470,171 B1 * | 10/2002 | Helmick et al. | 434/362 |
| 6,484,156 B1 * | 11/2002 | Gupta et al. | 707/1 |
| 6,505,031 B1 | 1/2003 | Slider et al. | |
| 6,546,230 B1 | 4/2003 | Allison | |
| 6,557,100 B1 * | 4/2003 | Knutson | 713/100 |
| 6,988,138 B1 | 1/2006 | Alcorn et al. | |
| 7,107,548 B2 * | 9/2006 | Shafron | 715/826 |
| 2002/0184401 A1 * | 12/2002 | Kadel et al. | 709/315 |
| 2002/0184610 A1 * | 12/2002 | Chong et al. | 717/109 |

FOREIGN PATENT DOCUMENTS

| | | |
|---|---|---|
| KR | 1998-0010852 | 4/1998 |
| WO | WO 97/44766 | 11/1997 |

OTHER PUBLICATIONS

Venkat Govi, Hernan Eguiluz, You Jung Kim, and Adrain Sia, "System test plan", Jun. 8, 2002, retrieved from http://dogbert.mse.cs.cmu.edu/mse2002/projects/pamd1/Working%20Document/PUMASystemTestPlan_v.1.0.doc on Sep. 4, 2007.*

Gill, Dee. Dec. 22, 1997. "Online Learning in the Off Hours." *Business Week*. New York: The McGraw Hill Companies, Inc.

Jastrow, David. Dec. 1, 1997. "CBT Systems Roll Out New Training Pack for Microsoft." *Computer Rreseller News*.

Menefee, Sarni. Dec. 24, 1997. "Using the Internet to Advance Education." *Newsbytes News Network*.

S.D. Benford, E..K. Burke, E. Foxley, N. Gutteridge, A. Mohd Zin, The Design Document for Ceilidh Ver. 2, Learning Technology Research Computer Science Department, Univ. of Nottingham, UK, Revision 3.2, 30 pages, 1996.

S.D. Benford, E.K.Burke, E. Foxley, Developer's Guide to Ceilidh, Learning Technology Research Computer Science Department, Univ. of Nottingham, UK, Revision for Ceildh 3.4, 43 pages, 1996.

S.D. Benford, A.N. Bullock. E.K. Burke, E. Foxley. C.A. Gibbon, N. Gutteridge, C. Higgins. A. Mohd Zin, Installer's Guide to Ceilidh (2.6) Learning Technology Research, Computer Science Department, Univ. of Nottingham, UK, Revision for Ceilidh 2.6, 18 pages, 1997.

S. Benford, E. Burke, E. Foxley, N. Gutteridge, A.M. Zin, the Ceilidh System, Learning Technology Research, Computer Science Department, Nottingham Univ., UK, Revision 3.2, 7 pages, 1996.

S.D. Benford, E.K. Burke, E. Foxley, Student's Guide to Ceilidh, Ver. 2.5, Learning Technology Research, Computer Science Department, Univ. of Nottingham, UK, Revision 3.2, 17 pages, 1997.

S.D. Benford, E.K. Burke, E. Foxley, Teacher's Guide to Ceilidh, Ver. 2.7, Learning Technology Research, Computer Science Department, Univ. of Nottingham, UK, Revision 2.7, 16 pages, 1997.

E. Foxley, User Guide to Interactive WWW Ceilidh, provisional version 23, Sep. 1996, www.cs.nott.ac.uk, 4 pages.

1997 The Daedalus Group, Inc., Austin, Texas, Integrated Writing Environment for Windows Computers, Version 5.3x, Instructor's Guide, 86 pages.

1997 The Daedalus Group, Inc., Austin, Texas, Integrated Writing Environment for Windows Computers, Version 5.3x, User's Guide, 81 pages.

1997 The Daedalus Group, Inc., Austin, Texas, Integrated Writing Environment for Windows Computers, Version 5.3x, Administrator's Guide with Installation Guide, 73 pages.

1997 by SoftArc Inc., Using the FirstClass Intranet Client, 303 pages.

1997 by SoftArc Inc., User Reference Card, 6 pages.

S. Hazari, Ed.D, Robert H. Smith School of Business, Univ. of Md, College Park, Evaluation and Selection of Web Course Management Tools, 15 pages, 1998.

Recommendations for a Course Management/Colloboration Tool, Apr. 30. 1998, http://www.pitt.edu/~washbum/ccs.htm, 34 pages.

Renaissance—Project AC100, Integration of High Performance Services for Interactive, Vocational Training for European Regeneration, Work Package 2, Version 2.1, Feb. 1997, 62 pages.

Renaissance—Project AC100, Integration of High Performance Services for Interactive, Vocational Training for European Regeneration, Work Package 2, Infrastructure Requirements Statement, Version 2.1, Feb. 1997, 62 pages.

T. Barker, Community Based Virtual Learning: A WebCT Physics course, Computer Based Learning Unit Universy of Leeds, UK, 10 pages, 1990.

Richard Mende, Learner Reactions to College English on WebCT, Dec. 20, 1959, 36 pages.

D.A. Morss, Ph.D. Atmospheric Sciences Depart. Creighton Univ., P.A. Fleming Ph.D.,, Philosophy Department, Creighton Univ., WebCT in the Classroom: A Student View, 13 pages, 2006.

B. Mann, Ph.D., Assoc. Prof. of Edu. Computing, Memorial Univ. of Newfoundland, Oct. 24, 1998, Should we or Shouldn't We: WEBCT Arrives at Edith Cowan Unlv., 5 pages.

S. Siekmann, Idaho State Univ., To Integrate Your Language Web Tools—CALL WebCT, 10 pages, 1998.

A. Levine, MCLI, Fall 1997, vol. 6, Issue 1, The Labyrinth, Sharing Information on Learning Technologies, 5 pages.

M.J. Van Gorp, P. Boysen, Durham Computation Center, Iowa State Univ., Intl. Jl. of Edu. Telecommunications (1997) 3(2/3), 279-291, ClassNet: Managing the Virtual Classroom, 13 pages.

P.R. McKey, The Development of the On-line Educational Institute, Southern Cross Univ., Chapters 1-6, 1997.

Educom/NLII Instructional Management Systems, Specifications Document, Version 0.5, Apr. 29, 1998, 212 pages.

Janison Solutions, Web Training Toolbox, Getting Started, Australia, Jun. 1999, 102 pages.

Janison Solutions, Web Training Toolbox, Management Guide, Australia, May 1999, 39 pages.

Janison Solutions, Web Training Toolbox, Reviewer's Guide, Australia, Sep. 1999, 102 pages.

G. Paquette, LICEF Laboratory, Canada, Modeling the Virtual Campus, 21 pages, 1995.

An Intro. To Role-Based Access Control, 5 pages, 2006.

J.F. Barkley, A.V. Cincotta. D.F. Ferraiolo, S. Gavrilla, D.R. Kuhn, Natl Institute of Standards and Technology, Maryland, Apr. 8, 1997, 11 pages.

D.F. Ferraiolo, J.A. Cugini, D.R. Kuhn, Natl Institute of Standards and Tech., Dept of Commerce, Maryland, Role-Based Access Control (RBAC): Features and Motivations, 8 pages, 1992.

D.F. Ferraiolo, D.R. Kuhn, Natl Institute of Standards and Tech., Dept. of Commerce, Maryland, Role-Based Access Control, Proceedings of 15th Natl Computer Security Conference 1992, 11 pages.

S.I. Gavrila, VDG Inc.,, Formal Spec. for Role Based Access Control User/Role and Role/Role Relationship Management, 1998.

D.R. Kuhn, Natl Institute of Standards and Technology, Maryland, Mutual Exclusion of Roles as a Means of Implementing Separation of Duty in Role-Based Access Control Systems, 1997.

R.S. Sandhu, E.J. Coyne, H.L. Feinstein, C.E. Youman, Role-Based Access Control Models, IEEE Computer, vol. 29, No. 2, Feb. 1996, pp. 38-47.

F.T. Hofsteller, Univ. of Delaware, AACRAO Policy Summit, Virtual Learning Environments, 1999.

F.T. Hofsteller, Univ of Delaware, May 19, 1999, Three Waves of the Serf Web-based Teaching and Learning Environ.

F.T. Hofsteller, Univ of Delaware, Jan. 22, 1998, Serf® User Guide, Version 1.0.

TopClass Version 2.0.0, Administrator's Guide, 1998.

TopClass Version 2.0.0, Instructor's Guide, 1998.

vloverview.txt, Product Overview, 2 pages, 2009.

Creating and Customizing a Course, Student's View (6 pages, 13 slides), 1997.

The Instructor's Guide to The Interactive Learning Network Ver 1.5, 1997.

Couselnfo's Interactive Learning Network v1.5, User Manual, 1997.

Courselnfo v.2.0 beta, Bb Instructor Manual, Instructure Guide, 121 pages, 1998.

TopClass, Version 1.2.2b, Administrator's Guide, 1997.

1: TopClass—An Overview, 1997 WBT Systems.

Chapter 3: Getting Started, TopClass Administrator's Guide, 1997.

Chapter 7: Database Maintenance, TopClass Administrator's Guide, 1997.

7: Database Maintenance, 1997 WBT Systems, pp. 105-134.

Portal, The Guide to Computing Literature, Information Sharing (solution session): collaborating across the network, 1993.

Enhancing teaching using the Internet, Report of the Working Group on the World Wide Web as an Interactive Teaching Resource, 1996.

JP—Inter-terminal Operation and Contents Display Synchronization in a Web-based Distance Teaching System, Jul. 1996, Dong Yu, et al., 22-24, and 26, 27.

JP—Construction and Evaluation of Distributed-Collaborative Learning System, Sep. 1998, Tadayoshi Hisakuni, et al., 36 and 39.

JP—Fundamental Functions for Network Education System Using Push Technology, May 1998, Nobuyuki Oike, et al., 3-8.

* cited by examiner

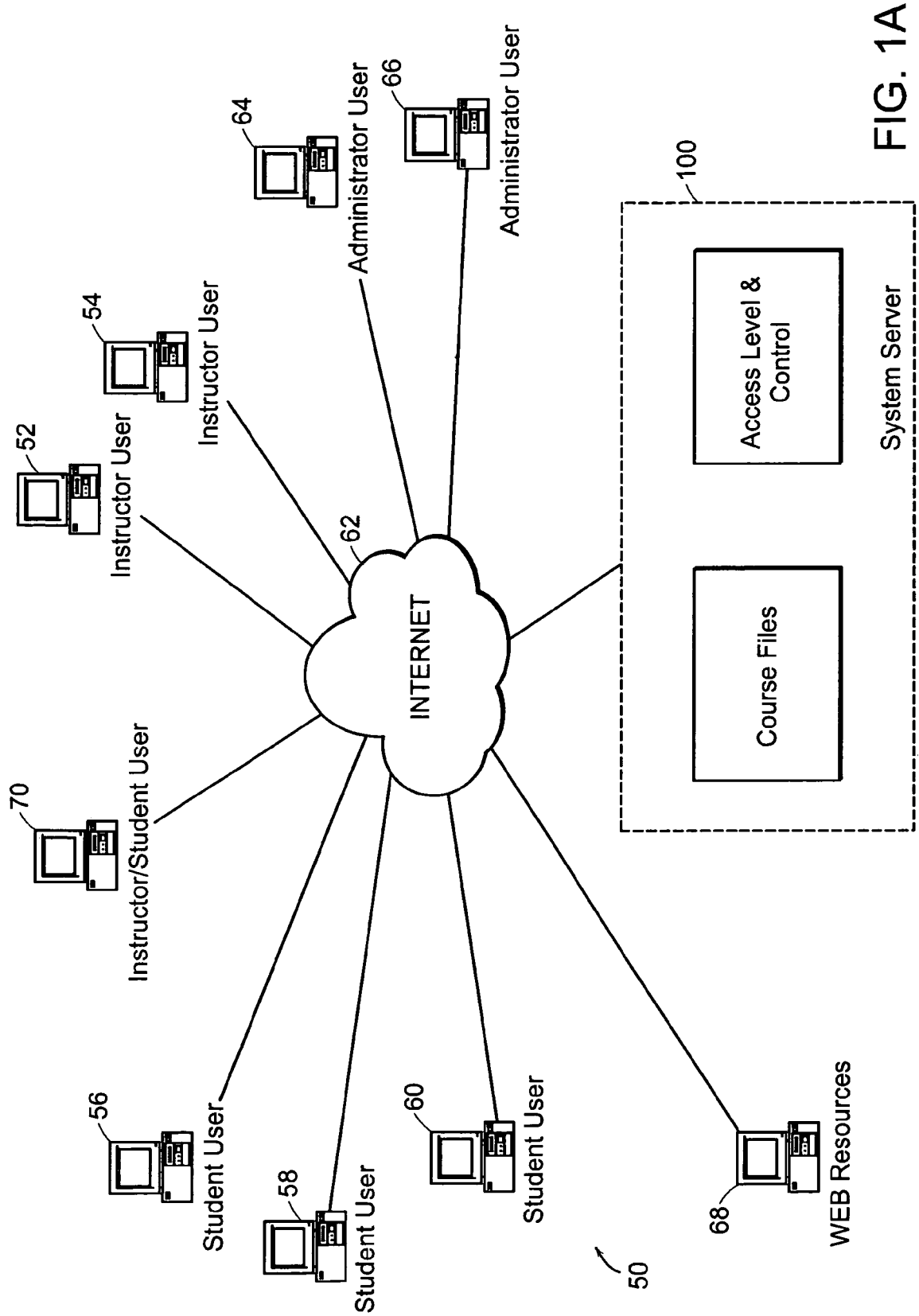

Machine Scalability Using Load Balancing

*Engine/Registry Model*

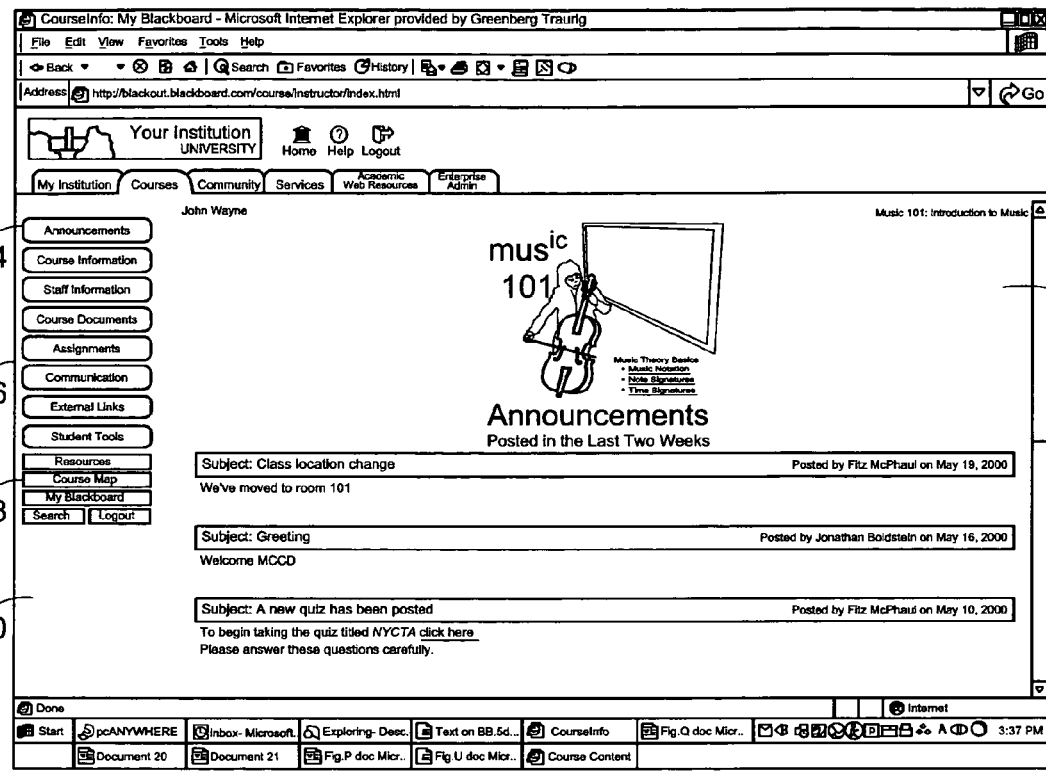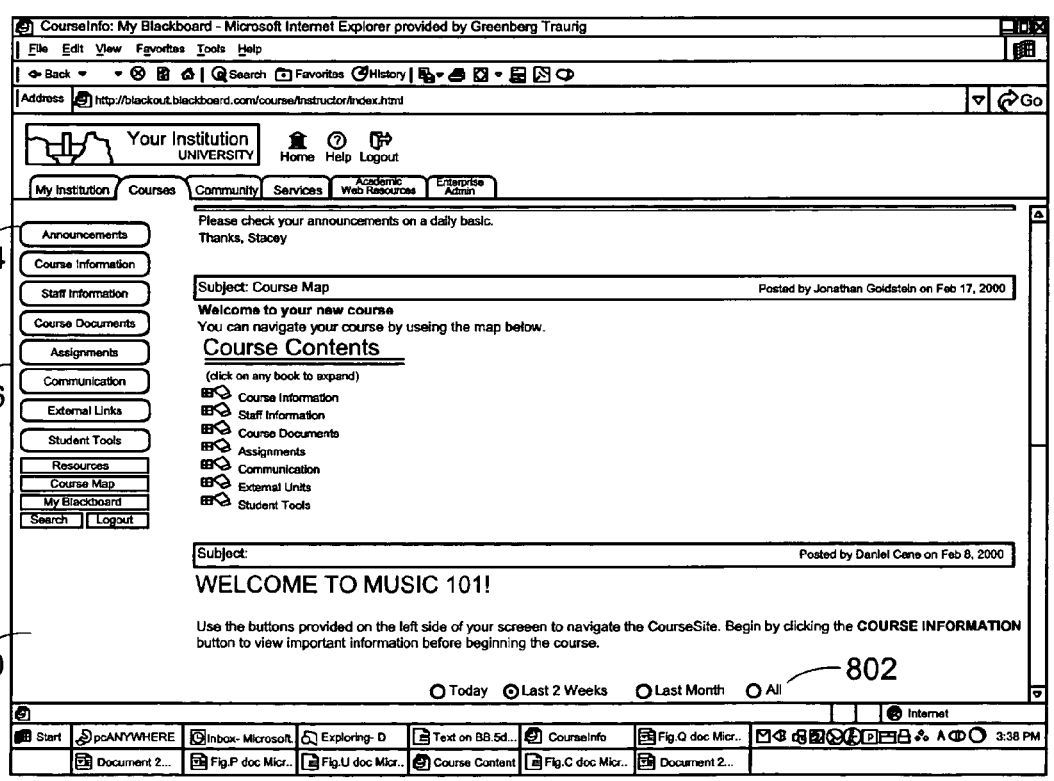
FIG. 8

FIG. 13

John Wayne
Student Tools

Student Drop Box

Music 101: Introduction to Music

Use your student drop box to submit files to your instructor. Also, your instructor can return your files to you with comments attached.

 Current Files in your DropBox ————1508

Note: If you want to save a file, right click on the Link Name and choose *Save Link As*

| File Name | Link Name | File Size | Status |
|---|---|---|---|
| none | none | none | none |

[Remove Files]————1510

 Add File to DropBox

Click the *Browse* button to select the file to attach from your computer.
Be sure to specify a linkname for your file.

File to Upload:   1502    1504

Name of Link to File:   1506
(Example: *Homework One, Assignment One*)

◁Back

| Blackboard Learning System TM (Release 6)- Microsoft Internet Explorer | | | | |
|---|---|---|---|---|

File Edit View Favorites Tools Help

◄Back▼ ▸ ▼⊗ 🗐 🏠 | 🔍Search 📂Favorites 🕲Media 🧭 | 🗟▼ 🖨 🖃 📃 🛢 🕺 🕅
Address 🗋 et.jsp?tab=courses8>url=/bin/common/course.pl?course_id=_2_1 | ▼ 🧭Go | Links 🗋Blackboard ASP Web Tools 🗋Crystal Report Viewer »
Google▼ | | ▼ | 🔍Search Web 🕲Search Site 🔍Search Groups | 🗐News | Page Bank ⓘPage Info▼ 🗋Up ▼ 🔍Highlight »

Your Institution UNIVERSITY
🏠 ⓘ 🚪
Home Help Logout

My Institution | Courses | Commmunity | Services | System Admin

COURSES > PATENT > CONTROL PANEL > GRADEBOOK

📖 View Spreadsheet  2200

2202  2204  2206  2208  2210  2212  2218
📥Add Item 📋Manage Items 📊Gradebook Settings ⚖️Weight Grades ⬇️Download Grades ⬆️Upload Grades Sort Items by: [Position ▼] [GO]   Filter Items by Category: [All ▼] [GO]   Filter Users by Last Name: [All ▼] [GO]

| Student Name (Last, First) 2214  2216 | Mid-Term Assignment Pts Possible: 0 Weight: 0% | Total Pts Possible: 0 | Weighted Total |
|---|---|---|---|
| Alcorn, Bob | 100 | 100 | 0% |

1 Students
Displaying records 1 - 1                                            <<Previous 1 Next>>

🔒  In Progress
·  No Information
!  Needs Grading
?  Grading Error
✓  Completed
Denotes a non-visible item ( OK )

🗋 Powered by Blackboard                                        🌐 Internet

FIG. 22

COURSES > INTRODUCTION TO MUSIC > CONTROL PANEL > COURSE STATISTIC > REPORT

Course Statistics

*Statistics Generated on Thursday, February 24, 2000 11:26:28AM*
*Note: You may have to reload/refresh this page for the images to be correct.* — 2300

Total Number of Accesses per Area — 2302
Number of Accesses over Time — 2304
User Accesses per Hour of the Day — 2306
User Accesses per Day of the Week — 2308
Total Accesses by User — 2310

Total Number of Accesses per Area — 2302

| Area Name | Hits | Percent |
|---|---|---|
| Content Areas | 139 | 83.2 % |
| Communication Areas | 10 | 5.98 % |
| Group Areas | | 0 % |
| Student Areas | 15 | 8.98 % |
| Total | 167 | 100 % |

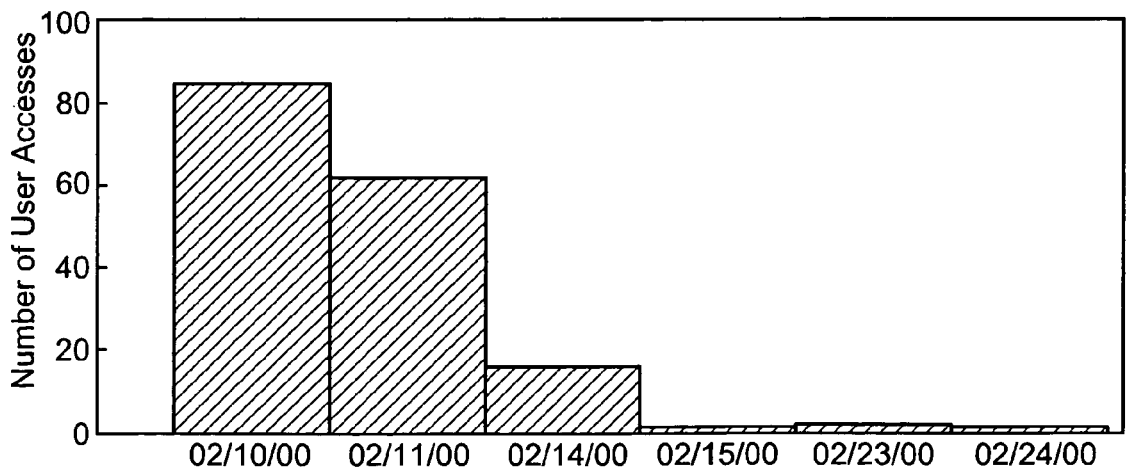

FIG. 23A

User Accesses by Hour of the Day — 2306

| Hour of the Day | Hits | Percent |
|---|---|---|
| 8 | 1 | 0.59 % |
| 9 | 7 | 4.19% |
| 10 | 94 | 56.2 % |
| 11 | 15 | 8.98 % |
| 12 | 4 | 2.39 % |
| 13 | 22 | 13.1 % |
| 15 | 1 | 0.59 % |
| 16 | 3 | 1.79 % |
| 17 | 14 | 8.38 % |
| 22 | 3 | 1.79 % |
| 23 | 3 | 1.79 % |
| Total | 167 | 100 % |

2300

| Fig. 23B-1 |
| Fig. 23B-2 |

FIG. 25

Screenshot of CourseInfo: My Blackboard browser window (2500) showing the Community tab (2502) with:

- Community Search: Search the Web, advanced search
- Off-Campus Communities: The Arts (Books, Writing, Art, Poetry); College (Greek, Academics, Nightlife); Cultures (Race Relations, Foreign Students); Fun & Games (Humor, Video, Games, Gaming); Health & Fitness (Working Out, Nutrition); Jobs (Career, Internships, Work Study); Money (Finance, Investing, Insurance); Movies (Reviews, Celebs, Filmmaking); Music (Videos, News, Bands); Personal & Misc. (The rest of it); Politics

- Club List: (Add)
  - Clubs of which you are a Member:
  - College Democrats — Meet with other Democrats to fight the Republicans
  - Sigma Alpha Mu — Greek Life
  - Football
  - Intramural Basketball — Join a team every Tuesday night
  - Math Club — If you are good at math join us. No Calculus required (joke)

- Club Catalog:
  - Theater and the Arts
  - Business & Investing
  - Christianity
  - Computers & Internet
  - Cooking, Food & Wine
  - Entertainment
  - Health, Mind & Body
  - History
  - Home & Garden
  - Literature & Fiction
  - Oprah
  - Parenting & Families
  - Professional & Technical

- Discussion Boards: (Add)
  - Housing — Looking for a roommate, or have housing questions. Post here.
  - Greek Life — Greek, Academics, Nightlife
  - Ride Board — Find a ride home or offer a ride.
  - Study Groups — Humor, Video Games, Gaming.
  - College Sports — Working Out, Nutrition
  - Teacher's Lounge — Where teachers can chat
  - Home Help — Need help from home
  - Social Life — Party hosted by Letts Hall at Quigley's Midtown.
  - Politics — Let's get those darn independents.
  - Intramurals — Join or start your own intramural sports team.

FIG. 29

ADMINISTRATION PANEL >CREATE NEW COURSE

Create A New Course

① Course Information

- Course Name:
- Course ID:
- Description:

② Course Deisign

- Button Type: Pattern
- Button Shape: ● Rectangular ○ Rounded Ends ○ Rounded Corners
- Button Style:
  - Course Information
  - Gallery of Buttons
  - Beige Stoun / Black Lace / Blue Brick / Blue Concrete / Blue Coral / Blue Lace

③ Course Options

- Select Type:
  - Subject Area: SELECT SUBJECT AREA
  - Discipline: General
- Guest Access:
  - ○ Guests are allowed to visit this course.
  - ○ Guests are not allowed to visit this course.

2900

---

- Guest Access:
  - ○ Guests are allowed to visit this course.
  - ○ Guests are not allowed to visit this course.

- Available: ○ Yes ○ No

- Select Course Catalog Category: Uncategorized

- Course Cartridge: (optional) Please enter your Course Cartridge Access Key: _____
  If you do not have an Access Key, please visit http://cartridges.blackboard.com to locate a Course Cartridge.

- Instructor:
  - ○ Instructor ID: _____ List Users
  - ○ Create New Instructor

④ Submit

Click "Submit" to finish. Click "Cancel" to end this process.

(Cancel) (Submit)

Social Sciences and Social Study: History

- Login
- Customize
- Help & Support
- About Bb.Inc.

News

Vietnam Starts Marking 1975 Battle Victories
Mar 10 - The Washington Times
HANOI - Vietnamese started celebrating yesterday the 25th anniversary of the victory of communist troops in the key town of Bam Me Thuot - a battle that marked the beginning of the end of the Vietnam War. FULL STORY

U.S. must support democracy - not just the military in Colombia
Mar 10 - The Washington Times
The March 7 article "Homes, land abandoned as civil war continues" makes reference to how Colombia's civil wae between leftist guerrillas and government security and paramilitary groups has expanded to the point where noncombatants are being affected. FULL STORY

F16s needed
Mar 10 - The Dominion
The RNZAF needs the most modern aircraftavailable to maintain the skills necessary for its attack and strike capability, not only for defence but to assist our close allies. FULL STORY

Reunion plain sailing
Mar 10 - Waikato Times
A perfect landing started a perfect reunion when World War II pilot Dusty Millerwatched an immaculately rebuilt 1940 Hawker Hurricane touch down at Wanaka Airpoort yesterday. FULL STORY

Poor site testing "threatens heritage"
Mar 10 - The Irish Times
Archaeological treasures in the Republic are at risk of being destroyed because of inadequate site-testing by archaeologists, according to a report published yesterday.

Research Center

Periodical Search:

- ● Boolean Search
- ○ Natural Language Search

- ● Search all articles
- ○ Search only this discipline

Browse by Topic:
Early National Period
Great Depression
Jacksonian America
Labor Movement
The Cold War
Vietnam War
World War I
World War II

Web Search:

Communities

Social Sciences and Social Study for Students

- Discussion Boards

Learn about my civilization

Linking to the E-Commerce Server

Myserver.blackboard.com

BLOCK 120

100

Ready to checkout?

OK

The link to butter passes the following information:

name: Name of the purchaser
address_1
address_2
city
state
zip
country
price: price in USD that the user is being asked to pay
order-id: null if butter should generate an order number (default)
order-descr: Text description of what the user is buying.
url: The location the referring server that butter should return the user to after the payment process is complete Butter blackboard.com
Linux Apache Red CGI hyperlink

FIG. 34

First E-Commerce Screen Display

Butter.blackboard.com

Accepts VISA, MC, Diner's Club, JCB and Carte Blanche (but not Amex)

Whatever user info is available is populated from the data passed from the previous page.

The unique order number displayed is dynamically generated by the server.

The Chosen services and price displayed are passed in from the previous screen.

The look and feel of this plate (and all butter e-commerce pages) can be modified by an HTML template. This template is selected as one of the script parameters.

FIG. 35

Authorization Process
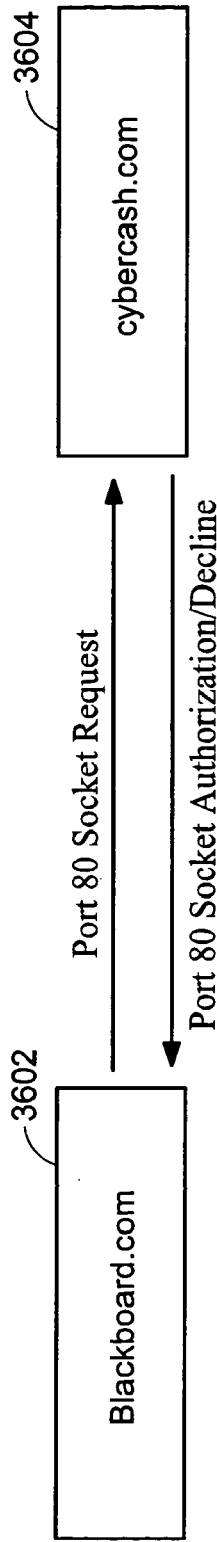
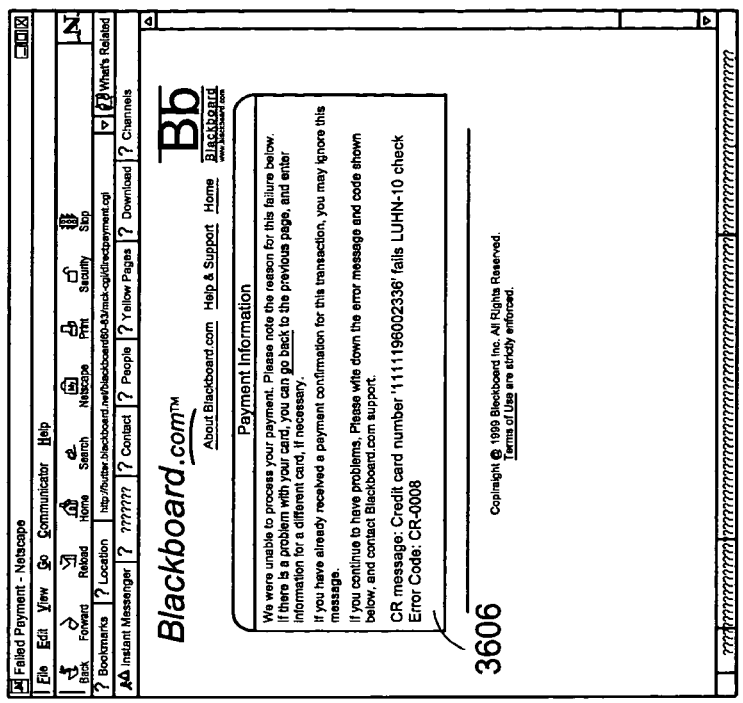
- The authorization process takes a minute or so.
- If the card is rejected, a page like the one at right is displayed.
- If the card is accepted, the payment goes through, and the page on the next slide is shown.
FIG. 36

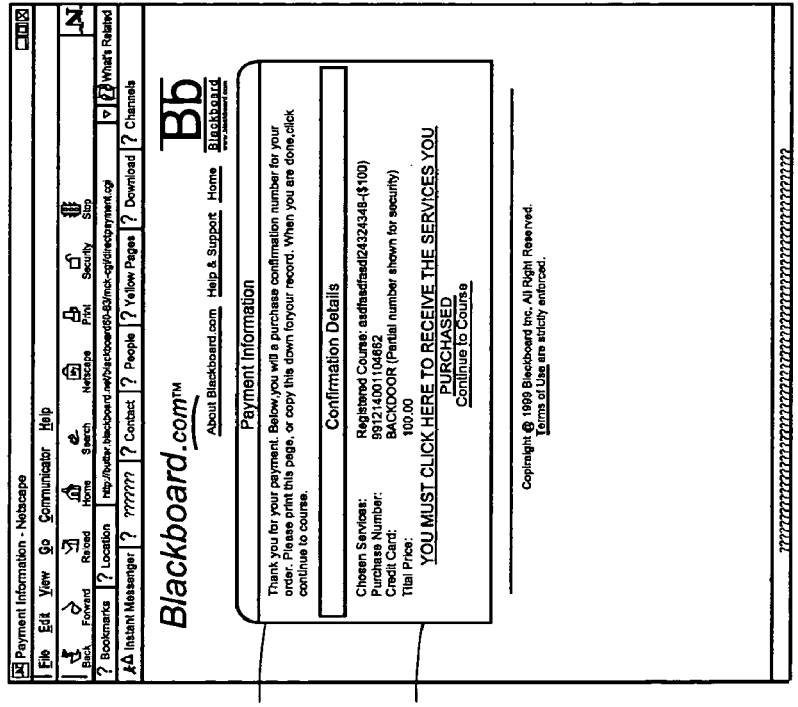

FIG. 37

Payment is authorized and queued at Cybercash, Inc for processing.

The payment will go through and appear in Blackboard's Cybercash account within 12 hours.

There is no way that the user can back out at this point without Blackboard issuing a manual refund.

No services are provided yet. The user must follow the link at the bottom of the page, or he will receive nothing for his money.

All links on this page are disabled except the one that says :YOU MUST CLICK HERE". This prevents users from failing to get their orders filled.

A authorization code is calculated by the script as a secure hash of the purchase price, the order id, and a secret number.

Returning to the Originating Server

- The link at the bottom of the page points back to the referring server using the location passed in the URL parameter to the first butter script.

- The authorization code, the order_id and a subset of the credit card digits (show_card) are passed back as parameters.

- The authorization code should be checked upon return by making an identical hash calculation. If the two hash values match, the order should be fulfilled, otherwise, and error should be shown.

FIG. 38

RENDERED DATA

4600

| User Name | | | Role(s) | Entitlement |
|---|---|---|---|---|
| Last | First | M.I. | | |
| Jones | Allan | S. | A,I | Course, modify calendar, modify |
| Smith | Jane | T. | C,T | Course, modify calendar, modify |
| ⋮ | | | | |
| Lee | Alex | Y. | O. | Course.view |

Manage System Extensions

4802

Install Extension   Download Extension

Installed System Extensions

| Name | Vendor | Version | Status | | | |
|---|---|---|---|---|---|---|
| Astrology | Astrology.com | 1.0.1 | Available | View Components | | Remove |
| CNNModules | CNN | 1.0.0 | Available | View Components | | Remove |
| GoogleModule | Google | 1.0.0 | Available | View Components | | Remove |
| HETemplateModules | Blackboard Inc. | 1.0.0 | Available | View Components | | Remove |
| Maps | Mapquest | 1.0.2 | Available | View Components | | Remove |
| New York Times | New York Times | 1.0.0 | Available | View Components | | Remove |
| Time | Time | 1.0.0 | Available | View Components | | Remove |
| Travel | Expedia | 1.0.0 | Available | View Components | | Remove |
| WeatherModule | Weather.com | 1.0.0 | Available | View Components | | Remove |
| Zap2itModules | Zap2it | 1.0.0 | Available | View Components | | Remove |
| AOI WYIWYG Editor | AOI Systems | 2.5.8 | Available | View Components | Properties | Remove |
| Blackboard Course Creation Wizard | Blackboard Research and Development | 1.0.1 | Available | View Components | Properties | Remove |

INTERNET-BASED EDUCATION SUPPORT SYSTEM, METHOD AND MEDIUM PROVIDING SECURITY ATTRIBUTES IN MODULAR, EXTENSIBLE COMPONENTS

CROSS-REFERENCE TO RELATED APPLICATIONS

This application is a continuation-in-part of U.S. application Ser. No. 09/608,208, filed Jun. 30, 2000, now U.S. Pat. No. 6,988,138 which is incorporated herein by reference. This application claims the benefit of U.S. Provisional Application No. 60/449,507, filed Feb. 25, 2003, U.S. Provisional Application No. 60/406,304, filed Aug. 28, 2002, and U.S. Provisional Application No. 60/404,276, filed Aug. 19, 2002, each of which is incorporated herein by reference. U.S. application Ser. No. 09/608,208 claims the benefit of U.S. Provisional Application No. 60/141,283, filed on Jun. 30, 1999, U.S. Provisional Application No. 60/141,864, filed on Jul. 1, 1999, and U.S. provisional Application No. 60/187,890, filed on Mar. 8, 2000, all of which are incorporated herein by reference.

FIELD OF THE INVENTION

The present invention relates generally to systems and methods for the exchange of information between instructors and students in an educational context. More specifically, the present invention relates to systems and methods in which an educational instructor interacts with one or more non-collocated students by transmitting course lectures, textbooks, literature, and other course materials, receiving student questions and input, and conducting participatory class discussions using an electronic network such as a Local Area Network (LAN), a Metropolitan Area Network (MAN), a Wide Area Network (WAN), the Internet and/or the World Wide Web (WWW). The present invention also relates to the provision of an infrastructure that allows for on-line registration and tuition payment of educational courses.

In addition, the present invention relates to systems and methods that may be used by system users at various levels for the distribution and use of information over a network. More specifically, the present invention relates to interactive systems and methods that incorporate a second type of text editor in addition to a primary text editor, and that will optionally render text and/or symbols associated with the secondary text editor on a display.

Further, the present invention relates to systems and for providing core system extensibility by using a set of files installed on a system server in a manner that is structured so the server has predefined entry points to call upon the functionality of the extension. The entry points may be Uniform Resource Locators (URLs) that are tracked in a system database, and associated with key entities such as content handlers and navigation items.

BACKGROUND ART

The ability of educators, including educational institutions, private corporations, and institutions of higher learning, to reach potential students has generally been limited by geography. In most instances, a potential student must physically move to within commuting distance or onto a campus in order to have access to course instructors, classes, and materials. Furthermore, potential students and persons seeking knowledge of all sorts are generally limited to proximate sources of courses of instruction, tutoring, or training. Due to these limitations, a prospective student must either seek to learn a given subject from whatever local means of instruction is available to her or move her household in order to be able to access her preferred sources of instruction. Many prospective students are deprived of receiving instruction from other, possibly better-qualified instructors or institutions located outside of their immediate locale. Similarly, educational institutions have been limited to serving only those students located within commutable distance of their campuses. This applies whether the student(s) and/or instructors(s) are in the United States, Japan, Kenya, Germany, or India.

The advent of networked computers and communications has afforded a partial solution to these limitations. In particular, the widespread use and availability of electronic networks such as the Internet and the World-Wide Web ("WWW") have made it possible for students and educators to overcome geographic separation as a barrier to education or training. Students and instructors are therefore able to exchange information including live or transcribed classroom lectures, homework assignments, texts and materials, grading, live or transcribed question and answer interaction sessions, and other related information to effect a traditional learning or educational experience regardless of physical location.

However, electronic networks, including the Internet, are complex technological systems requiring the user to have or acquire specialized knowledge in order to use them effectively. Even graphical user interfaces (GUIs) designed to enhance simplicity of use, such as that provided by the WWW, may require specialized knowledge of network terminology and technical aspects. For example, an Internet user's ability to access information using that medium is significantly reduced if the user lacks understanding of how to use Uniform Resource Locators (URLs) to navigate web pages. Slow adoption of new technology and lack of technological sophistication have a chilling effect on the widespread use of the medium in general. Applied specifically in an educational context, these chilling factors apply to instructors who, while possessing high expertise in their respective intellectual or educational fields, would be required to further attain technological knowledge necessary to effectively use the Internet to educate non-collocated students.

Furthermore, the complexity of using the Internet for educational purposes is compounded as the number of user choices required at the user interface increases because not only must the instructor and students acquire technological competency in the use of the medium, but they must in addition understand the presentation and consequences of large number of choices required by a particular user interface such as a web page. The design of the user interface, therefore, can be critical in enabling widespread use of the medium in an educational context. Solutions other than the present invention may be characterized as having relatively complicated and confusing user interfaces. Users, including students and instructors, of these other solutions are confronted with one or more web pages that typically require the user to review and select a subsequent web page or function from among a large array of potential user choices, thereby complicating the user's task of interacting with the system.

Further, many educational institutions have existing or legacy network-based systems that students access to obtain various types of information (e.g., class schedules). The addition of yet another network-based system requires the host or sponsoring institution to incur implementation and maintenance costs associated with the installation, integration, administration, and maintenance of a new network-based system. These costs place limits on the achieving the widespread use of the medium for educational purposes.

The exception has been so-called virtual schools. Virtual schools traditionally charge an enrollment fee, and then offer free courses. In lieu of paying for each course taken, a student is subjected to advertising while viewing on-line course material. While such billing and income generation methods may be acceptable for companies providing on-line training, such methods are inconsistent with traditional college and university billing practices. Colleges and universities typically charge a low enrollment fee and bill students on a per-credit or per course basis.

Known systems exist for distributing and using information over a network that permit activities by system users according to the level of the user. Such systems have not, however, reached a level where standards have evolved so that there is consistency in nomenclature, structure, or interfacing to such systems. Each system is technologically complex and specialized to what system developers believe are important. Therefore, the system users, regardless of level, may find it difficult to use without, in many cases, very specialized training as to the particularized interworkings of that specific system. Most of these systems do not lend themselves to rapid use after a brief introduction. Although the general populus in various countries are becoming increasingly "computer literate," this does not mean that the worldwide society that could make use of these non-geographically limited educational or training systems would not have difficulty using them because of their nonuser-friendly nature. This is magnified given the number of user types that will access and use the system, e.g., instructors, students, and individuals receiving instruction, system providers and everything or everyone that may be a hybrid of each of these groups, and potential language barriers without very specialized conversion of the systems.

To the extent that current networked educational or training systems exist, they are configured from the institution or company perspective and not to that of the user. Further, these systems are not readily adaptable to the individual user's perspective(s). The student or individual receiving instruction is inextricably tied to the institution's configuration without the ability to tailor his/her experience that would better fit his/her individual style in obtaining, using, processing, and contributing information.

In a typical conventional system, the student or individual receiving instruction will access different locations or web pages of the institution's or company's network system to obtain the information that he/she desires or post with the institution or company. In order to gain such access, the student or individual may be required to logon a number of networks to obtain the desired information or upload it. This can be frustrating to students or individuals because small errors in the process can greatly increase the time to perform activities on the system. At some point, the frustrated student or individual may give up or be required to seek help. The alternative of consolidating all the activities at one web-site may itself cause problems given the institution's or company's purposeful segregation of the activities at the various network system sites since the main idea is to make the system more institutional or company-centric rather than student- or individual-centric.

Current networked systems that are used for education or training will require the instructor to make lecture and textual information available to the students or individuals. As can be imagined, various instructors, whether the educational or company setting, will have very different teaching styles. Present-day systems that typically are institution- or company-centric are not readily adaptable to accommodate these differences in teaching styles. The best description of these systems would be to refer to them as "one size fits all" types of systems. Therefore, there will exist a constant struggle between the instructors, and institutions or companies to derive system refinements and customizations to meet the instructors' needs. This creates difficulties for institutions and companies from the maintenance and management standpoint.

With regard to maintenance, the institution or company must continue to provide support for the ever changing nature of the system, which is very expensive and time consuming. And, with regard to management, the institution or company must create customizations on demand and attend to the development and testing processes associated with these new and varied customizations. This again is expensive and time consuming.

Current LAN, MAN, WAN, intranet, Internet or WWW-based systems that may accommodate the educational or corporate systems that have been discussed, slow significantly as the increasing numbers of students or trainees utilize the systems/network to obtain information or use the system for its intended purposes. This adds to user frustration and system dissatisfaction. If this is one of the major initiatives of the educational or company training system, it will reflect badly on the institution or company.

Current educational and company-based training systems have difficulty presenting multiple functions and/or on-line activities. For example, there are problems in providing on-line registration for educational courses along with providing tuition payments. This is due in part to the incompatibility of billing practices and the ongoing customization of the integration of the registration for courses and payment techniques.

In addition, web-based applications often present forms in HyperText Markup Language (HTML) for users to provide information and data. Popular browsers typically provide form fields for such text entries. However, these form fields are generally limited to the entry of plain text information and data, and/or allowing the user to enter codes for one or more markup languages depending on the server or application processing the input data.

Two techniques that have been used to create richer information and data inputs are Dynamic HyperText Markup Language (DHTML), and Applets (or other browser plug-ins). DHTML may be used to make web pages more dynamic by changing their look or content after the page has been completely interpreted by the browser, a feature not available for HTML. DHTML may be programmed into the system to be activated by user activity or automatically. Examples of DHTML include roll-overs (changing SRC property of an image object), and using layers to show and hide menus. Applets (or other browser plug-ins) enable browser editing and other capabilities beyond those of provided DHTML. However, these techniques have not provided a data structure and/or Application Program Interface (API) that would allow the logic in a text editor component of a system to utilize a Text Tool that is associated with application specific data.

In addition, many systems support dynamic extensions to system functionality. For example, operating systems and user applications employ dynamic link libraries (DLLs), and web-based applications may employ related techniques, such as Java Web Applications. However, these dynamic extensions do not incorporate security and/or user permission features.

The present invention overcomes the problems of conventional systems, and provides a system that is user friendly and easy to use through a user interface.

One or more embodiments of the present invention also provide enhanced text editing, extensibility, and security capabilities of the system.

Therefore, it is a general object of the present invention to provide a system and methods that allow users to interact with a computer network-based education support system through means of a simplified, easy-to-use user interface.

A further general object of the present invention is to provide a system that can be easily integrated with existing computer network and backend systems with minimal disruption to existing operations and systems.

A still further general object of the present invention is to provide a system that is scalable in order to accommodate increasing numbers of users, such that system responsiveness is not materially degraded as the number of users of the system grows to an increasingly large number.

A still further general object of the present invention is to provide a system and methods that can accommodate a variety of diverse teaching modes without requiring substantial modifications to the system.

A further object of the invention is to provide a system that allows multiple types of users to access the features of the system as a function of their predefined role within the framework of the system, such as, a student, a teacher, or an administrator.

It is a further object of the invention to provide such a system that integrates with the education platform so that there will be provided therein value added services and control such as calendar, task, contact and communication functions.

It is another object of the invention to support multiple locales, and have multiple locales display in a user's browser based on an administrative configuration.

An even still further object of the present invention is to provide a system and method that is accessible according to the access level of the system user.

It is still a further object of the present invention to provide a network-based interactive system that is readily adaptable to accommodate multiple languages.

It is another object of the present invention to provide a data structure and/or Application Program Interface (API) that allows the logic in a text editor component to be expanded to utilize text tools that are associated with application specific data.

It is an object of the present invention to allow for arbitrary or substantially arbitrary extensions and data formats that can be utilized in, for example, a web based text editor.

It is another object of the present invention to minimize or substantially minimize rendering processing by, for example, substantially avoiding or minimizing requirements on run-time rendering negotiation.

It is yet another object of the present invention to separate or substantially separate presentation data such as HTML from structured, provider-specific data.

These as well as other objects of the present invention are apparent upon inspection of the specification and drawings.

SUMMARY OF THE INVENTION

In accordance with these and other objects, provided is a system for providing to a community of users access to a plurality of on-line courses, comprising a plurality of user computers and a server computer in communication with each of the user computers over a network that includes LANs, MANs, WANs, the Internet, intranet, and/or the WWW. Each user computer is associated with a user of the system having predefined characteristics indicative of a predetermined access level to the system. Each level of access to data files is associated with a course, and a level of control over data files associated with a course. The preferred server computer is capable of storing data files associated with a course assigning a level of access to each file, determining an access level of a user requesting access to a file, and allowing access to a file associated with a course as a function of the access level of the user. Accordingly, the level of access preferably is associated with the ability of a user to access the file.

According to one or more embodiments of the present invention, the user level associated with a student user, an instructor level is associated with an instructor user, and an administrator level is associated with an administrator user. However, multiple levels may be associated particular users. For example an instructor of one course may also be a student in another course.

The instructor user is provided with an access level to enable the creation and editing of a plurality of course files associated with a course. The course files may include an announcement file, a course information file, a staff information file, a course documents file, an assignments file, a dropbox file, an asynchronous communication file, and a synchronous communication file.

The student user is provided with an access level to enable reading of course files associated with a course. The student user is also provided with an access level to enable modification of some of the files associated with a course. Also, the user may be provided with an access level to enable creation of a student file associated with a file for which the student user is able to read. The file that the student is able to read may be an assessment file created by the instructor user, and the student file created by the student user is a response to the assessment file. The assessment file may be a plurality of examination questions selected by the instructor user to assess the learning level of the student user. The examination questions may be selected by the instructor user from a predetermined pool of available examination questions. The examination questions also may be created by the instructor user substantially at the time of the creation of the assessment file and optionally added to the pool. The student file may be reviewed by the instructor user and assigned a grade, which would be made available on-line to the student user. The instructor user may collate the grades obtained from reviewing a number of student files, and the collated grades may be made available on-line to all student users associated with the course.

The "digital dropbox" may contain a plurality of files transferred to the server computer from one or more student users associated with the course. The instructor user may be provided with access to the files in the dropbox file. The instructor user may download, edit and upload the files in the dropbox.

A user may be required to enter a logon sequence into a user computer in order to be provided with access to course files associated with that user. The user is then provided with access to all courses with which the he/she is associated after entry of the logon sequence. The user is provided with a web page that may include a plurality of course hyperlinks. These course hyperlinks preferably will be associated with each course that the user has been enrolled either as an instructor or as a student. Selection of a course hyperlink will provide the user with a web page associated with the selected course. This web page will have content hyperlinks and buttons to various content areas associated with the course. The content hyperlinks and/or buttons may include, for example, an announcement area hyperlink, a course information hyperlink, a staff information hyperlink, a course documents hyperlink, an assignments hyperlink, a communications hyperlink, and a student tools hyperlink.

Selection of the announcement area hyperlink provides a web page including a group of course announcements. Selection of the course information hyperlink provides a web page including information regarding the associated course. Selection of the staff information hyperlink provides a web page including data regarding the instructors of the associated course. Selection of the course documents hyperlink provides a web page including a listing of documents associated with the course, which may be active hyperlinks to the documents. Selection of the assignments hyperlink provides a web page including a group of course assignments. Selection of the communications hyperlink provides a web page including hyperlinks to a group of communication tools including an asynchronous communication tool and a synchronous communication tool.

In another aspect of the present invention, the system and method provide a community of users access to on-line courses that will include a server computer in communication with user computers over a network. The server computer preferably will be capable of creating course user accounts from a file of existing user accounts associated with an external computer. In this manner, existing legacy systems that have a large number of user accounts stored in memory may be integrated with this system without having to re-enter user data which is referred to as "batch enrollment."

The present invention also includes a method for providing on-line education that further may include the steps of establishing a course to be offered on-line, offering the course to be taken on-line to a group of student users, and providing access over the network to the course files to student users who have enrolled in the course. The establishment of the course includes an instructor user generating a set of course files for use in teaching the course, then transferring the course files to a server computer for storage. The stored files will be accessible by a predefined community of student users having access to the server computer over a network.

Preferably, at least one of the course files may include a course assignment. The student user creates a student file in response to the course assignment and transfers the student file to the server computer. The instructor user accesses the student file from the server computer, reviews the student file to determine compliance with the course assignment, and assigns a grade to the student file as a function of the determination of compliance with the course assignment. The instructor user also may post the grade to a file on the server computer accessible only by the student user with which the grade is associated. The instructor user may repeat this process for a number of student users that are enrolled in a course, and then perform a statistical analysis on the grades assigned to the student users. The results of the statistical analysis may be made available to the student users enrolled in the course.

An asynchronous communication tool accessible to student users enrolled in the course may be provided for enabling asynchronous communication amongst the student users. Likewise, a synchronous communication tool accessible to student users enrolled in the course may be provided for enabling synchronous communication amongst the student users.

The present invention also provides a flexible infrastructure for colleges, universities, and other institutions desiring to facilitate on-line registration and tuition payment. Further, the present invention can accommodate different billing methods, including, but not limited to, billing on a per-credit-hour basis, and billing on a per registrant basis. Tuition may be paid by credit card, debit card, check, or other verifiable payment method. Payment verification may be performed by the present invention, or the present invention may interface with third-parties providing payment verification services. In addition, the present invention allows on-line billing information to easily interface with a college, university, or other institution's standard billing practices. Integrating with existing billing practices simplifies transition to automated systems.

The present invention may be configured as an open system to which anyone can connect to a server over the Internet or WWW, and create a course on-line that may be taken by anyone else connected over the network. Thus, anyone may create a virtual classroom available to anyone else, regardless of whether they are affiliated with a particular institution. For example, a lawyer may create a course in patent law on-line, and configure the system to require entry of a password to enroll. The lawyer may then disseminate the passwords to students who desire to enroll in the course. Alternately, the lawyer can request the system to require payment to enroll in the course, such as by credit card.

One or more embodiments of the present invention may be implemented as a three-tier structure. The "first tier" functionality that incorporates the basic system, referred to as the Course Manager. The Course Manager provides course management system tools to enable instructors to provide their students with course materials, discussion boards, virtual chat, on-line assessments, and a dedicated academic resource center on the Web. As used herein tools are the additional features that system 100 offers for students and instructors beyond content delivery, such as e-mail, student homepages, a gradebook, and the like.

As explained further below, the Course Manager includes personal information management tools, course content management tools, course communication and collaboration tools, assessment tools, academic Web resources, course management tools, and system management tools.

The "second tier" can incorporate all of the functionality of the basic embodiment in an epicentric or portal model, also known as the Course & Portal Manager. The second tier provides customized institution-wide portals for faculty, students, staff, and alumni with access to numerous personalized news and information services from across the Web. The platform can be customized with institutional branding and a tailored look and feel. It enables institutions to develop on-line communities, Web-based e-mail, calendar, announcements and tasks. It also allows for a central access point to all of the institution's on-line services. In addition to the features of the Course Manager, the Course & Portal Manager includes enterprise database support, customizable portal modules and information services, web-based e-mail system, community management, institutional services management, extended customization for institutional branding, institution-wide content sharing and management, and course e-commerce management.

The "third tier" can be called the Advanced Course & Portal Manager. This tier incorporates the complete end-to-end "e-Learning" solution. In addition to the Course and Portal Manager, this third tier provides advanced Java-based APIs for unifying diverse on-line campus systems into one integrated platform allowing for user-driven single log-in service delivery, as well as capabilities that allow each school, department or campus within the institution to maintain its own customized environment. Thus, this is the fully functional embodiment that includes all the features and functionality of the first and second tiers and adds certain integration technologies that allow integration of the present invention with existing enterprise systems, such as for downloading student databases, etc., as defined subsequently. This includes a snapshot user management API, an event-driven (real-time) user management API, an end user authentication (security) API, and a network protocol for passing user authentication data.

An embodiment of the invention that utilizes the three tier structure can be operated as a publicly available web site on the Internet or WWW, that may be accessed by anyone, whether they are affiliated with an institution or not. In this embodiment, anyone on the web can create a course, or enroll in a public course as explained subsequently. This provides for widespread dissemination of tools and utilities that enable anyone to generate his own course that can be taken by virtually any student.

The course management tools of the present invention allow instructors to monitor, control and customize their course web sites from a web browser interface. The secondary text editor of the present invention may be implemented as a tool useful for customization of course web sites. The Course Control Panel provides a robust and easy-to-use interface for such course management. The system allows instructors to customize the names of course web site navigation buttons to suit their needs and requirements. The system also allows the instructor to add or drop individuals or groups of students from a course as required. The system features extended student enrollment option, such as a limited-time self-enrollment, e.g., certain dates only for the self-enroll feature, password-protected enrollment, and defined course duration. This will allow self-paced study. Courses may be recycled between academic terms by automatically resetting discussion boards, assessment, and other content areas. In addition, the instructor can track student progress, grades and content usage through the system.

As further explained herein, the content management tools featured in the present invention allow instructors to post course documents, staff information, and assignments. Text may be typed directly into a form, or existing files may be accessed and uploaded automatically. Documents, such as word processing files, spreadsheets, slide presentations, graphics, audio and video clips, may be uploaded in this manner. Streaming multimedia may be provided interactivity between the student and the course. Pop-up maps provide easy course site navigation that enriches the teaching and learning experiences.

The communication and collaboration tools enhance the interaction between the students and instructors with asynchronous discussion boards as well as synchronous chat tools. On-line discussions may be managed wherein messages are sortable by date, author, title and may be archived and printed. A digital dropbox is a file sharing utility that allows sharing of documents between users. Virtual office hours may be held and even field trips conducted on-line with these tools.

The assessment tools in the present invention increase student preparedness, measure student progress, and customize lessons by creating and administering quizzes and surveys. As such, there is an easy to use, step by step process to create the quizzes and surveys. The instructor, as desired, may mix and match multiple question types, such as multiple choice, multiple correct, true/false, matching, ordering, fill in the blank, and essays. Multimedia or other attachments may easily be included with the assessment questions. Questions may be randomized and re-used from assessment pools. Tests provided to students may be password protected and timed, and may provide instant feedback to students. Advantageously, statistical reports may be created from the assessments and student answers.

The personal information management tools in the present invention allow students, instructors, administrators and all other users to access basic course, personal, and institutional data through a user-centric "My Institution" screen. The user may view announcements from multiple courses in one central location, and maintain personal calendar, address book, user directory and to-do lists.

The present invention also provides for access to a great number of academic resources that supplement the student's on-line education experience. The user may browse discipline-specific information, resources, and communities linked to each course web-site. These academic resources may be customized and personalized to fit the users' needs.

The system management tools available with the present invention allow system administrators to monitor, control and customize an institution's on-line teaching and learning environment from a web browser. The system administrator may control security permissions and enable/disable features for numerous user access levels. Batch user enrollment and unenrollment may be performed system wide. Preferences and options may be managed on multiple courses from within a central system administrator panel. The system administrator may (i) track and report faculty, student, and course statistics, (ii) plan and manage system hardware requirements by assigning instructors with pre-assigned disk quotas for content storage, and (iii) employ system-wide announcements to broadcast messages to users about system maintenance or institutional announcements.

In the Course & Portal Manager embodiment, enterprise database support provides support for tens of thousands of users across an entire institution or network of institutions. User and course data may be managed efficiently and effectively. Moreover, large volumes of transactions may be managed efficiently and effectively. The "My Institution" interface includes portal and community functionality along with quick access to web e-mail, course and institutional announcements, and links to other campus departments. Administrators may enable or disable portal modules and establish required and optional modules from the portal options menu bar. Administrators may also assign different portal default settings to different user access levels, e.g. students get different portals than instructors.

Course e-commerce management functionality allows institutions to set prices and charge fees for course enrollment directly through the "e-Learning" platform.

In the Advanced Course & Portal Manager embodiment, the snapshot user management tool allows scheduling of one-time or periodic (e.g., hourly, daily, weekly) data integration from existing student information systems, automating course population and keeping the "e-Learning" environment is synchronized with administrative and student data. Moreover, the end-user authentication enables a single logon environment for the institution portal for all students, instructors, administrators and staff. This streamlines all campus services into a single web portal environment.

In an embodiment of the invention, the system is capable of utilizing DHTML, Applets or their equivalents to provide an extensible framework that can be used, for example, with a web-based Text Editor to substantially increase its capabilities. The Text Editor can be implemented in a technology independent manner and across a range of web-based browsers.

One or more embodiments of the present invention also provide a mechanism to extend system functionality by including security attributes for the hyperlinks. More particularly, one or more embodiments of the present invention can be deployed in a web-based environment, in which administrators (or others) may remotely upload (or otherwise provide) system package(s) that contain a descriptor, called a manifest. As known to those skilled in the Java programming language, a manifest is a member file inside a Java Archive File (JAR) file that describes the contents of the JAR archive.

One or more embodiments of the present invention utilize, for example, a standard manifest to include (or contain) information about the hyperlinks available within the package provided to the system. Once the manifest is installed, the system can utilize those requirements provided in the manifest by, for example, evaluating the role of the user accessing a particular hyperlink.

In one or more embodiments, each link entry in a manifest can contain information about user roles that determine whether the user has access to a hyperlink. The overall design can utilize and install "plug-ins" that are either pre-installed or installed after-market to extend or enhance system functionality.

One or more embodiments of the present invention can utilize pre-existing platform infrastructure such as navigation items and/or application program interfaces (APIs), and generalize extension hooks that can be used with communication, tools, content and support aspects of the system.

By defining the installation infrastructure separately from the integration products, one or more embodiments of the present invention advantageously allow development of plug-ins or extensions to occur separately and independently from development of the underlying software. Accordingly, development of a given plug-in is not bound to development cycles associated with the underlying software.

The system and method of the present invention will be described in further detail in the remainder of the specification, including the claims, referring to the attached drawings.

BRIEF DESCRIPTION OF THE DRAWING

FIG. 1A shows an overall block diagram of the system.

FIG. 8 is a screen display of an announcement web page provided to a student user according to the present invention.

FIG. 13 is a screen display of an asynchronous discussion board web page according to the present invention.

FIG. 15 is a screen display of a student drop box web page according to the present invention.

FIG. 22 is a screen display of a course gradebook web page according to the present invention.

FIGS. 23A and 23B are screen displays of the course statistics web page according to the present invention.

FIG. 25 is a screen display of a community web page according to the present invention.

FIG. 29 is a screen display of a create a course web page according to the present invention.

FIGS. 30A and 30B are screen displays of create user web pages according to the present invention.

FIG. 32 is a further screen display of a web resource web page according to the present invention.

FIG. 34 is a diagram showing information passed from a course registration server to a payment server according to the present invention.

FIG. 35 is a sample of a payment form according to the present invention.

FIG. 36 is a diagram showing the interaction between a payment server and a payment validation server according to the present invention.

FIG. 37 is a sample of a payment information page according to the present invention.

FIG. 38 is a diagram showing post-order processing according to the present invention.

FIG. 48 is a system extensions administration screen display before a plug-in is installed in the system.

FIG. 50 is the administration screen display shown FIG. 24, subsequent to installation of a plug-in.

FIG. 51 is the system extensions administration screen display shown FIG. 48, subsequent to installation of a plug-in.

DETAILED DESCRIPTION OF THE INVENTION

General System Architecture

Referring to FIG. 1A, generally at 50, the present invention comprises a system and methods for the exchange of course content and related information between non-collocated instructor users and student or trainee users. An instructor user, such as at 52, 54, interacts with one or more non-collocated student or trainee users, such as at 56, 58, 60, by using the system and methods of the present invention to, without limitation, transmit course files including course lectures, textbooks, literature, and other course materials, receive student questions and input, and conduct participatory class discussions using an electronic network such as a LAN, a MAN, a WAN, the Internet and/or the WWW, of which 62 is representative. Access to the course file is controlled by access levels assigned to system users and control logic, which helps ensure the integrity and security of the system. Also, administrator users, such as at 64, 66, have access to the system to perform administrative tasks as defined herein. Web resources 68 connect to the system to provide additional services and or functionality. Finally system 100 also connects to the network 62. As shown at 70, a system user may have multiple access levels. Here, the user is an instructor/student user.

Figure 1B:
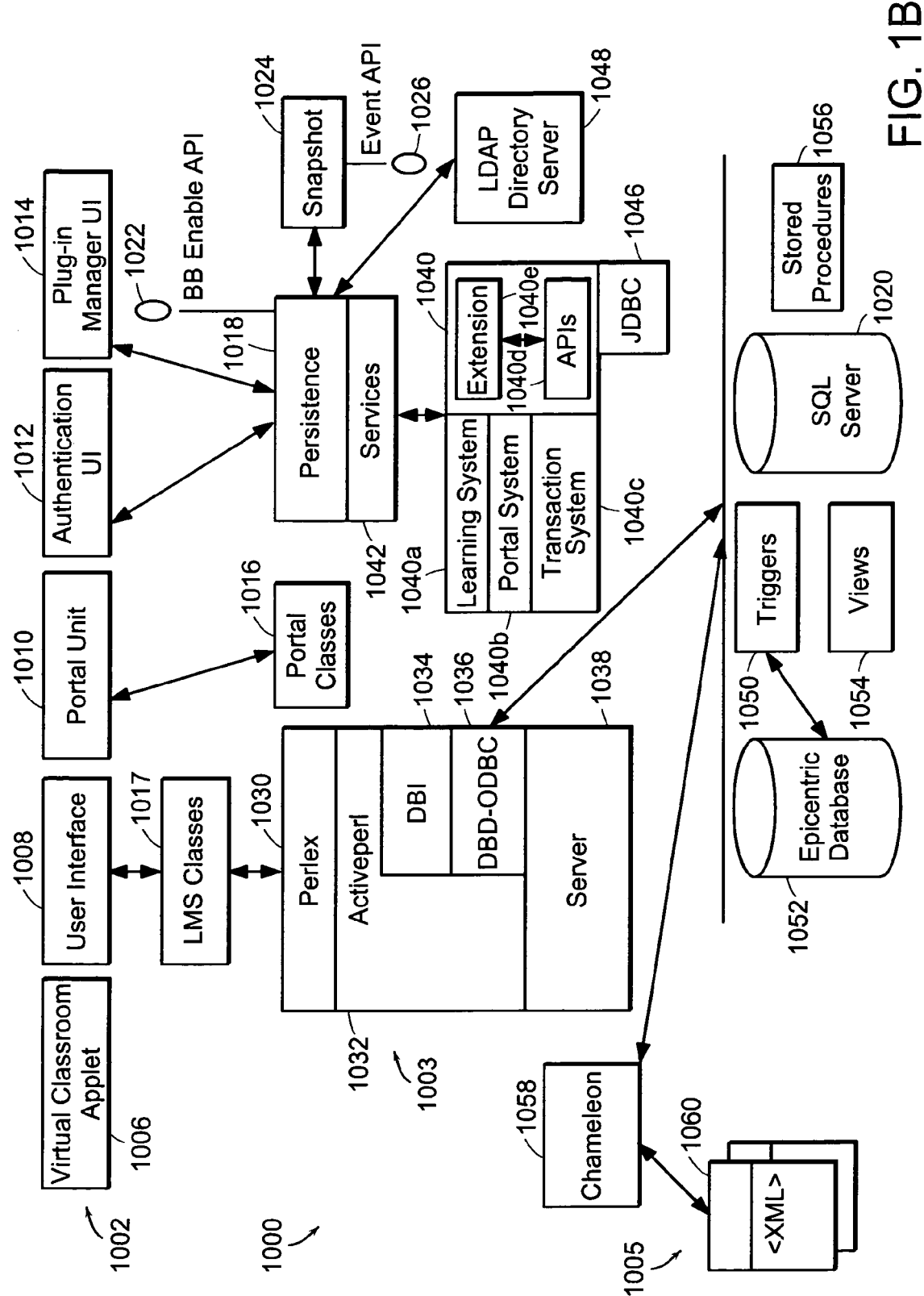
FIG. 1B shows an exemplary high level diagram of the system architecture, indicating a logical relationship between various system components.

FIG. 1B at 1000 is a further detailed view of FIG. 1A and shows an exemplary component architecture that (i) indicates logical relationships between various components, and (ii) can be used to implement multiple locales in a web-based implementation. FIG. 1B shows a three tier architecture. These tiers are user interface tier 1002, platform tier 1003, and data tier 1005. Other numbers of tiers can also be used and are encompassed within the scope of the present invention.

User interface tier 1002 includes components from an end user perspective. They may be used, for example, for a user to logon to server 1040 and conduct subsequent interactions. User interface tier 1002 will permit the system user to access, interact with, and retrieve information. For example, user interface layer 1002 can generally be used to create, revise, and/or delete content from system 1000. A secondary text editor of the present invention, which can be used in connection with a primary or native text editor, may be implemented through the system server platform tier 1003 of the user interface tier 1002.

At user interface layer 1002, system 1000 can generate, access, retrieve and/or receive HTML pages, optionally in an extensible mark-up language (XML) environment. Applets 1006 can be used in a conventional manner to enhance browser 1008 functionality. The secondary text editor can reside on or be associated with server 1040. The secondary text editor using dynamic hypertext mark-up language (DHTML) may be associated with the HTML pages and applets to increase the systems' capabilities for user-based editing of content.

Portal unit 1010 can utilize portal classes 1016, for example, to render and/or aggregate the actual data displayed on portal pages, such as shown in FIGS. 5, 6, 12, 24, 25, 26 and/or 28. Portal classes 1016 represent software code that can be used to rendered data that can be displayed by or at user interface 1008. The portal classes are preferably implemented as object-oriented code, e.g., Java.

Authentication user interface 1012 can be used to verify user credentials, for example, at logon to determine if access to system 1000 will be granted. Plug-in manager 1014 can be used as a run time component, for example, to add and/or delete extensions to system 1000. Plug-in manager 1014 can thus be used to integrate new features and/or functionality, optionally made available from or by third party vendors. Plug-in manager 1014 can utilize, for example, Java*.war files to accommodate system 1000 extensibility. In addition, programming developed that could be viewed as a standard programming component could be uploaded to system 1000 via plug-in manager 1014. Lightweight Directory Access Protocol (LDAP) Directory Server 1048 can optionally be used to provide centralized authentication services, optionally as a platform tier 1003 component.

Learning Management System (LMS) classes 1017, persistence classes 1018, and snapshot classes 1024 can optionally be considered a fourth tier. LMS classes 1017 can include code components that define the semantic structure of the application. LMS classes 1017 can be implemented as object-oriented code, organized around concepts that "map" to real world objects. In an educational context, real world objects can be a course, identification of the course, the date(s) of the course, and/or a description of the course.

In one or more embodiments of the present invention, the system provides a framework for developing external applications and "hooking" them directly into system 1000. More specifically, the APIs 1040e provide application program interfaces for packaging and deploying extensions 1040d within system 1000. The APIs 1040e allow, for example, third-party vendors, developers, and institutions to build extensions 1040d, such as new applications, extend existing technologies, and integrate them into system 1000. In one or more embodiments of the present invention, APIs 1040e can allow, for example, third parties to develop extensions 1040d that extend system 1000 functionality. The API's can be utilized by developers to provide system 1000 functionality with regard to course announcements, documents and membership, security, calendars, announcements, gradebooks, and the like, as will be subsequently discussed. An extension 1040d can be developed utilizing the Java Servlet 2.2.x specification, which is incorporated herein by reference.

Persistence classes 1018 can be used to store data in database 1020. As shown, plug-in manager 1014 can utilize persistence classes 1018 to provide various user interfaces and APIs. Examples of persistence classes 1018 is a set of objects, classes and/or methods that third party developers can use.

Snapshot 1024 can be implemented to utilize event APIs 1026 in a conventional manner to import data into system 1000. Snapshot 1024 can interface with persistence classes 1018. For example, if system 1000 is utilized by a university, there may be a large amount of information stored pertaining to various students. Conventional systems can run programs, databases, and the like with regard to enrollment, staff assignments, room scheduling, etc. Snapshot 1024 can generate data files from the captured information for use in conjunction with system 1000. Snapshot 1024 can advantageously create data and/or sets of data grouped in a particular way. As such, data may be grouped semantically around terms or types of data. Snapshot 1024 can optionally be run from, for example, an operating system, e.g., DOS and/or Unix, command line and/or shell. This will permit a user to write programs that can be processed as application tier data.

An embodiment of platform tier 1003 can include and/or utilize, for example, server 1038, server 1040, LDAP server 1048, and/or associated scripting or interfaces 1030, 1032, 1034, 1036, 1046, 1016, 1018 and/or 1042. PerlEx 1030 (a known plug-in for Windows NT Web servers), and ActivePerl 1032 (JScript or ActiveState can also be used in lieu of Active-Perl) are used in connection with scripting services. Active-Perl 1032 also utilize database interface (DBI) 1034, which can interface e.g., locate and load, Database Driver-Open Database Connectivity (DBD-ODBC) 1036 which, in turn, can communicate with database 1020. DBD-ODBC 1036 is a known set of APIs, created by Microsoft, Inc. that defines how to move information in and out of a personal computer database. A different DBD-ODBC can be utilized for each different database. PerlEx 1030, ActivePerl 1032, DBI 1034, and DBD-ODBC 1036 can reside in or run on server 1038. In an embodiment, server 1038 can be a conventional Internet Information Server (IIS) (Microsoft Corporation, Redmond, Wash.) that is used to implement server-side scripting.

Server 1040 centralizes application services, such as web server functionality, and provides access to data tier 1005. Server 1040 can also optionally provide enterprise-level security. Java Database Connectivity (JDBC) 1046 is a standard API that consists of a set of classes and interfaces written in the Java programming language. JDBC 1046 can be used to write database applications and execute System Query Language (SQL) statements for use in connection with database 1040, which can store various locales. Accordingly, various views 1054 and stored procedures 1056 can be utilized and associated with database 1020 to associate and/or store locales with respective web pages. In an embodiment of the present invention, database 1040 can also utilize a separate server (not shown). Server 1040 can optionally be integrated with existing back-office systems (not shown), and provide authentication, security services and/or data integration functionality with respect thereto.

In one or more embodiments of the present invention, server 1040 can include a learning system 1040a that offers course management, and preferably utilizes an open architecture for customization, and a scalable design that allows for integration with student information systems and authentication protocols. As will be discussed herein, learning system 1040a can provide course content, communication capabilities, and tools such as digital drop boxes and calendars.

Figure 5:
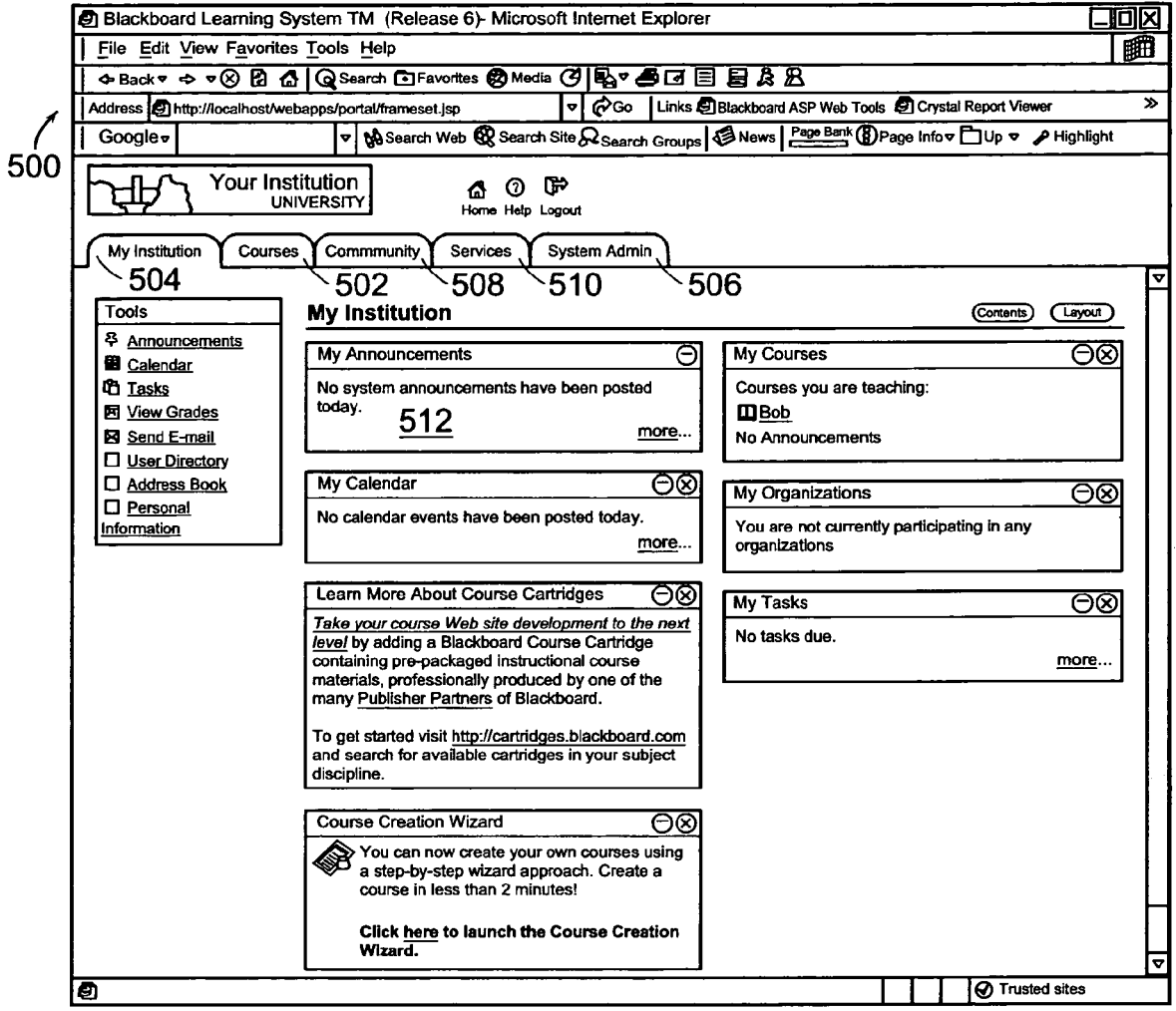
FIG. 5 shows a screen display of the home page according to the present invention that a user will view.
Figure 24:
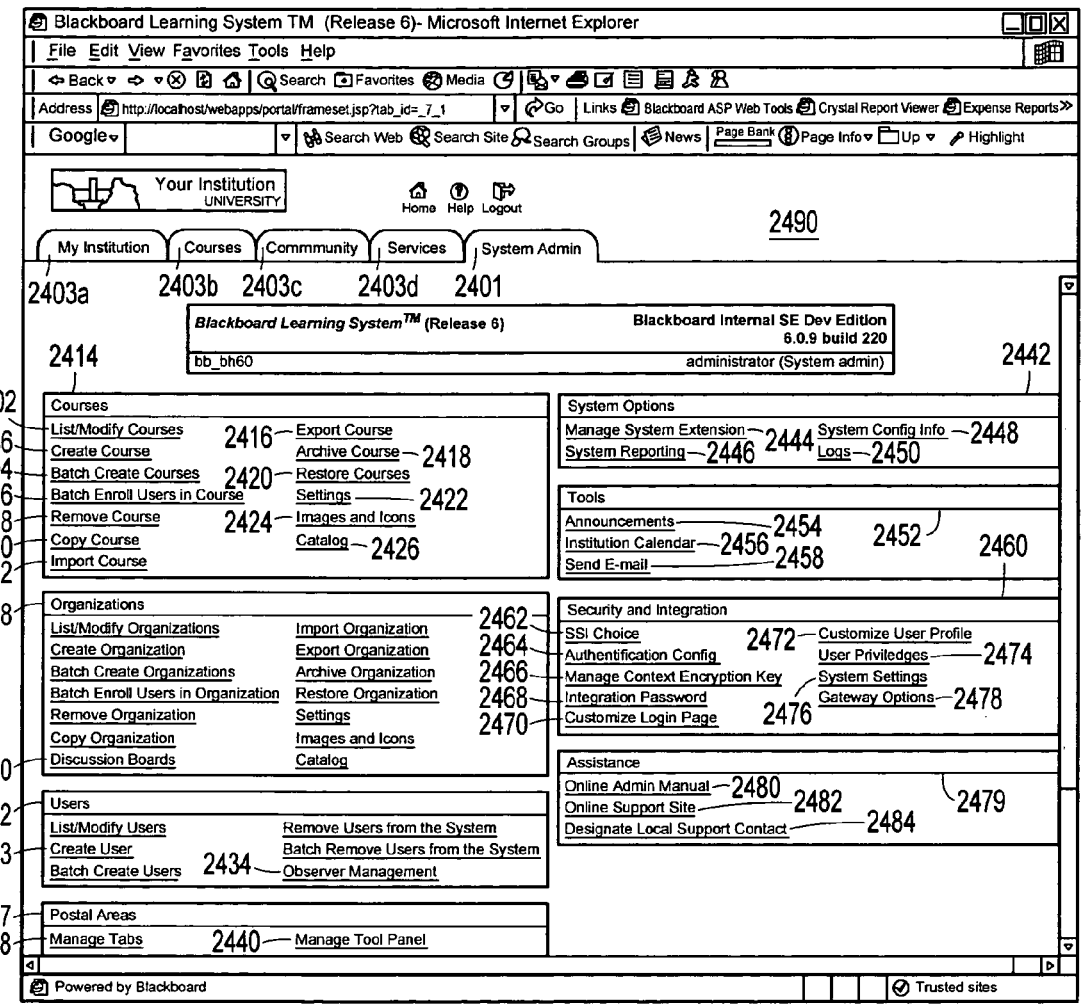
FIG. 24 is a screen display of an advanced course and portal manager web page according to the present invention.
Figure 26:
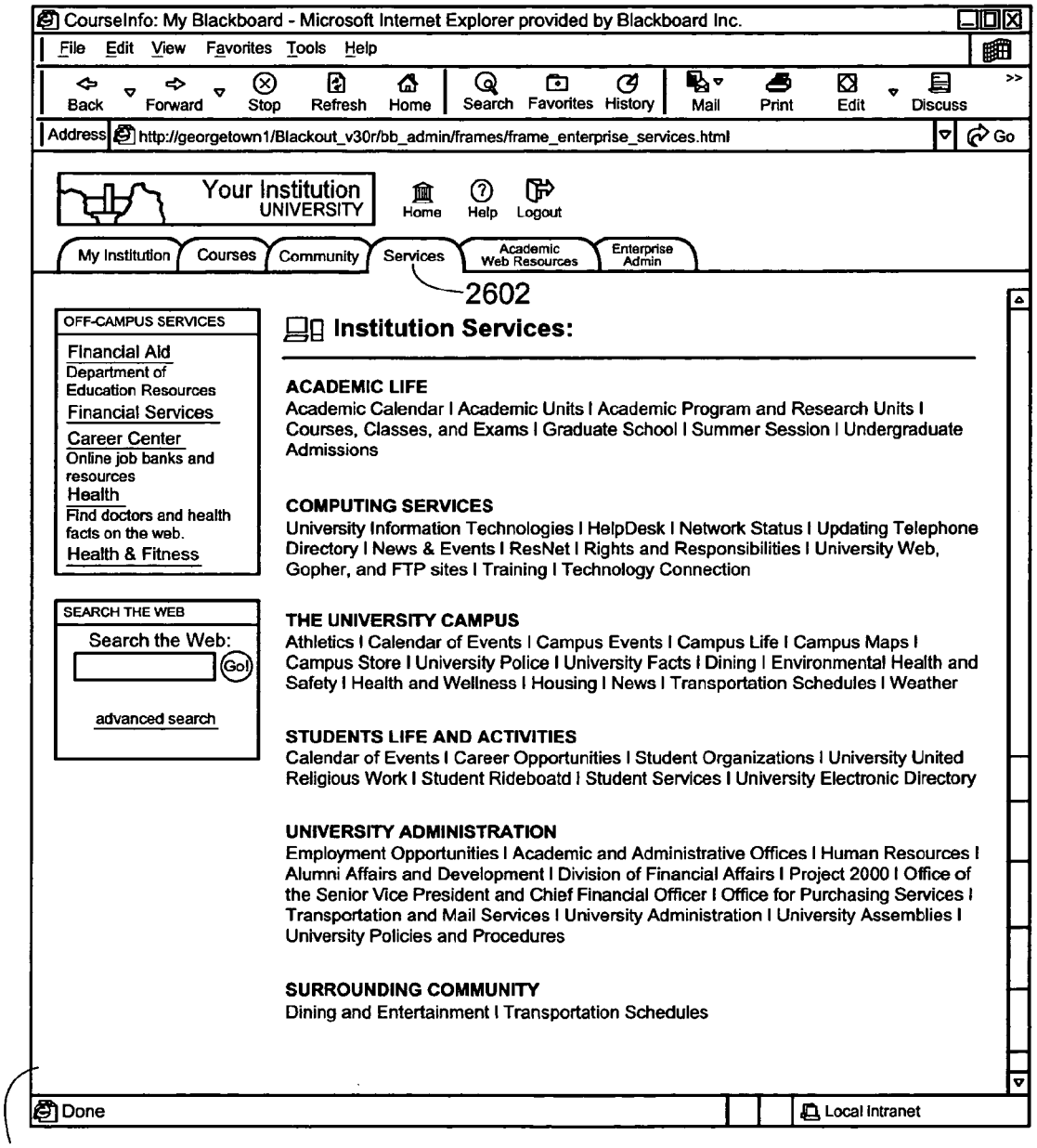
FIG. 26 is a screen display of a services web page according to the present invention.

Portal system 1040b can optionally be provided as a logical extension of learning system 1040a, to provide an optionally customizable community portal environment that substantially unifies academics, commerce, communities, and administrative services online through one integrated interface. An exemplary portal page is shown in FIG. 5, which will be discussed in detail herein. Transaction system 1040c can be utilized to make financial transactions with dining services, bookstore sales, campus commerce such as vending, laundry and copying, building access, as well as business with off-campus merchants. application Ser. No. 10/373,924, filed on Feb. 25, 2003, and entitled Method And System For Conducting Online Transactions, describes transaction system 1040c in greater detail, and is incorporated herein by reference. Triggers 1050, e.g., procedures, can be used to interface database 1020 with an epicentric database 1052, which can be used to store, various views, data and/or procedures used to render portal pages, such as shown in FIGS. 5, 6, 12, 24, 25, 26 and/or 28. Accordingly, various views 1054 and stored procedures 1056 can also be utilized and associated with database 1052. Although FIG. 24 shows that there are six portal modules, i.e., "My Institution" tab 2422, "Course" tab 2424, "Academic Web" tab, "Community" tab 2426, "Services" tab 2428, and "The Web" tab 2429, in Portal Areas 2406, system 1000 may include other numbers of portal modules.

Preferably, Chameleon 1058 is a Java-based import/export utility that can translate a course created on one server 1040 to an intermediate format such as an FIMS Content & Packaging format (IMS Global Learning Consortium, Burlington, Mass.) which can be XML 1060 format, so it can be exported to another server (not shown).

Figure 1C:
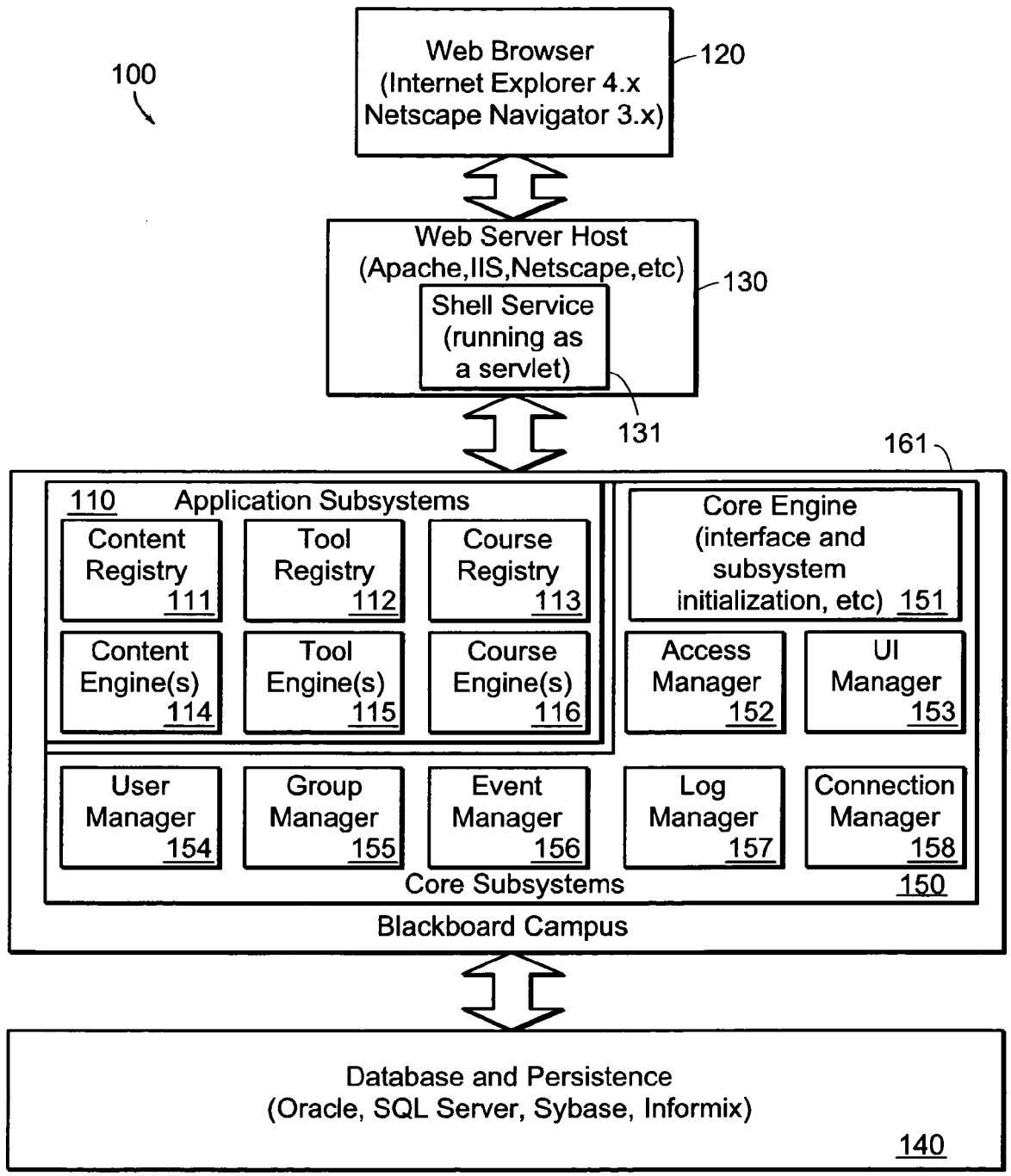
FIG. 1C shows a more detailed architectural block diagram of an embodiment of an education support system according to the present invention.

System and Architecture of FIG. 1C

The system architecture shown at FIG. 1C, generally at 100, represents an embodiment of the present invention relating to the web browser, web server, application and database components. What is shown in FIG. 1C may be incorporated as part of FIG. 1A. Moreover, it is also an embodiment that may utilize the components described in FIG. 1B.

Referring now to FIG. 1C, system 100 comprises application subsystems 110, a web browser 120, a web host server 130, a database subsystem 140, and core subsystems 150. Application subsystems 110 and core subsystems 150 can reside on server 161. Web host server 130 further includes a shell service 131. Applications subsystems 110 further includes a content registry 111, a tool registry 112, a course registry 113, one or more content engines 114, one or more tool engines 115, and one or more course engines 116. Core subsystems 150 further includes a core engine 151, an access manager 152, a user interface (UI) manager 153, a user manager 154, a group manager 155, an event manager 156, a log manager 157, and a connection manager 158.

In an embodiment of the present invention, system 100 is implemented in a client-server network topology. Users who may have one or several roles, such as a student, instructor, teaching assistant (TA), or administrator, access and interact with system 100 via web browser 120. More specifically, a user accesses application subsystems 110 and core subsystems 150 through shell service 131 servlet providing a standard Internet interface including, but not limited to, Transmission Control Protocol/Internet Protocol (TCP/IP), HyperText Transport Protocol (HTTP), Simple Mail Transfer Protocol (SMTP), and File Tranfer Protocol (FTP) to the user via web browser 120 running on a standard computing platform such as a personal computer or workstation. Specifically, shell service 131 servlet uses the URL-encoded information contained in HTTP requests received from web browser 120 clients to invoke the corresponding requested application subsystem 110 or core subsystem 150. Shell service 131 servlet also provides user authentication and session management.

Figure 3:
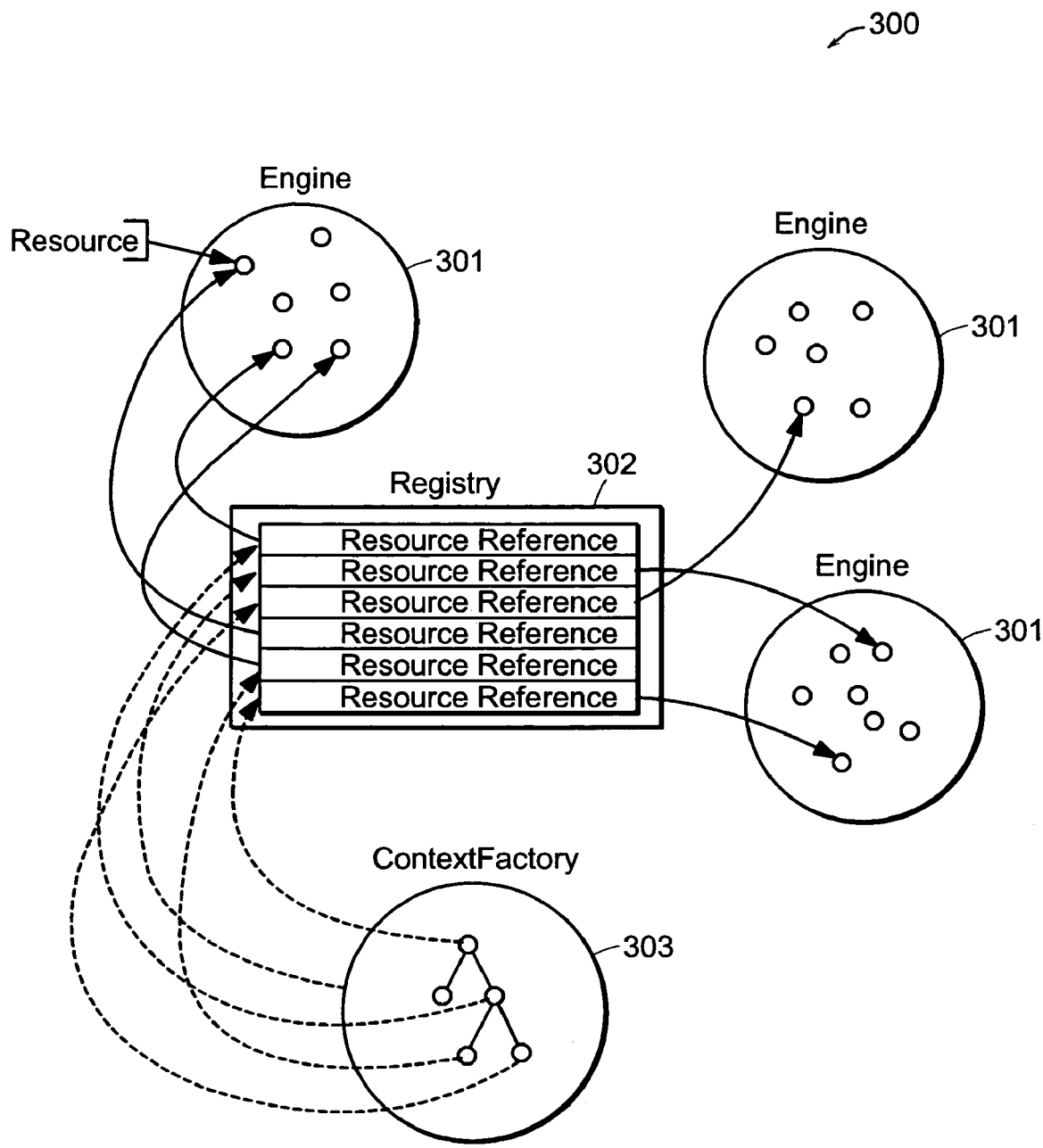
FIG. 3 shows the interaction of an embodiment of an engine/registry model according to the present invention.

Application subsystems 110 function in conformance with an engine/registry model 300 as described in FIG. 3. Referring to FIG. 3, engine/registry model 300 includes one or more engines 301, a registry 302, and a context factory 303. Context factory 303 contains information mapping a user to one or more courses associated with that user.

Engines 301 include, but are not limited to, content engine(s) 114, tool engine(s) 115, course engine(s) 116, and core engine 151, shown in FIG. 1C. Registries 302 include, but are not limited to, content registry 111, tool registry 112, and course registry 113, shown in FIG. 1C. Course engine(s) 116 creates a course by associating a set of educational materials to which a student user has access, by organizing references to these informational items as contained in content registry 111. Course engine(s) 116 queries content registry 111 for an index of content engine 114 associated with a particular resource being requested by a user.

Content engine(s) 111 includes an assessment engine that generates quizzes to assist and instruct users in the use of system 100. For example, one such quiz provided by an assessment engine of system 100 provides step-by-step instructions to an instructor for building a course. The quiz is then administered on-line to the instructor to allow him to build a customized course to be provided using system 100.

Unlike content engines 111, which represent actual course content, tool engine(s) 115 generally includes installable programs that provide capabilities available for use with a plurality of courses and not permanently associated with any particular course or courses.

Instructors have different modes of teaching. Further, the same instructor may emphasize different modes of teaching depending upon the subject being taught. For example, some instructors emphasize individual homework while others prefer a group or collaborative approach. System 100 supports a variety of teaching methods. By invoking a particular set of tool engines 115 during interaction with the assessment engine, an instructor can customize a course offering to conform to his/her preferred mode of teaching. An example of a tool engine 115 is a chat/whiteboard communication tools (synchronous and/or asynchronous) provided by system 100 that allows for student group interaction and collaboration associated with a given course. Other tools include, but are not limited to, announcements for broadcast of group oriented messaging, a calendar mechanism for storing date related events and information, a discussion board for posting questions and answers in a threaded discussion format, notes-editing, group pages, and e-mail services. Further capabilities provided by system 100 include, but are not limited to:

(i) a catalog listing of all courses available,
(ii) a method for student users to enroll in either open enrollment or closed enrollment situations,
(iii) a method for course creation including course templates and course themes, a course/page editor and viewer, a site page editor and viewer,
(iv) a method for making and disseminating announcements, a calendar function, a chat board in the nature of an on-line discussion, a white board allowing group interaction and display of free-form information using, for example, Microsoft Paint™,
(v) a method for sending e-mail between instructors and students and groups of students, a list of course members and links to their web pages, a list of groups and links to their web pages, a file sharing area, means for providing assignments to student users,
(vi) a method for conducting a variety of types of student assessments (e.g., testing),
(vii) a method for providing lesson material in sequential format, means for adding and removing users, help documents, maintaining a grade book and progress tracking, links to personal web pages or home pages, and a resource library containing references to all uploaded content.

Course templates allow instructors to easily reuse a course structure for subsequent courses. Course themes allow the instructor to affect the look and feel of the course site. The secondary text editor which resides on system 100 as an application subsystem as a system tool permits instructors and students to have an enhanced ability to edit content provided by the system. Referring now to FIG. 1C, the secondary text editor, in connection with browser 120, may be implemented at tool engine 115, as will be described in greater detail subsequently.

Access control manager 152 creates an access control list (ACL) for one or more subsystems in response to a request from a subsystem to have its resources protected through adherence to an ACL. System 100 provides multiple levels of access restrictions to enable different types of users to effectively interact with the system, such as, access web pages, upload or download files, view grade information, while preserving confidentiality of information.

User manager 154 integrates the student-centric information with existing network-based systems of an associated educational institution. In an embodiment of the present invention, user manager 154 includes a runtime component and a batch component that periodically access and extract information contained in external institution databases in order to maintain current student-centric information. User manager 154 facilitates integration of system 100 with existing or legacy network-based systems, including proprietary institutional electronic networks and systems related to grades, registration, course schedules, financial aid, etc., without requiring modifications to existing systems or security procedures.

According to an embodiment of the present invention, application subsystems 110 and core subsystems 150 interface with database subsystem 140 using, for example, the Java Database Connectivity (JDBC) standard interface to allow use of any relational database including, but not limited to, SQL and DB2 Universal Database standards.

Figure 2:
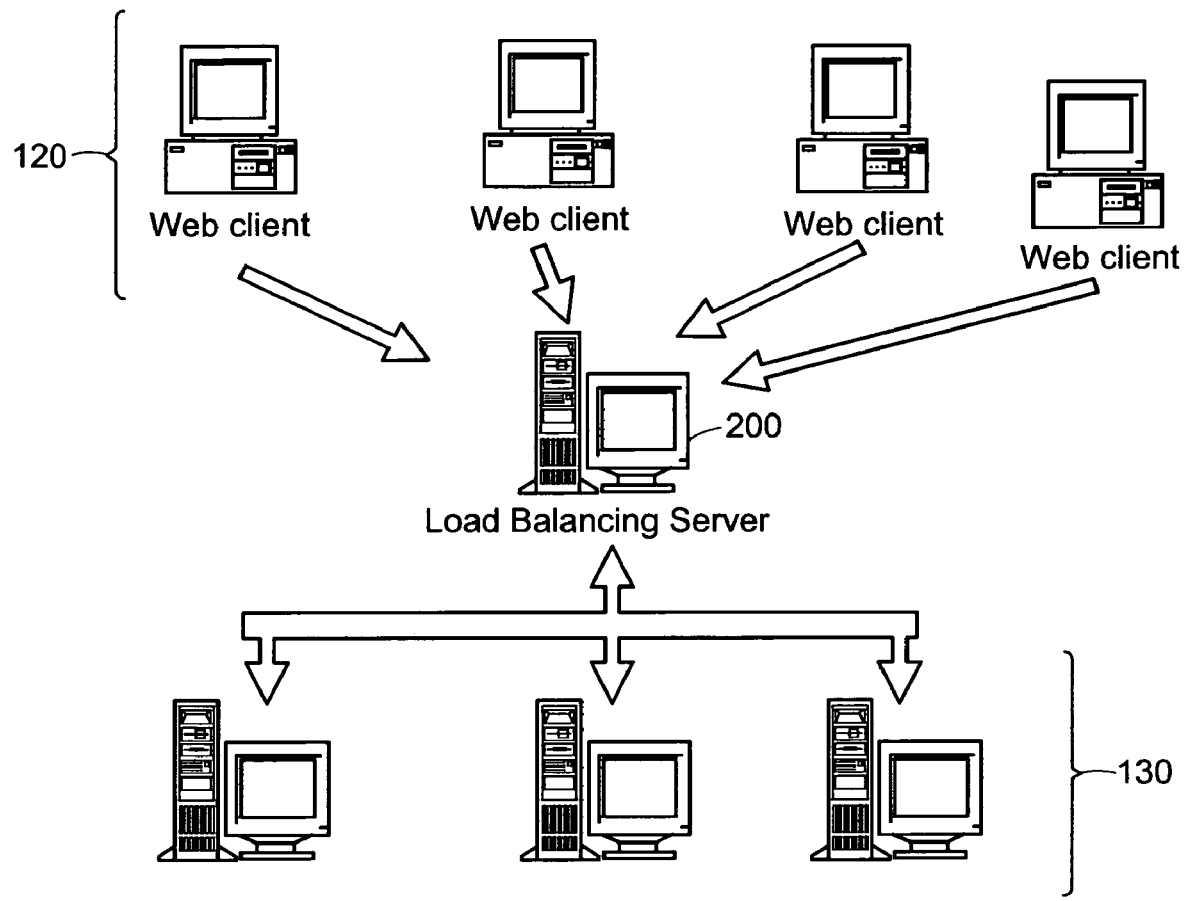
FIG. 2 shows an architectural diagram of an embodiment of the present invention implementing load balancing to achieve scalability.

Scalability is provided by the modular system architecture described in FIG. 1A, and, in an embodiment of the present invention, through use of a load balancing server 200 as shown in FIG. 2. As users are added to the system and access the system as web browser 120 clients, additional web server hosts 130 may be added to the overall system to provide a matching increase in system capacity. Load balancing server 200 allocates new web browser clients 120 to the least-busy web server host 130 for servicing. By balancing the load across all web server hosts 130, system 100 prevents response times from become unacceptably long for any one given user. In an embodiment of the present invention, load balancing server 200 maintains one or more metrics concerning the percent utilization for each web server host 130 and selects the least-busy web server host 130 based upon application of a load balancing algorithm to these utilization metrics.

In an embodiment of the present invention, upon logging onto system 100, shell service 131 servlet renders and presents to the user via web browser 120 a personalized web page that includes a student-centric aggregation of data that may include, without limitation, personal class schedules, grades, a rolled-up or consolidated calendar, links to related tools, student group events for groups of which a particular student is a member, and class announcements.

System 100 executes on a variety of computing platforms including, but not limited to, UNIX™ servers, NT™ servers, Solaris™, HP™, and Linux™. System 100 supports popular web browsers including, but not limited to, Netscape Navigator™ and Microsoft Internet Explorer™, and, in an embodiment, does not require plug-ins at the web browser client.

In one or more embodiments of the present invention, an automated upload or import capability is provided in which a user may upload a file to the system and system presents or displays the information contained in the uploaded file in a manner that preserves the grouping of the information, including fields and other categorization, based on the file type. System 100 provides a standard import file format to accomplish this preservation of native grouping of information. In one or more embodiments of the present invention, an automated upload capability imports an uploaded file in both native and HTML formats, maintaining the file formats associated with the native format for the native formatted file and converting the native format into HTML formats for the HTML formatted file.

System 100 supports a variety of business model. For example, an institution may charge each student for courses taken via system 100, or an instructor may use system 100 to process individual student tuition payments by providing links to e-commerce facilities.

Figure 4:
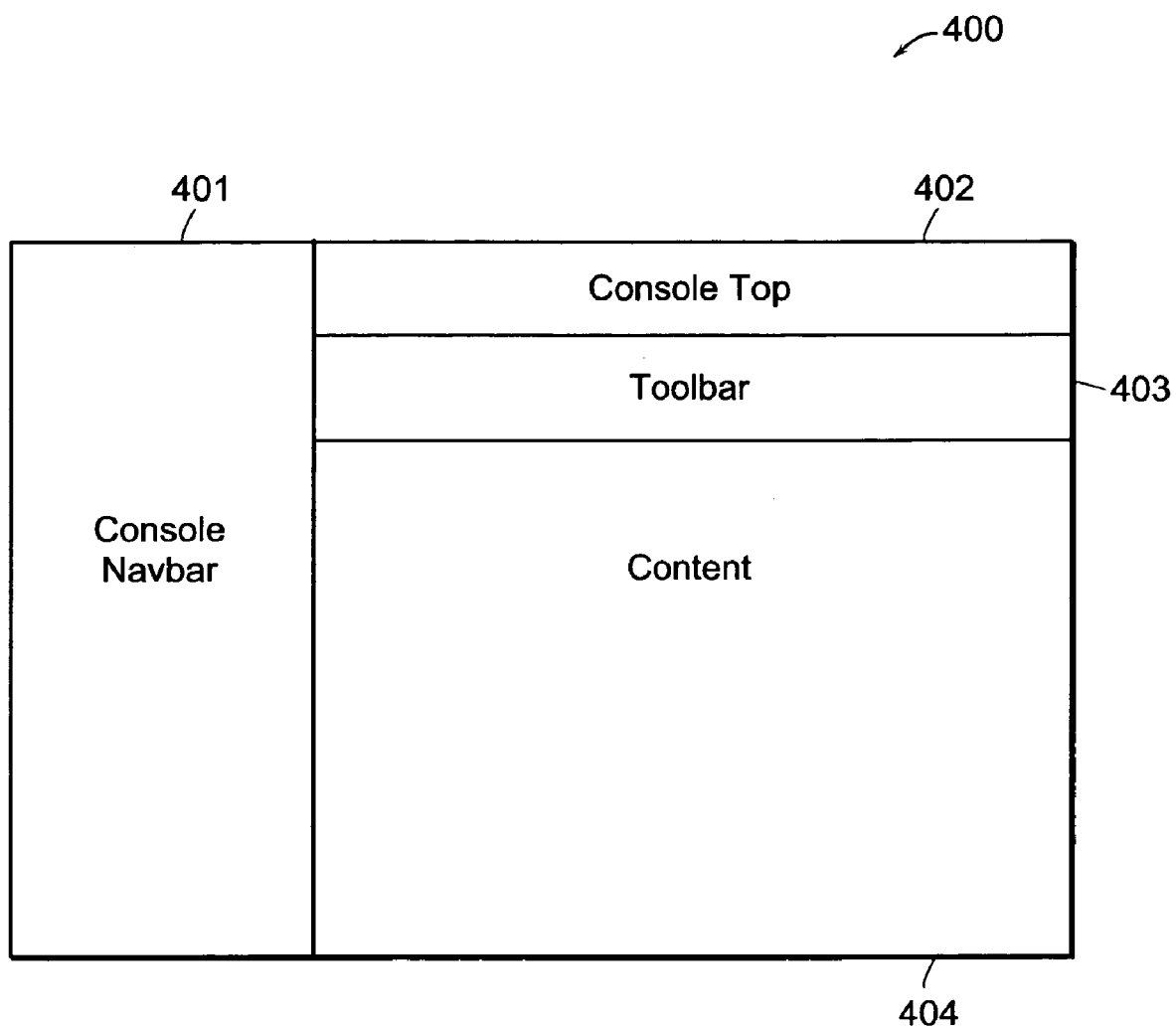
FIG. 4 shows a segmentation of a user interface according to the present invention.

Referring to FIG. 4, one or more embodiments of system 100 supports a plurality of environments 400 in a single application. Examples of different environments 400 supported include a personalized web page of student—centric information accessed by a student user and the administrator's environment used for maintenance of the system. Certain parts of the system 100 application are consistent across all supported environments 400, while the appearance to the user may vary for different environments 400. An environment 400 is defined by console frames that surround the application areas. An example of an environment 400 defined by a four-frame page is shown in FIG. 4. The environment includes console navbar 401, and console top 402, a toolbar 403, and content 404. Console navbar 401 and console top 402 may be controlled by a console frameset, while toolbar 403 and content 404 may be controlled by a separate frameset. For example, toolbar 403 "buttons" are generally located in the top frame of an application area. This approach allows users, and especially instructors, the ability to customize their course offerings while conforming to consistent user interface features that allow application areas to be shared across environments 400. Student users and instructors interact with system 100 via the same basic environment 400 format.

FIG. 5 shows a screen display of the home page 500 that a user will view. This view is customizable in accordance with the requirements and desires of any user. The home page may also be institutionally branded, so that the "My Institution" logo 504 shown in FIG. 5 would display the name of the institution that has licensed the product. The home page also provides the user with direct access to personal, course, and institutional tools. As an added feature, the system enables each user to select from a large number of news and information services, so that everyone who uses the system will have access to the most recent and relevant information for them. All of this functionality is provided in one place, the home page, so that the institution can provide a sense of community on campus, with courses, and with a view to the external information sources.

One or more embodiments of the present invention include Community tab 508 and Services tab 510. Community tab 508 provides a community common area that lists organizations specific to each user, the organization catalog for the institution, and an institution-wide discussion board. Organization Web sites, accessed through Community tab 508, allow organization members to view information about the organization, such as announcements, calendar events, discussion boards and rosters. Discussion boards allow user to communicate with fellow organization members and classmates by posting messages on particular topics.

Community tab 508 provides a common areas and the ability to create common areas. For example, online areas dedicated to clubs, organizations, and other extracurricular activities may be created using community tab 508.

Using Services tab 510, a services common area may be presented that contains links to other institutional offerings outside of system 100. The links may be set by the system administrator, using System Admin tab 506. For example, links can be provided for users to report any security issues to the institution, connect to the card catalog, pay for classes, and register for classes.

Figure 6:
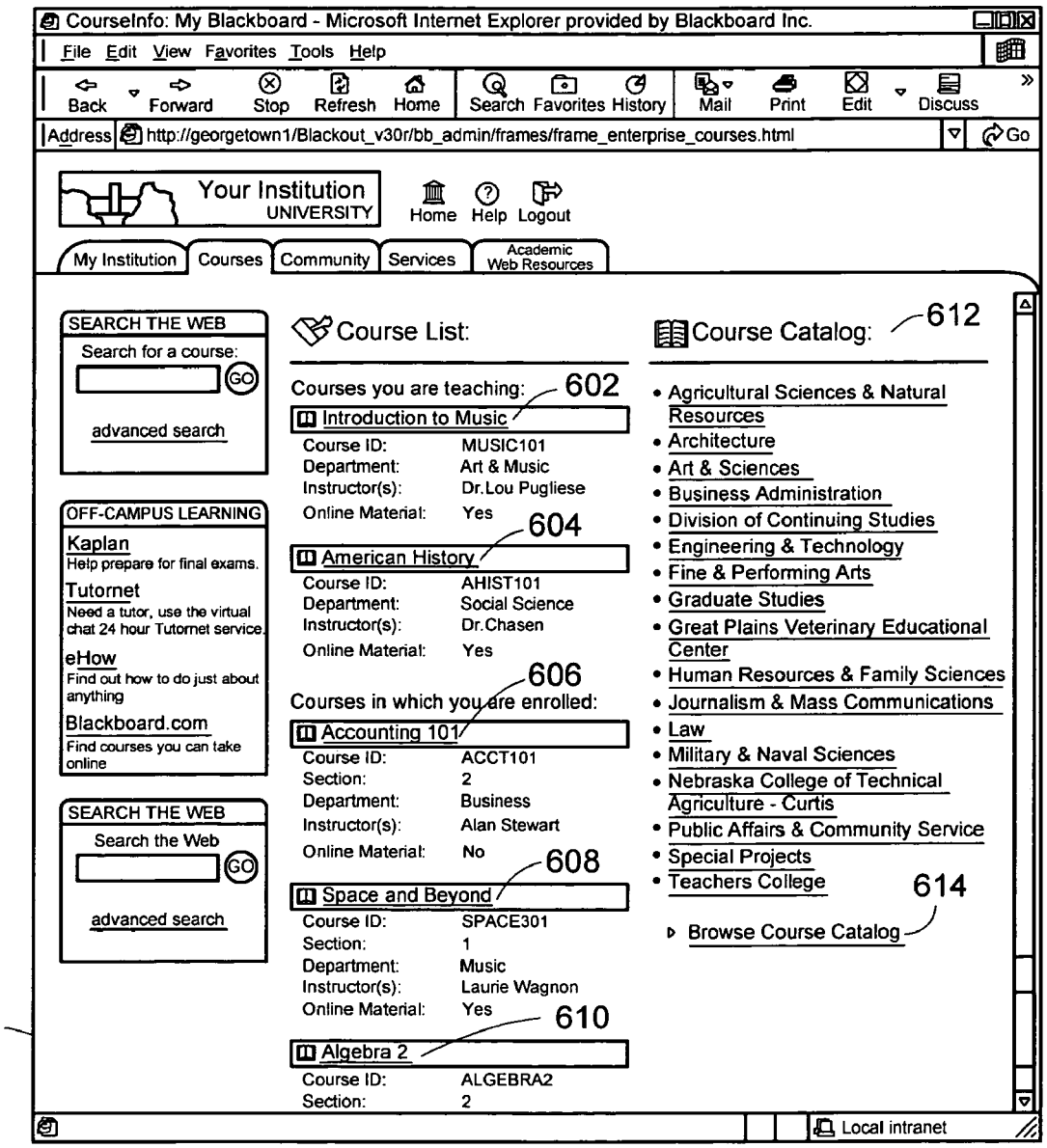
FIG. 6 is a screen display of a web page according to the present invention that shows a course list and course catalog that are available to student users.

By selecting the "Courses" tab 502, the user will be linked to a Course page 600 as shown in FIG. 6. Course page 600 provides direct links to the courses that they teach (602, 604) and/or are enrolled in (606, 608, 610). To access the course web-site, the user will click on the course title, such as at 602, 604, 606, 608 or 610, and he/she will be automatically linked to a web page associated with that course. The user also has the opportunity to browse the course catalog 612 by selecting the links on the right side of the page 600, where courses are listed according to category. The user may also search through the course search engine by selecting the Browse Course Catalog Link 614.

Figure 7:
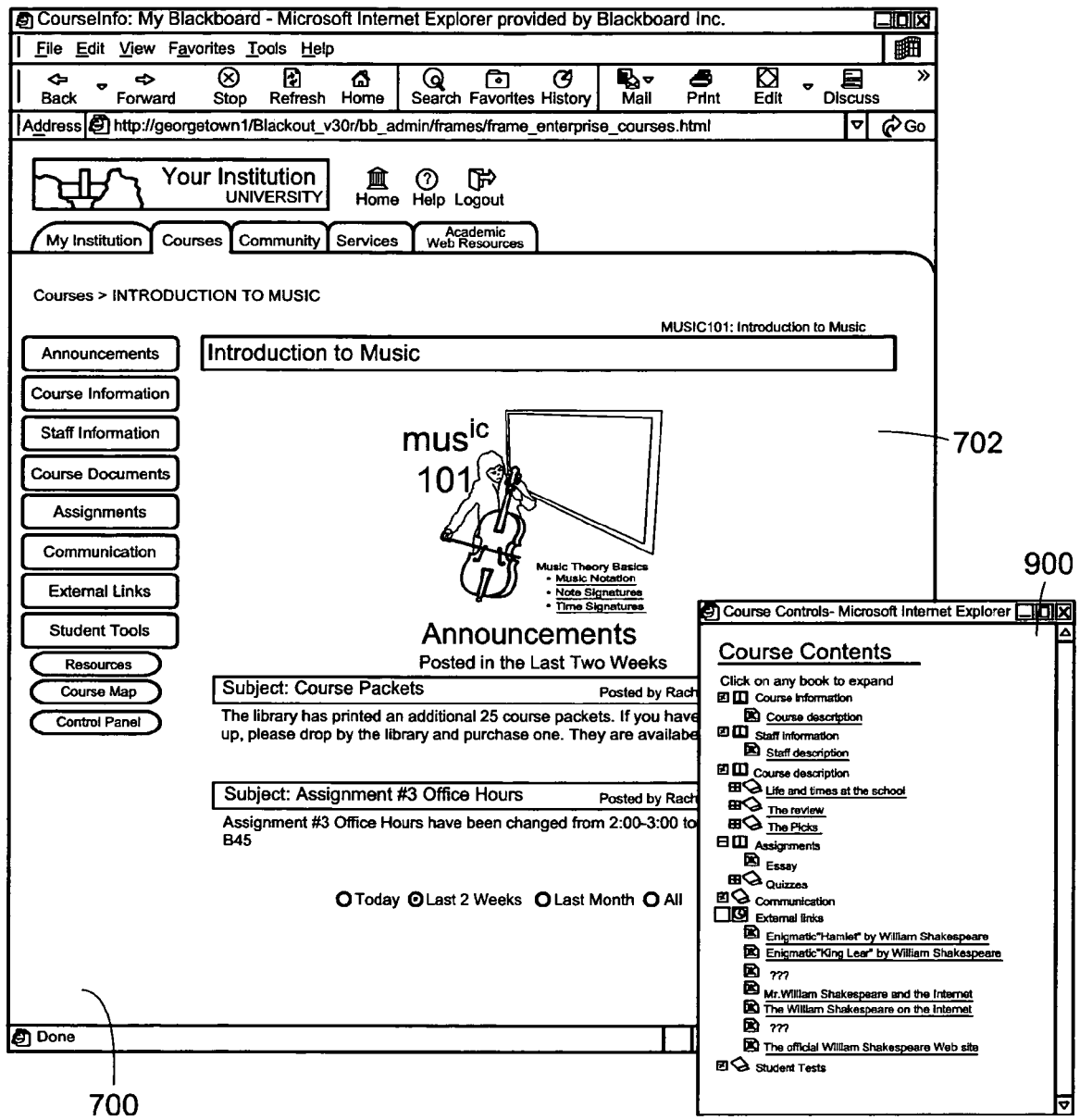
FIG. 7 is a screen display of a default view for a course web site according to the present invention.

For example, by selecting the link 602 for the Introduction to Music course, which the user in this example is teaching, the user is shown the web page 700 illustrated in FIG. 7. The default view for the course web site 700 in this embodiment is the Announcements page 702, as shown in FIGS. 7 and 8. As seen at the lower part of the screen in FIG. 8, the user has the option of selecting various types of views by filtering out certain time-based announcements, i.e., today, last 2 weeks, last month, or all, by selecting button 802. The Announcements section can also be linked to, after the user has left that page, by simply clicking the Announcements button 804 on the navigation toolbar 806 on the left of the web page.

Figure 9:
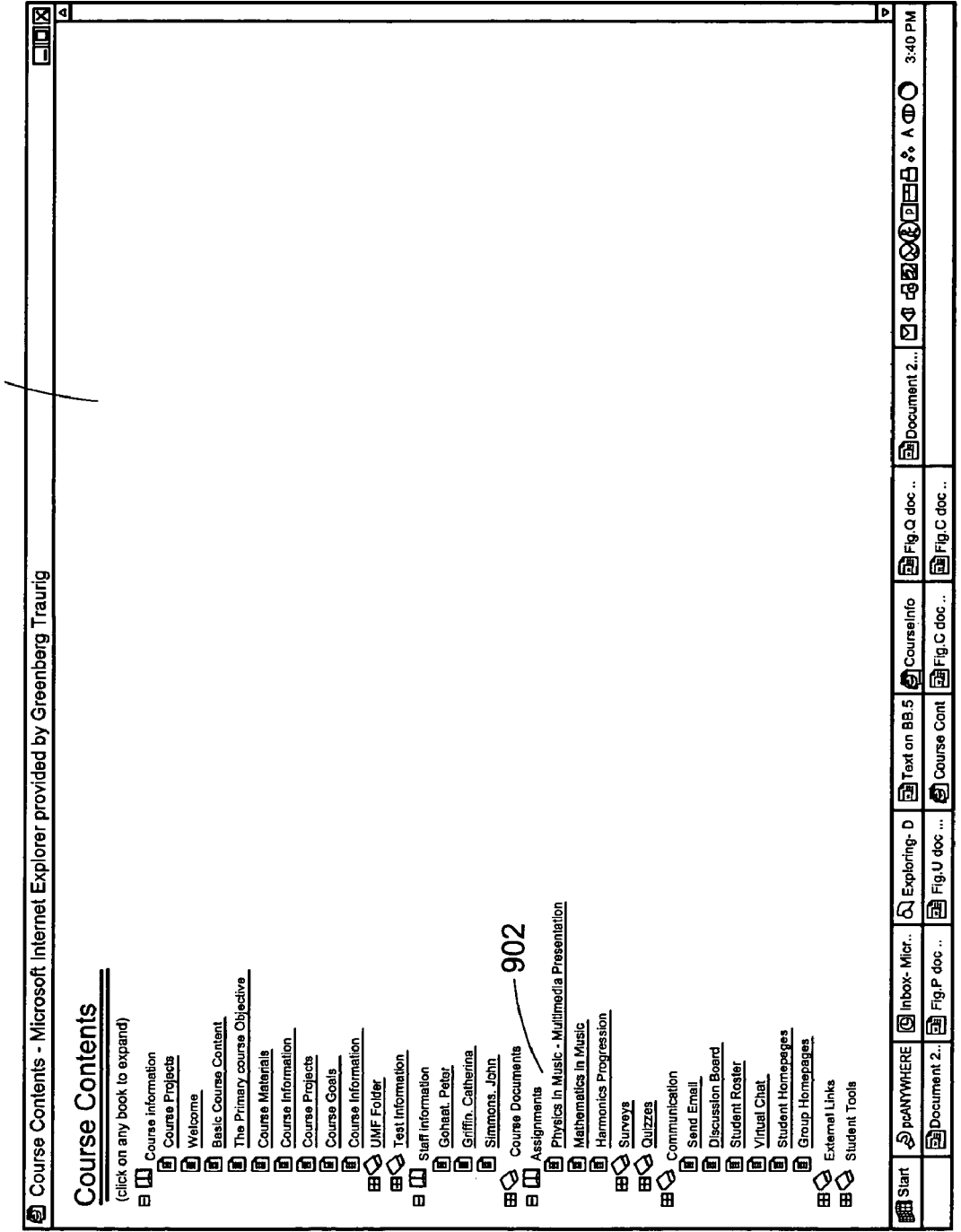
FIG. 9 is a screen display of a course contents window according to the present invention.

Within the course web-site environment, the user is able to access all of the relevant course material and communication features as shown herein. The entire course outline may be displayed in a separate browser window 900, as shown in FIG. 9. At the browser window, the course contents are available for perusal and hyperlinking as desired. FIG. 8 shows the entire web page for Introduction to Music in two parts: an upper part and a lower part, which is scrollable as desired. One of the function buttons provided is labeled "Course Map" 808, which upon being clicked will pop-up the Course Contents window 900. The user will be able to expand or collapse the various headings provided in order to drill down into the entire course contents as currently configured. So, for example, the user can expand the Assignments section 902 and get a linkable list of all the assignments that have been created for the course to date. Any of the assignments may then be clicked for easy access. This separate window 900 is especially advantageous since it allows users to browse the entire course, regardless of their current location in the web-site.

Figure 10:
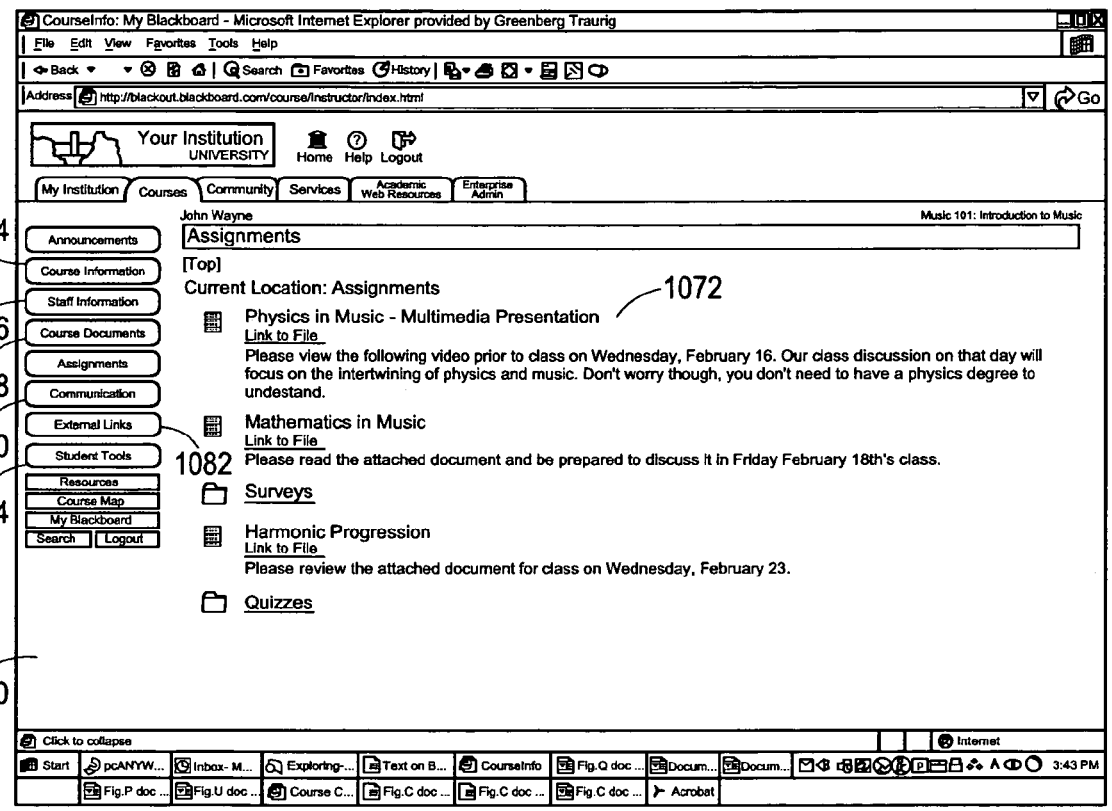
FIG. 10 is a screen display of an assignment web page according to the present invention.

By selecting any of the Assignments links 902, the user would be linked to the web page 1070 set forth in FIG. 10. This web page lists each assignment that has been compiled for the course, each of which can be linked to web pages that contain the full details of the particular assignment. The assignment page 1070 shown in FIG. 10 may be viewed by clicking the "Assignments" button 804 on the toolbar at the left of the course home page shown in FIG. 8. In general, any of the functions that are provided by toolbar buttons on the navigation bar at the left of the course home page will be available in any page accessed for that site, so that easy navigation may be had and the user may jump around and visit any desired portion of the course web site no matter where the user is currently located. Likewise, the Course Contents window provides similar functionality as described above.

As shown in FIG. 10, folders that have quizzes and surveys may be linked to by viewing the assignments web page. Clicking on these folders will present the student and/or instructor with a quiz that may be taken on-line. The answers may be graded automatically, in real time, as soon as the student has finished the quiz. This assessment functionality will be explained in greater detail subsequently.

In general, assignments may be provided in virtually any type of media that he instructor has at his disposal. For example, shown in FIG. 10 is a link 1072 to a multimedia presentation for "Physics in Music" that will give the student a content-enriched lesson that will be useful prior to the next lesson. Assignments may also be as simple as a text-based file that the student would read in preparation for the required class session.

In addition to selecting the Assignments page 1070 or the Announcements page 700, the user may select the Course Information button 1074 on the toolbar. This will link the user to a web page that will list information provided by the instructor that is useful to the student, such as an introductory welcome message or links to helpful resources. Resources otherwise found on other parts of the course web site may also be shown here if desired by the course web site developer. Links may be in the form of URLs to other web pages or resources or to folders that include groups of logically related resources.

Selection of the Staff Information navigation button 1076 will provide the user with a web page that will list each instructor, TA, or professor, along with an abstract listing office hours, address, telephone number for each, as well as a link that be clicked to send an e-mail. This gives the student with quick, easy access to any instructor as may be desired throughout the course. Images and other types of multimedia files may also be made available at this page for enhanced content viewing.

Figure 11:
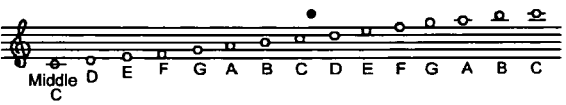
FIG. 11 is a screen display of a course documents web page according to the present invention.

The user may select the "Course Documents" link 1078 shown in the navigational toolbar, after which the web page 1100 on FIG. 11 is provided for that course. This provides the user with immediate access to all documents relevant to the course. As a student, the user has access to all of the course materials, including additional links to information on the web that will enhance the instructional experience. As an instructor, the user has the ability to post documents of numerous file formats and from disparate locations.

Figure 12:
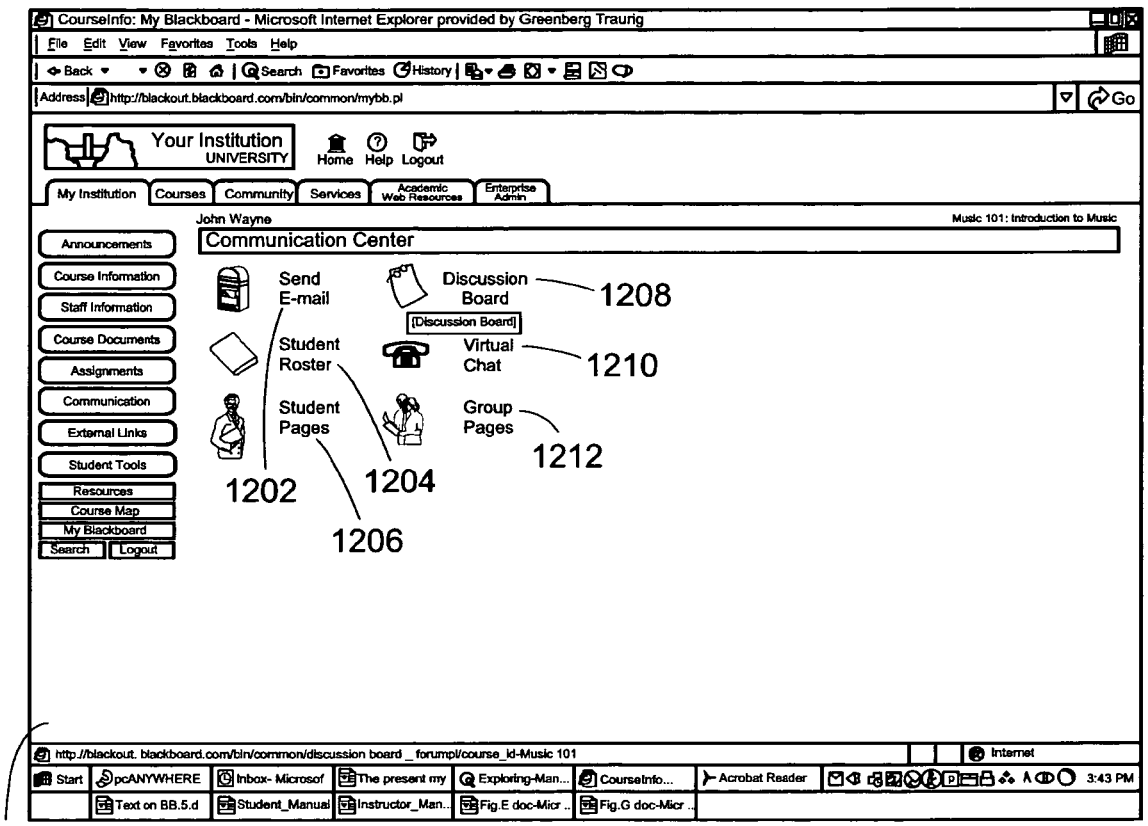
FIG. 12 is a screen display of a communication center web page according to the present invention.

By selecting the "Communication" tab 1080 shown in FIG. 10, the student is provided with the Communication Center web page 1200 as shown in FIG. 12. In this area, the user has at his/her disposal many different ways of establishing communications with other users of the system as well as accessing other areas of the system for various types of information. The user has access to an e-mail utility 1202, a student roster list 1204, a list of student homepages 1206, a discussion board 1208, a virtual classroom chat 1210, and a group pages link 1212.

Selection of the Send E-Mail link 1202 loads a web page with various links that allow the user to send e-mail to individuals registered for the course, or to students only, or to instructors only. The e-mail function is accomplished via web-based e-mail and allows for users to send attachments, as in many existing e-mail packages available today. Selection of the Student Roster link 1204 displays a web page that lists all of the students registered for the course, along with contact information if allowed by the student, such as phone number, address, and e-mail address. Selection of the Student Pages link 1206 provides a web page with links to the homepage for each student in the class.

Figure 13:
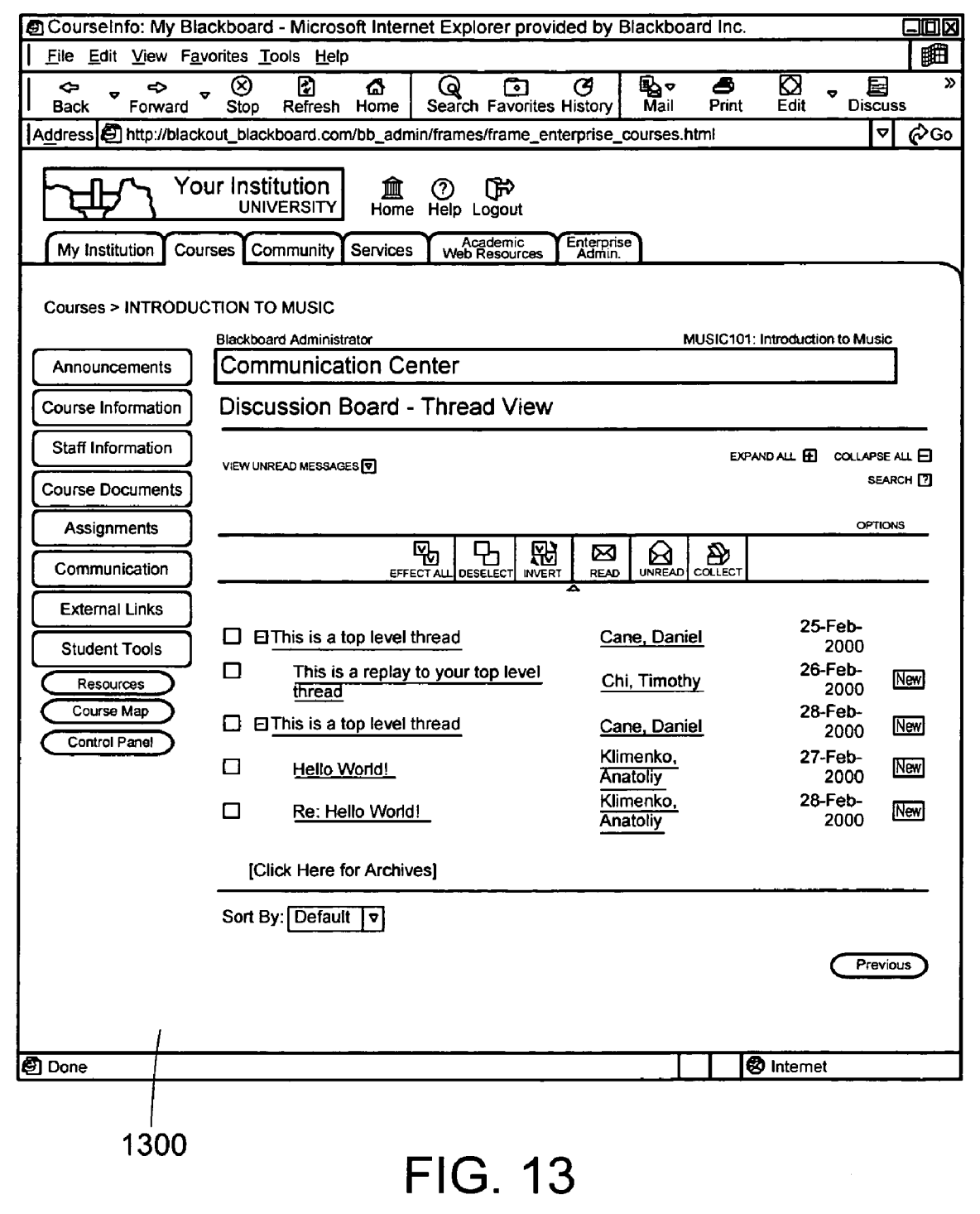

Another very effective communication tool is the asynchronous Discussion Board 1300, as shown in FIG. 13, which is displayed by the student selecting the Discussion Board link 1208. Students can access this for threaded discussions that are archived for easy retrieval. By using the discussion board, students can help each other learn even more easily outside of regular class hours. It can also be used as an effective method for instructors and TAs to provide a tutorial tool for out-of class questions and discussions that need to be saved for the purpose of sharing with the rest of that class. This utility operates in accordance with techniques well known in the art.

Figure 33A:
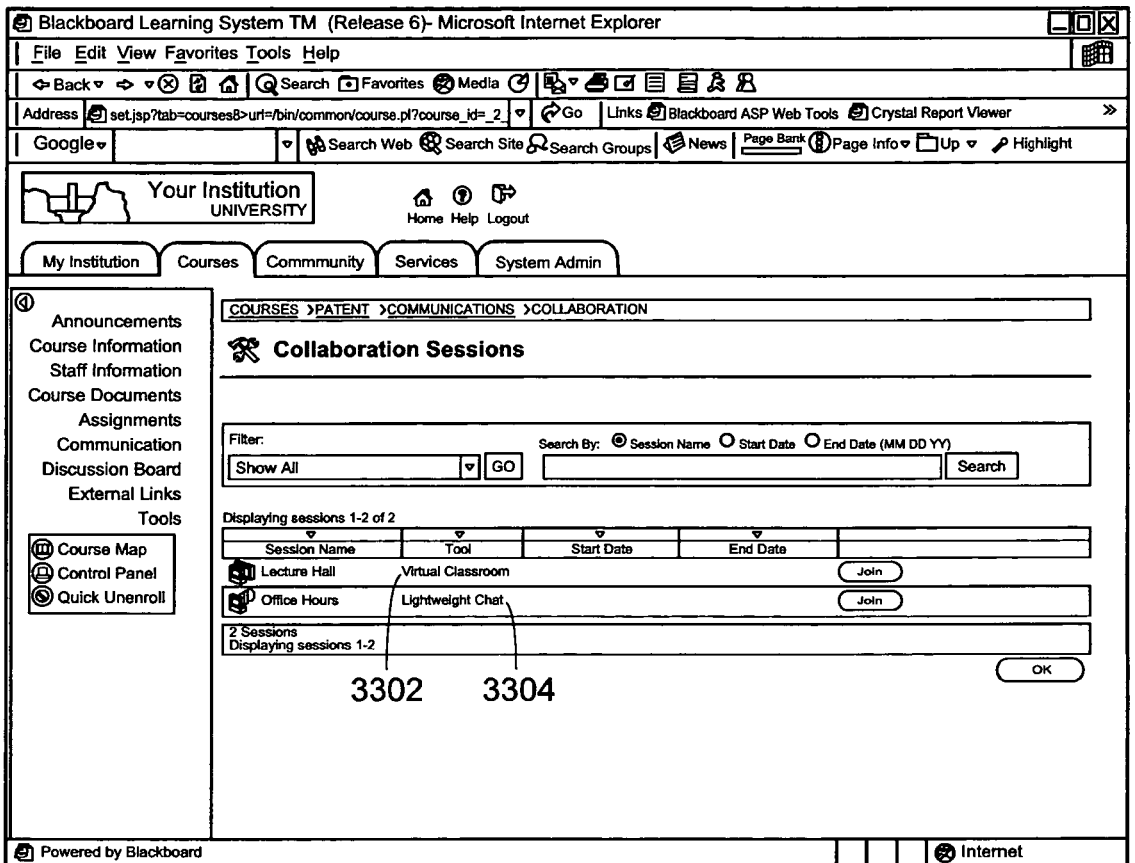
FIGS. 33a and 33B are screen displays of the chat web page according to the present invention.

By clicking on the Virtual Chat link 1210, the student is provided with a web page 3300 as shown in FIG. 33A, labeled "Collaboration Sessions". Each course has its unique chat area built into the course site. Students can engage in chats about the course, collaborate on assignments, and share information beyond the boundaries of the classroom or posted materials. The instructor can monitor the chats or actively engage in discussions. This real-time virtual chat is a feature that can also accommodate a whiteboard mode.

Selection of the Group Pages link 1212 displays a web page that lists various groups of users that are grouped by special interests, such as music lovers, bookworms, sports fans to name a few. Access to these groups is a definable parameter that is set by the system administrator.

Again, referring to FIG. 10, selection of the External Links button 1082 will display a web page that is provided with URLs for relevant content that the instructor deems may be useful to the student community. For example, in a law course, links may be provided to various legal research web sites, or a Congressional web page.

Figure 14:
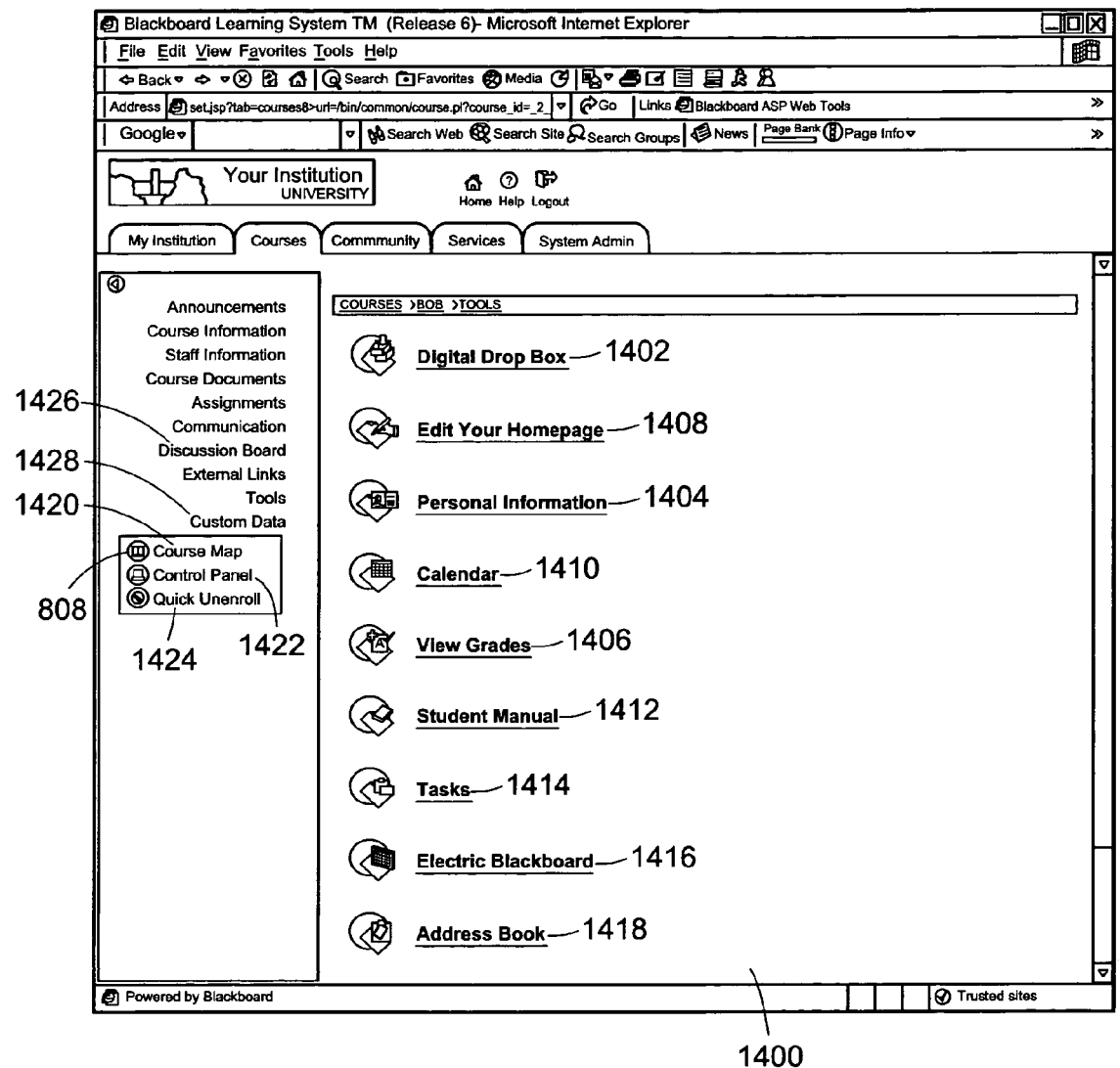
FIG. 14 is a screen display of a student tools web page according to the present invention.

Selection of the Student Tools button 1084 will display a web page 1400 of associated links as shown in FIG. 14. These links include various tools needed by the student, such as the Digital Drop Box 1402, Personal Information 1404, View Grades 1406, Edit Your Homepage 1408, Student Calendar 1410, Student Manual 1412, Tasks 1414, Electric Blackboard 1416, and Address Book 1418.

By clicking the Digital Drop Box link 1402, the student is provided with a web page that will allow control and access to the student's digital dropbox, that is a folder of files that the student can exchange with the course instructor. As shown in FIG. 15, dropbox web page 1500 allows the student to type in box 1502 the resource location of a file that he wishes to provide to the instructor, or to browse his computer's hard drive with button 1504 or network drive in accordance with well known techniques to locate the file and insert the appropriate pointer. Clicking Send File button 1506 will finish the task of uploading the file. List 1508 of uploaded files that exist in the student's dropbox is also set forth in this page, along with a control link 1510 that enables the removal of files. By using this utility, the student can submit documents such as term papers to the instructor, who can then read and post comments to the file for return to the student and review.

Selection of the Personal Information link 1404 provides the student with a web page that sets forth his personal data, such as name, address, e-mail, phone number and password. In addition, certain system preferences may be set at this location. Similar to this link is the Edit Your Homepage link 1408, which will allow the student to access his homepage and make modifications as he desires.

Selection of the ViewGrades link 1406 will deliver a web page that shows the grades that the student has been assessed in the course, such as for exams, quizzes, term papers, projects, and assignments. The student may be able to link to a specific exam or paper through this utility in order to review the exam again that may be useful for example in preparing for a final exam. The instructor may also provide to the student a statistical review of the entire class so that the student has a better feel for the grade he may receive.

The Calendar button 1410 will provide well known PIM (personal information management) functionality to the student. The Calendar web page can display calendar events in a graphical display for that course, all the student's courses, all institution events, as well as personal calendar events programmed by the user. Different entities can program calendar events that can be selectively displayed by the student by selection of display functions on the page. For example, the instructor can program the calendar events for the course, and an administrator can program calendar events for the entire campus, and these will be displayed on the student's calendar since he is registered for the course. This provides the student with a greater ability to manage his calendar than has been available in the past.

The Student Manual link 1412, when selected, provides the student with access to an on-line manual that may be used for a "help" reference in navigating the web site. Tasks link 1414 can provide the user with a list of tasks, either entered by the user or another user of system 100 to whom the user has granted access rights to the tasks tool.

The Electric Blackboard link 1416 enables a user to enter notes taken for a class. Each time a user enter notes, the same window opens and may also displays notes previously taken. Additional notes may be added below the last entry. Finally, Address Book link 1418 provides a standard address book for a user to enter information for his/her personal contacts.

Figure 16:
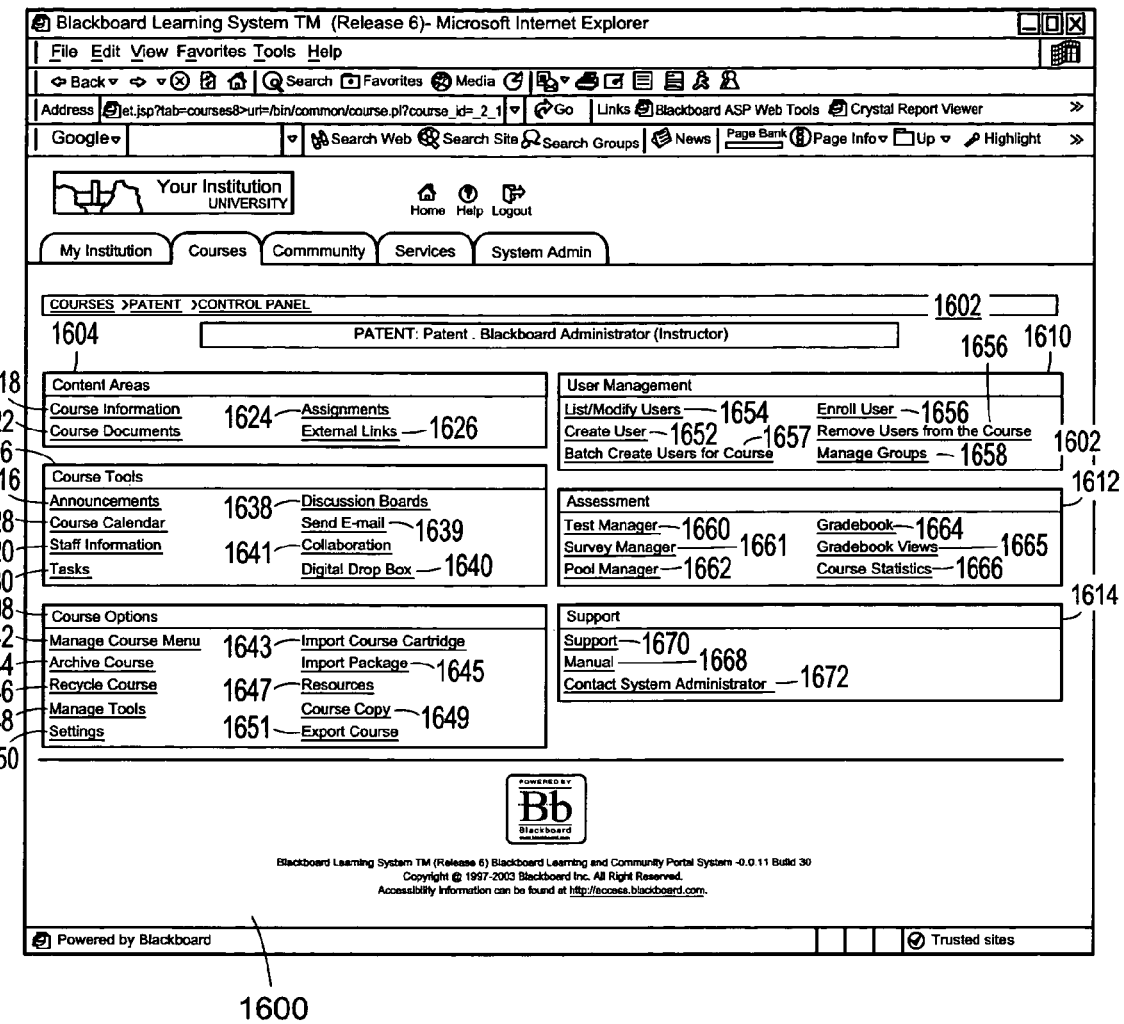
FIG. 16 is a screen display of an instructor's control panel web page according to the present invention.

Located below the navigation button toolbar is a group of control buttons 1420. The Course Map button 808 gives a separate browser window with direct access to the course contents, as explained above. The Control Panel button 1422 takes the user to a Control Panel screen display, such as shown in FIG. 16. The Quick Unenroll link 1424 removes an administrator as a course user. Similarly, a Quick Enroll link (not shown) may be provided to allow an administrator to quickly enroll in a course to view and troubleshoot content areas inaccessible to users that do not have an assigned role in the course Web site. Discussion Board link 1426 can take a user to a Discussion Board, such as shown in FIG. 13. Finally, Custom Data link 1428 may be activated to use access data by using an adapter that is not native to system 100.

Instructor Functionality

The instructor is provided with essentially the same functionality and control as is the student user, with additional functions defined herein. The instructor is provided with a complete set of navigational buttons for accessing announcements, course information, staff information, course documents, assignments, communication tools, external links, and student tools for a given course that he/she is teaching. The control panel also is given to the instructor to enable display of a set of links to course management and development tools that are available to an instructor.

An exemplary instructor's control panel web page 1600 is shown in FIG. 16. This control panel 1602 provides the instructor with many features that are useful in managing the course he/she instructs. The control panel is divided into Content Areas 1604, Course Tools 1606, Course Options 1608, User Management 1610, Assessment 1612, and Assistance 1614, as described in detail subsequently below.

Content Areas

Figure 18:
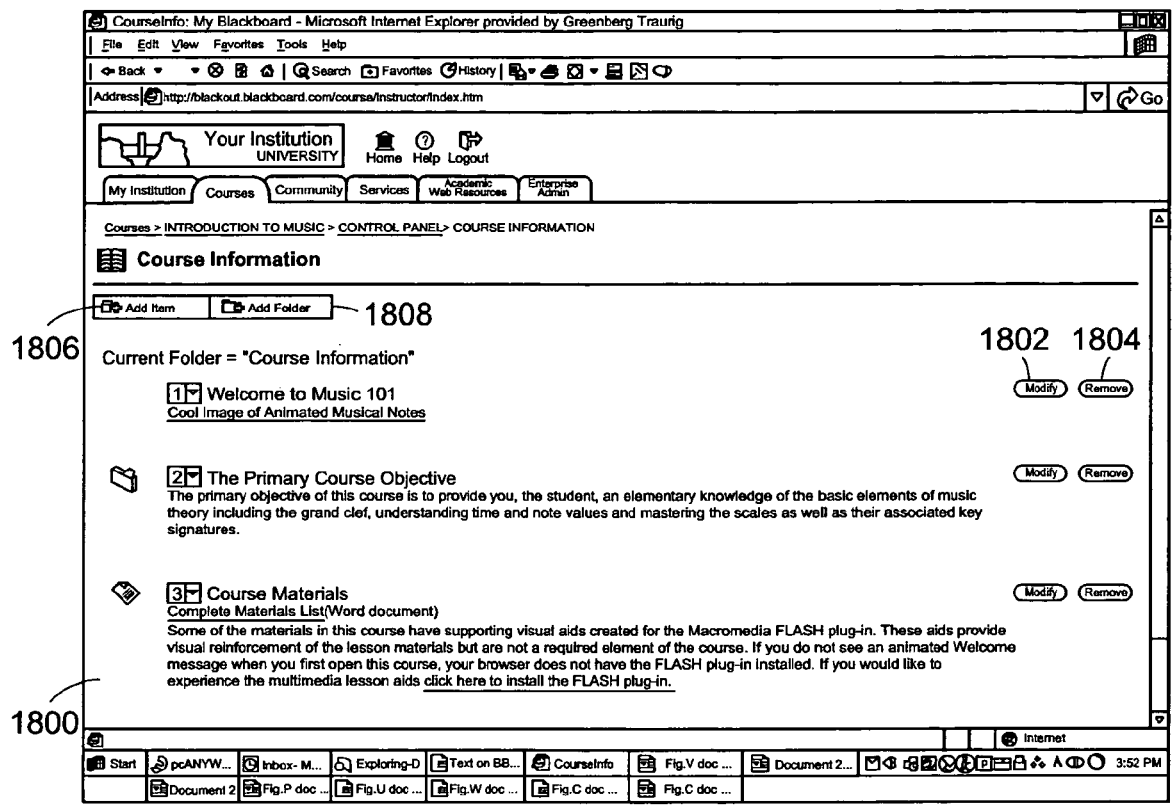
FIG. 18 is a screen display of a course information web page according to the present invention.

Within Content Areas 1604, the Course Information link 1618 displays a web page 1800 as shown in FIG. 18 that will set forth all of the course information documents or folders that have been posted for the course, and a modify button 1802 and a remove button 1804. An add item 1806 or add folder button 1808 is also provided, which displays a web page with various fields that the instructor will fill in to define the course information entry. After submitting the new entry to the server, the new course information is posted to all students registered in the class.

Similarly, the Course Documents link 1622 displays a web page that will set forth all of the course documents or folders that have been posted for the course, and a modify button and a remove button as discussed above. An add item or add folder button is also provided, which displays a web page with various fields that the instructor will fill in to define the course documents entry. The document may be uploaded directly to the server for later access by the student, or a link to an external referenced resource may be provided, e.g., a URL. After submitting the new entry to the server, the new course information is posted to all students registered in the class as described above.

Likewise, the Assignments link 1624 displays a web page that will set forth all of the course assignments or folders that have been posted for the course, and a modify button and a remove button. An add item or add folder button is also provided, which displays a web page with various fields that the instructor will fill in to define the course assignment entry. The assignment entry may be uploaded directly to the server for later access by the student. After submitting the new entry to the server, the new course assignment is posted to all students registered in the class as described above.

Also, the External Links link 1626 displays a web page that will set forth all of the external links or folders that have been posted for the course, and a modify button and a remove button. An add item or add folder button is also provided, which displays a web page with various fields that the instructor will fill in to define the external links entry. The external links entry may be uploaded directly to the server for later access by the student. After submitting the new entry to the server, the new external link page is posted to all students registered in the class as described above.

Course Tools

Figure 17:
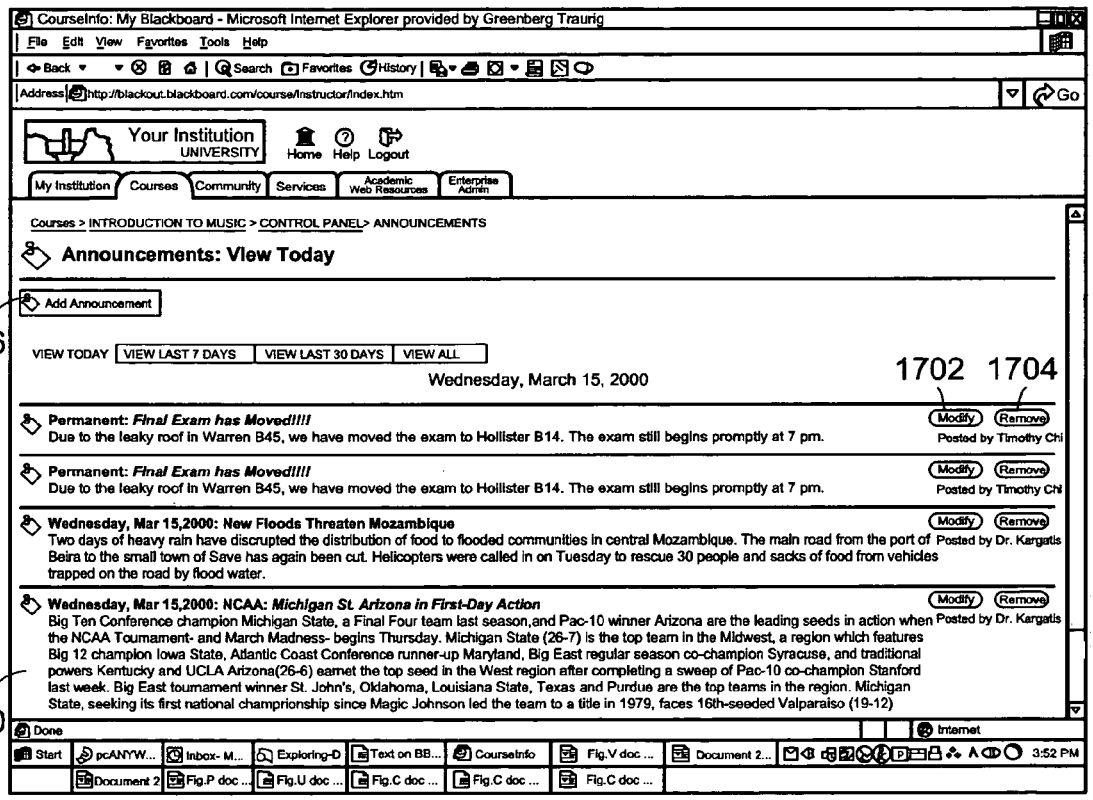
FIG. 17 is a screen display of a second announcement web page according to the present invention.

Under the Course Tools section 1606, the Announcement link 1616 displays a web page 1700 as shown in FIG. 17 that will set forth all of the announcements that have been posted for the course, the author (e.g., which instructor, if there are more than one, authorized to access this area) of the announcement, and a modify button 1702 and a remove button 1704. An add announcement button 1706 is also provided, which displays a web page with a blank message field that the instructor fills in and submits to the server. The newly added announcement will then be posted to all students registered in the class.

The Course Calendar link 1628 displays a web page that will set forth all of the calendar events that have been posted for the course, and a modify button and a remove button. An add item button is also provided, which displays a web page with various fields that the instructor will fill in to define the new calendar item entry, e.g., description, date, and time. The calendar entry may be uploaded directly to the server for later access by the student. After submitting the new entry to the server, the new calendar page is posted to all students registered in the class as described above.

The Staff Information link 1620 displays a web page that will set forth all of the staff entries, e.g., instructors, Tasks, that are involved with the course, and a modify button and a remove button for each entry similar to those shown in FIG. 18. An add item or add folder button is also provided, which displays a web page with various fields that the instructor will fill in to define the new staff item entry. Fields are also provided for links to each staff member's e-mail address and web page. Images of the staff member may also be inserted in the entry. After submitting the new entry to the server, the new staff information is posted to all students registered in the class as described above.

Figure 19:
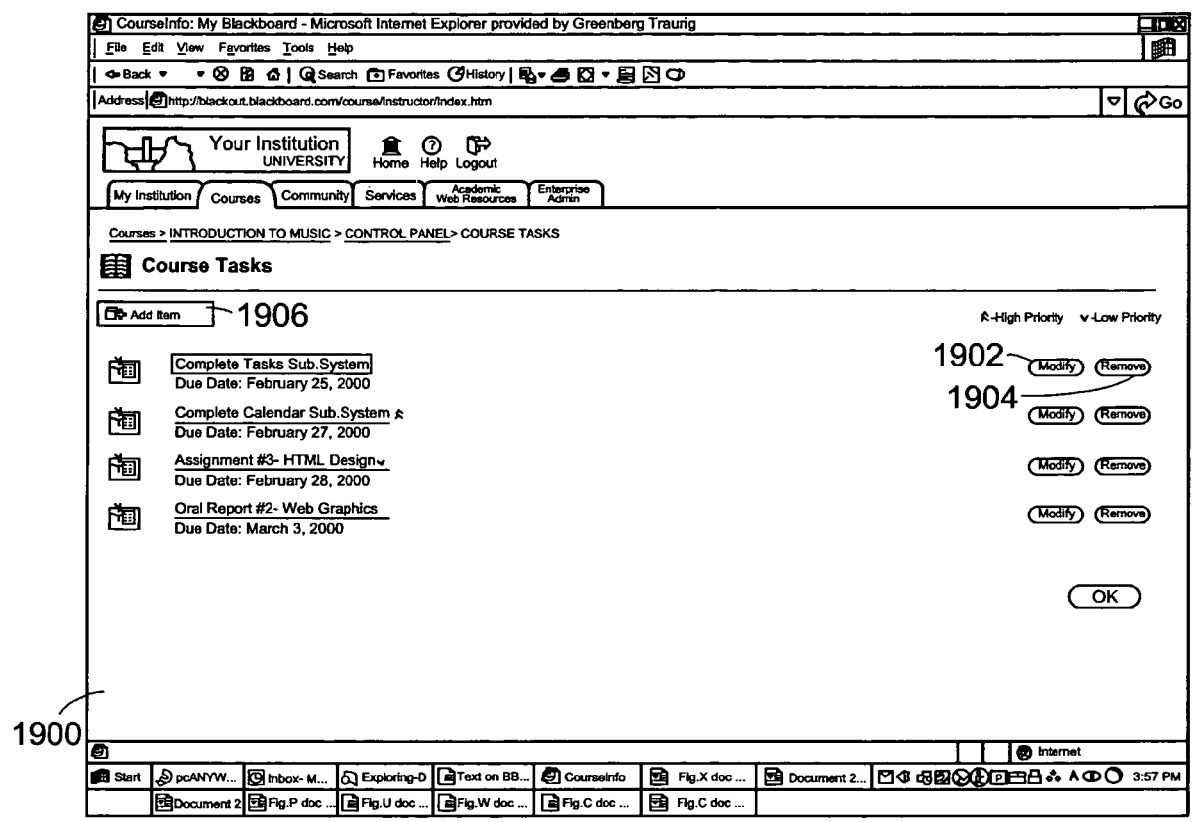
FIG. 19 is a screen display of a course tasks web page according to the present invention.

The Tasks link 1630 displays a web page 1900 as shown in FIG. 19 that will set forth all of the tasks that have been posted for the course, and a modify button 1902 and a remove button 1904. An Add Task button 1906 is also provided, which displays a web page with various fields that the instructor will fill in to define the new task entry, e.g., description, date, and time. The task entry may be uploaded directly to the server for later access by the student. After submitting the new entry to the server, the new tasks page is posted to all students registered in the class as described above.

Selection of the Discussion Board link 1638 displays a web page that provides links to the available discussion boards that are associated with the course, such as shown in FIG. 13. A discussion board is another communication tool to use in a classroom setting. This feature is similar to Virtual Chat, but is designed for asynchronous use, so users do not have to be available at the same time to have a conversation. An additional advantage of the discussion board is that user conversations are logged and organized. Conversations are grouped into forums that contain threads and all related replies.

For an instructor or teaching assistant, the Send E-mail link 1639 allows an instructor or teaching assistant to send e-mail to individuals to participate in a particular course. Instructors can send e-mail to all users in a specified course, all groups in a specified course, all of the teaching assistants in a specified course, all of the instructors for a specified course, to a single user or select users in a specified course and/or to a single group or select groups within a specified course. For a student, the Send Email link 1639 can display a web page that is similar to the one the user will be provided with in his e-mail function, e.g., allows selection of individual users associated with the course, certain predefined groups of users such as all students.

Collaboration link 1641 permits an instructor or teaching assistant to participate in real-time lessons and discussions with students. There may be two versions of the collaboration tool: A Virtual Classroom, such as shown at 3302 in FIG. 33A, enables instructors and students to browse the web, participate in question and answer sessions, and participate in chats. A Lightweight Chat 3304 capability, such as shown at 3304 in FIG. 33A, can also be used that only provides a chat capability. Both collaboration tools provide the ability to record archives that can be made available to students.

Virtual Classroom link 3302 (FIG. 33A) displays a web page that provides a link to either launch a virtual classroom and participate in real-time, synchronous classroom sessions), or to view the classroom archives, where are previous classroom session views and/or download these sessions to the instructor's computer.

Each course preferably includes a virtual Classroom, which is a synchronous chat room for student and group communications. The Virtual Classroom link 3302 can be used to initiate and conduct "live" classroom discussions, TA sessions, and office hour type question/answer forums. Guest speakers and subject matter experts can also talk with the class in the Virtual Classroom.

Figure 33B:
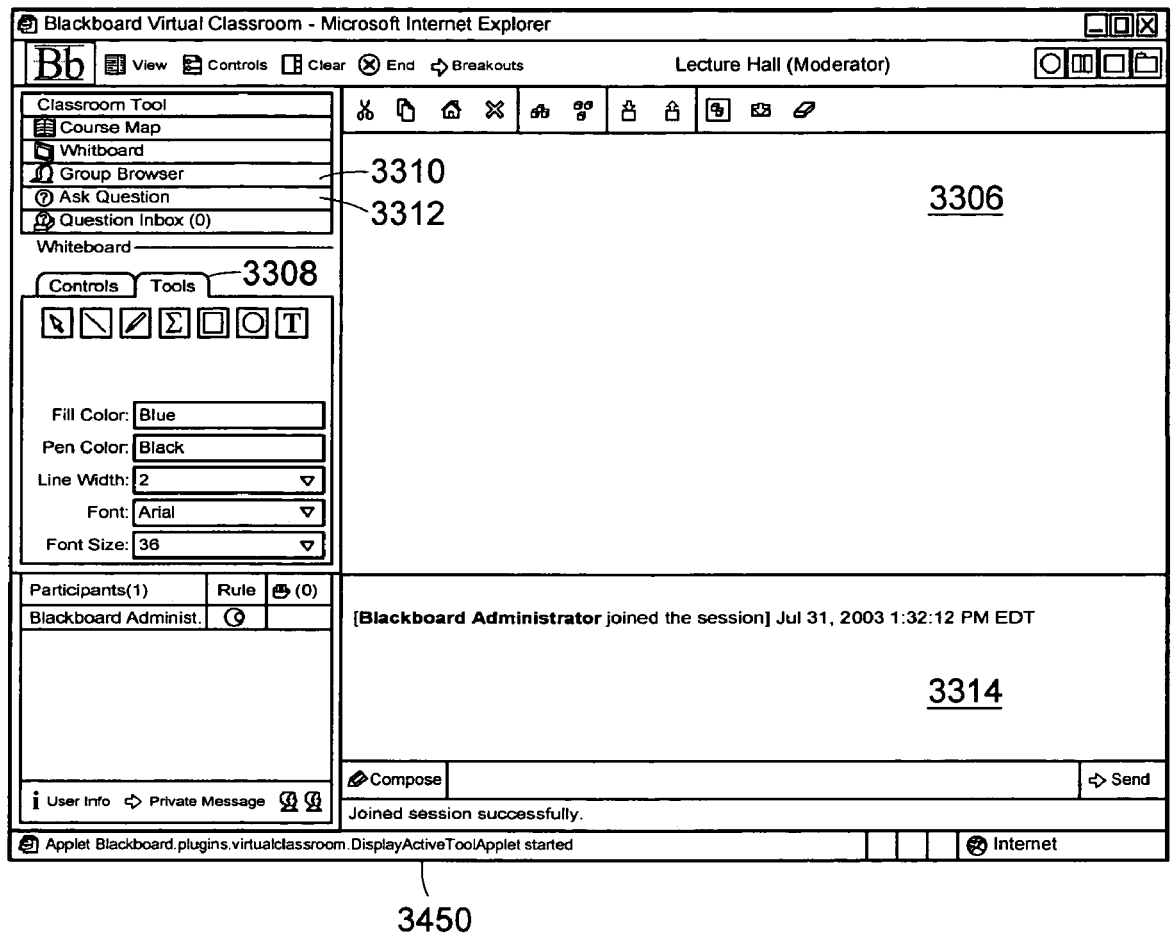

As shown in FIG. 33B generally at 3450, a Virtual Classroom contains several distinct areas. The Whiteboard Space 3306 is where web pages are displayed, which is the large center area. One can also write or draw on this space using the drawing toolbar. Menu Bar 3308 is used to change the information that appears on the whiteboard space, such as selecting a font to use on the whiteboard space and moving an object on the whiteboard space behind another object. One can also prepare lessons, navigate slides displayed on the whiteboard space 3306, and clear the Group Browser tab 3310 and Ask Questions tab 3312. Group Browser tab 3310 contains tools (not shown) for navigating web pages. For example, a location field can be provided to enter the URL of a web page the user would like to use during the Virtual Classroom session. The Status Region 3314 is where status messages may be displayed.

The following panels are available:

| Name of Tab | Purpose |
|---|---|
| Group Discussion | Use this tab to talk with the students in the Virtual Classroom. |
| Questions and Answers | If a student uses his/her Questions tab to submit a question to the instructor, the instructor can then answer the question using the Incoming Questions tab. Thereafter, the instructor can view a log of their dialogue regarding the question on the Questions and Answers tab. |
| Participant Information | Use this tab to learn about the students in the Virtual Classroom, such as their names. |
| Slides | Use this tab to prepare and present a series of slides. (See Options in Preparing Lessons). The tab is only available to the Instructor. |
| Incoming Questions | If a student uses his/her Questions tab to submit a question to the instructor, the instructor can then answer the question using the Incoming Questions tab. Thereafter, the instructor can view a log of their dialogue regarding the question on the Questions and Answers tab. The Incoming Questions tab is only available to the instructor. |
| Access Control | Use this tab to control students' ability to conduct the four Virtual Classroom activities: Question, Chat, Drawing, and Navigating. The tab is only available to the instructor. |

Figure 21:
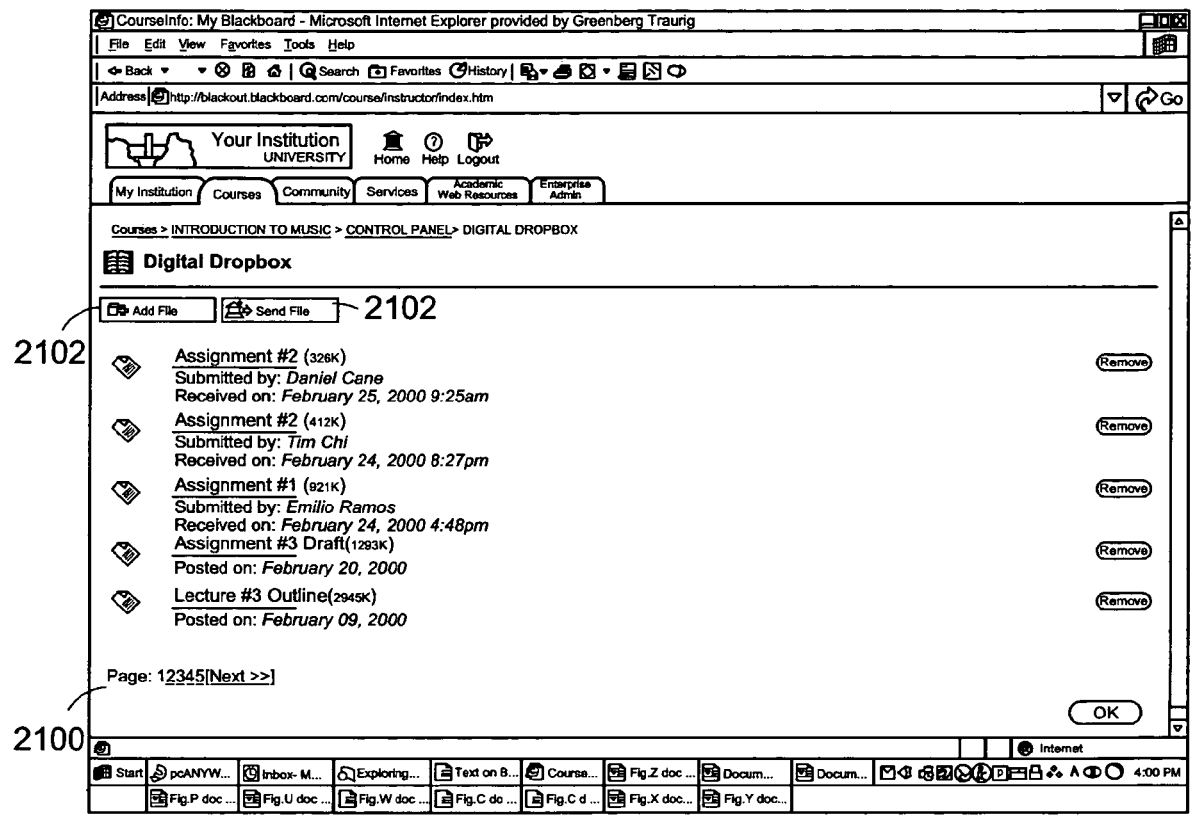
FIG. 21 is a screen display of a digital dropbox web page according to the present invention.

Selection of the Digital Dropbox link 1640 displays a web page 2100 as shown in FIG. 21 that lists the files that exist in the digital dropbox. The Digital Dropbox 2100 is a tool that the instructor and students can use to exchange files. The Digital Dropbox 2100 works by "uploading" a file from a disk or a computer to a central location. A participant can then come and "download" it to work locally. The Digital Dropbox 2100 is used to exchange materials between a single student and the instructor.

Send File link 2102 links to a student area where files are uploaded and sent to specific students. Files can be added by users using Add File link 2104. The user can also delete files that are no longer needed.

Course Options

The Manage Course Menu link 1642 within Course Options 1608 allows instructors to add or remove navigation buttons and/or change the names and order of the buttons. In addition, the Manage Course link 1642 allows an instructor to add a content area, add and/or modify a tool area and/or a student's access rights with respect thereto, add a link external to system 100, add a course link, modify an area, remove an area, and order or arrange content.

The Archive Course link 1644 allows a course, or portions thereof, to be archived. In one or more embodiments of the invention, a system administrator may optionally be the only individual granted the right to import a course from such an archive.

The Recycle Course link 1646 provides an easy way for an instructor to delete announcements, discussion board entries, and the like from a previous course that the instructor will be teaching again.

The Manage Tools link 1648 allows user to enable and/or disable the various Tools offered with system 100. Settings link 1650 provides access to an area where an instructor or administrator can make a course available, update the course title, decide if buttons or text should be used for course navigation, upload a banner, and the like.

Import Course Cartridge link 1643 allows an instructor to download a Course Cartridge. Course Cartridges are collections of publisher-created content, available for import into instructor-designed course web sites that can be used in connection with system 100. Content in course cartridges can include slides, documents, quiz banks, lists of relevant links, and other materials.

Import Package link 1645 allows instructors to upload information from a previously existing system 100 course to a new, or current, course. Once a course is exported, instructors can import the whole course, or selected parts of the course into another course site.

Figure 20:
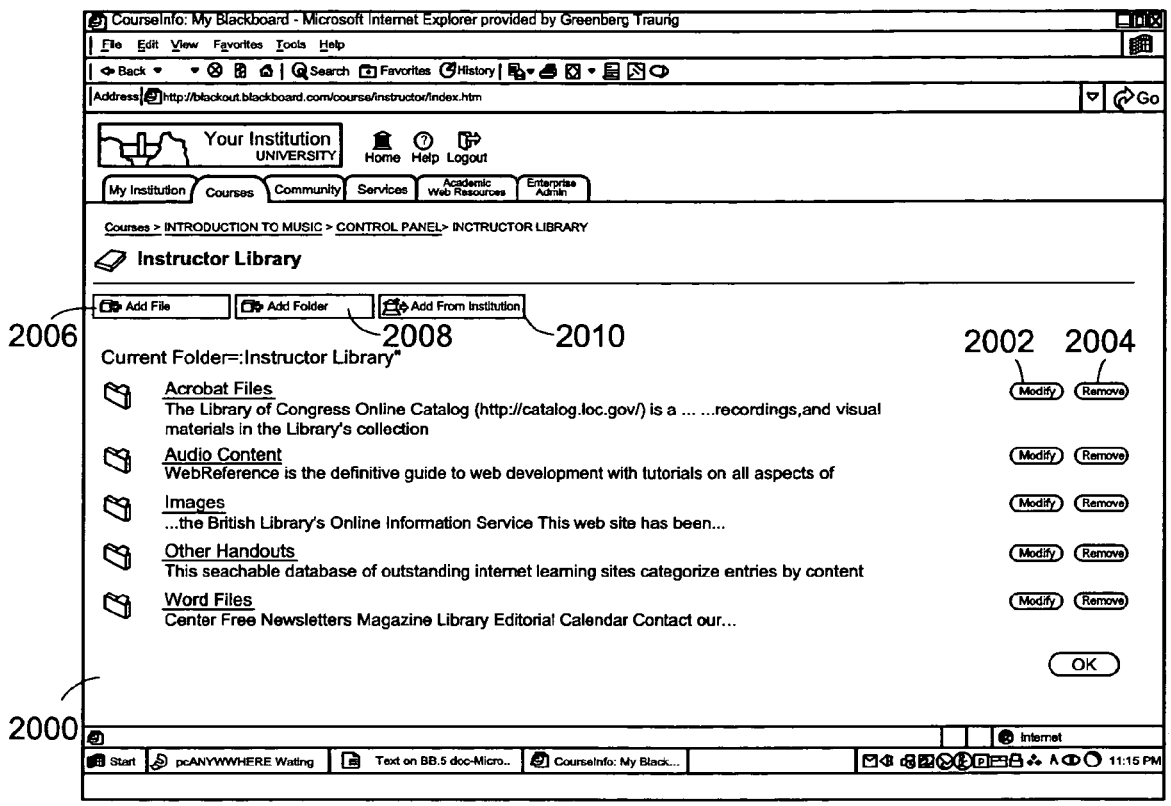
FIG. 20 is a screen display of an instructor library web page according to the present invention.

Resources link 1647 can be used by an instructor to designate the resources for a course by customizing the number of links and the content available to users. Resources link 1647 can allow an instructor to display a web page 2000 as shown in FIG. 20 that will set forth all of the folders and files that have been posted by the instructor for the course, and a modify button 2002 and a remove button 2004. These materials are accessible to instructors only and not to students directly. An Add File button 2006 and an Add Folder 2008 button is also provided, which displays a web page with various fields that the instructor will fill in to define the new entry. In addition, the instructor is able to select the Add From Institution button 2010 to select a new reference that is available from a pool of references made available to all instructors from the institution. The new entry may be uploaded directly to the server for later access by the instructors associated with the course. After submitting the new entry to the server, the new Instructor Library page is posted to all instructors associated with the course.

Course Copy link 1649 can be used by an instructor to copy course materials from one course site to another. For example, if an instructor has created documents in a summer version of a course that the instructor wishes to add to a fall course site, the Course Copy link 1649 enables the instructor to combine materials from two or more separate course sites into a single course site.

Export Course link 1651 allows an instructor to export a version of the course on the instructor's computer in a manner that does not affect the online version of the course.

User Management

Selection of the List/Modify Users link 1654 in the user management area 1610 displays a web page that enables the instructor to list and/or modify the users of the course, while selection of the Remove Users from the Course link 1656 displays a web page that enables the instructor to remove a user if desired from the course. Selection of the Manage Groups link 1658 enables the instructor to create and edit certain user groups, e.g., gifted students or remedial students.

Selection of the Create User link 1652 displays a web page that enables the instructor to select a Create User link (not shown) can display a web page that will enable the instructor to create a new user account and enroll him in the course, by inputting name, address, and other information regarding the user, designating the user's access level and providing a password if desired Selection of the Batch Create Users for Course link 1657 can display a web page that enables the instructor to create all of the user accounts by uploading a text file containing the user data. The Enroll User Link 1656 can display a web page that enables the instructor to enroll a user in the course.

Assessment

Assessment area 1612 allows instructors to provide quizzes, tests, and surveys on-line. Included may be essay, true/false, multiple choice, fill-in-the-blank, or matching questions. The questions can include text, graphics or multimedia. For the student, instant feedback is provided through automatic grading functionality. For the instructor, there is the ability to randomize the tests, time them, and create statistical reports of outcomes. Assessments within this system are an optimal way to increase student preparedness for class and to track and compare student progress over time. The Assessment area 1612 of the control panel 1602 allows the instructor to select an Test Manager link 1660, a Survey Manager link 1661, a Pool Manager link 1662, a Gradebook Viewslink 1665, or a Course Statistics link 1666.

Selection of Test Manager link 1660 allows an instructor to create, modify, and remove tests. Instructors can create tests to check the knowledge and skill level of the users enrolled in the course. Tests permit the Instructor to assign point values to each question on exams or quizzes. Student answers are submitted for grading, and the results are recorded in the Gradebook, which can be accessed by link 1664.

Survey Manager link 1661 allows an instructor to create anonymous, non-graded surveys. In surveys correct answers are not identified and a statistical analysis of the answers is provided. This feature can be used for course or instructor evaluations, or to gather demographical information. Instructors can use the Survey Manager to guide course curriculum by asking students questions on pacing, the need for clarification, and the like.

Selection of Pool Manager link 1662 can be selected to display a web page that enables the instructor to Add Pool, Import Pool, Search Pool, or Export Pool. Pools are predefined groups of questions and answer sets that are logically linked, usually by subject matter, so that an instructor may draw from a pool to obtain existing questions and answers sets from other courses, instructors, semesters, etc., and not have to "recreate the wheel" every time they generate or modify a test. By clicking the Add Pool button, the instructor can add a new pool to the list of pools displayed on the Pool Manager web page. S/he will have to type in the name of the new pool and a description of it on this form. By clicking the Import Pool button, the instructor will enter the name of an existing pool to import, or alternatively browse a disk drive to find the pool to import. By clicking the Search Pool button, the instructor is presented with a web page that will enumerate various available pools that can be searched for questions of interest for importing. The entire pool can be previewed by selecting a preview mode, and all of the available questions in that pool may be viewed. By clicking the Export Pool button, a pool may be selected for exporting purposes. For the list of available pools set forth on the Pool manager page, the instructor may modify the pool, in which case a web page is displayed that lists all of the questions (and associated answer sets) that are in the pool. Each question in the pool may be modified in the same manner as explained above with respect to the assessment manager. Likewise, questions may be deleted entirely from a pool, and new questions may be added to the pool as described above with respect to the assessment manager.

Selection of Gradebook link 1664 displays a web page that enables the instructor to perform various functions with respect to the on-line course gradebook. FIG. 22 illustrates a web page for a course gradebook 2200, which provides a variety of information including consolidated grades, individual assignment/test scores, direct access to specific assignments or tests by student, or a look at a specific test with aggregated results. Add Item link 2202 allows an instructor to add an item, such as a test or quiz, to the gradebook. Manage Items link 2204 allows an instructor to re-arrange the way items are displayed in the on-line gradebook. An interface (not shown) can be provided where an instructor can reorder items in the on-line gradebook, and/or well as modify their availability and display options. Items added by using Add Item link 2202 can be removed by using the Manage Items link 2204. Gradebook Settings link 2206 allows an instructor to re-arrange several display options in gradebook 2200. For example, the instructor can be provided options student information is displayed in a spreadsheet.

Gradebook Views link 1665 allows various views of a Gradebook to be displayed, such as by students and one or more of associated test grades, quiz grades, homework grades, and the like.

Weight Grades link 2208 allows an instructor to assign weight to grades. For example, a final exam may be worth 25 per cent of a student's grade, while a reading quiz may be worth only 10 per cent. Download Grades link 2210 provides instructors the ability to download a Gradebook 2200 to a spreadsheet where, for example, they can use their own formulas for calculating students' grades. Once those grades have been calculated, they can be uploaded into Gradebook 2200 using Upload Grades link 2212. Link 2214 can be use to sort various gradebook 2200 items based on various criteria, such as category, date added, position or title. Link 2216 can be used to filter gradebook 2200 items by various categories. For example, an instructor may want to view only items in the Exam category. Finally, link 2218 can be used allow an instructor to filter users by last name.

Figures 1, 23B:
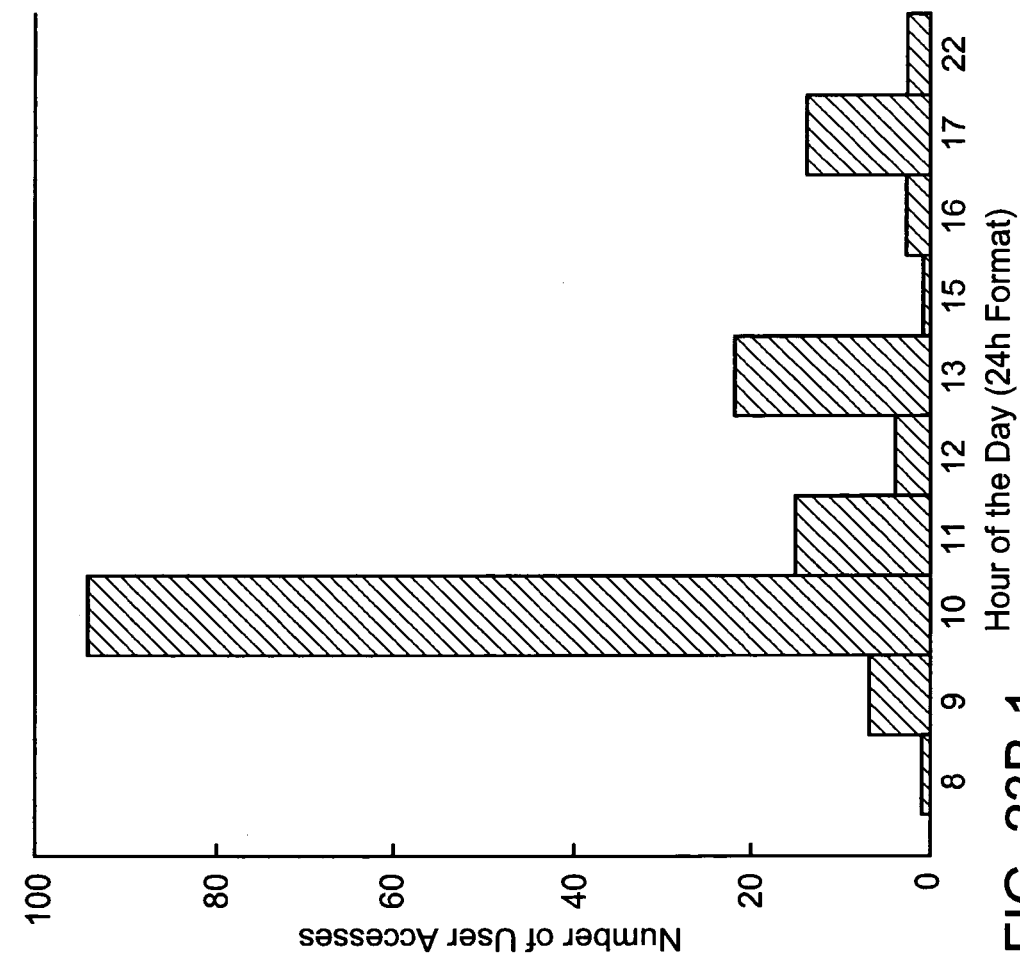
Figures 2, 23B:
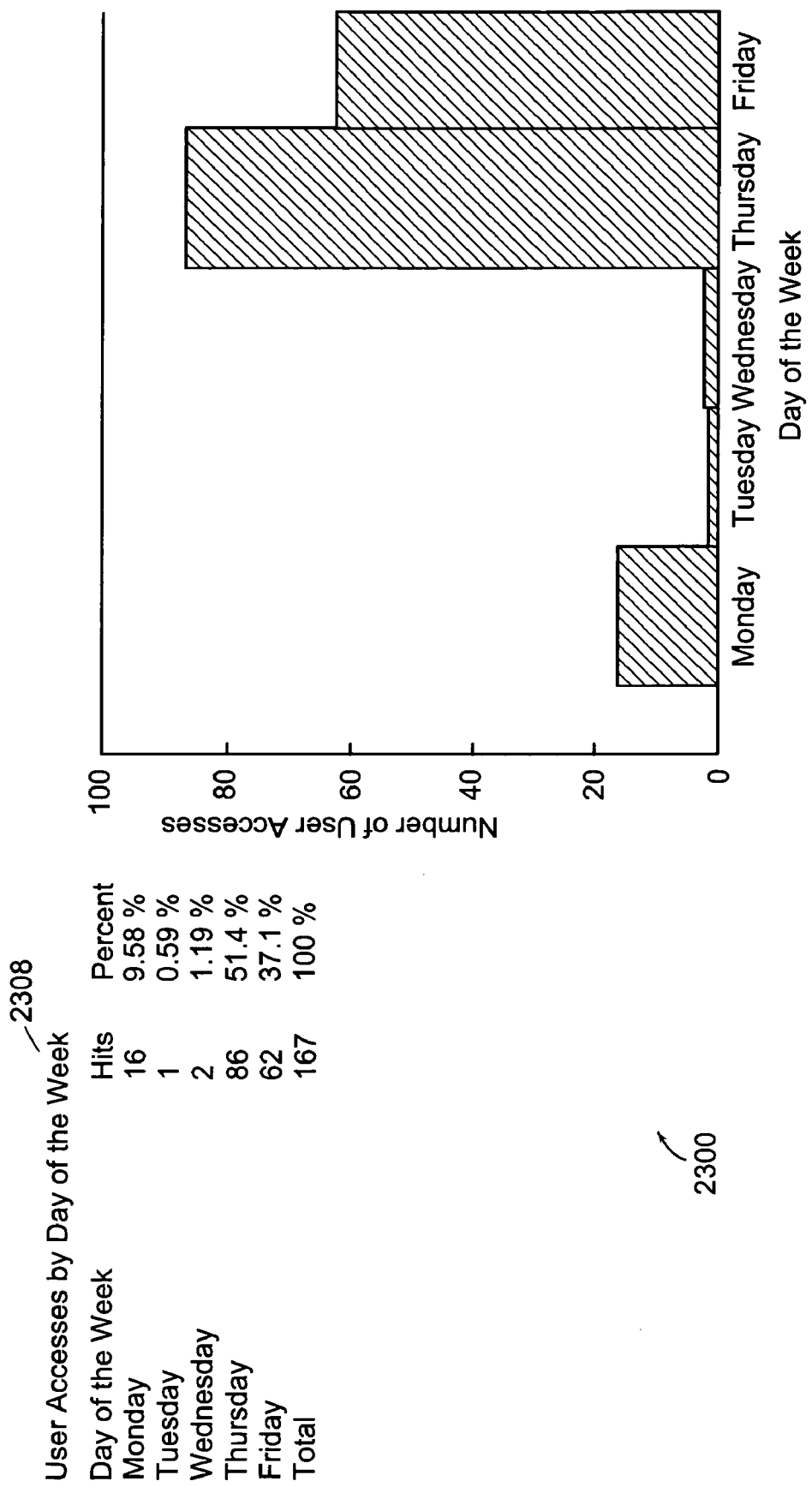

Selection of Course Statistics link 1666 in the assessment area displays a web page that enables the instructor to set parameters and view certain statistics for their course. Some instructors may want to analyze their class by how much their on-line materials are being accessed, but very few have the opportunity to take the time or the effort to determine these numbers. By using the course statistics web page 2300 shown in FIGS. 23A and 23B, the system provides a rich tool set for instructors to evaluate the relative statistics of their courses. These statistics may be valuable for evaluating on-line versus non-on-line courses to determine the relative efficacy of on-line materials and how they are enhancing the course. The Course Statistics web page has input fields for selecting a report filter, which will yield a report with Overall Summary of Course Usage, Main Content Areas report, Communication Areas Report, Group Areas Report, or Student Areas Report. A time period must be specified, which may be all dates or between a begin and an end date. The users must be selected, which will be either all users or a selected subset thereof. Other options include Total Number of Access per Area 2302, Number of Accesses over Time 2304, User Accesses per Hour of Day 2306 or Day of Week 2308, and Total Accesses by User 2310. The data, charts and graphs as shown in FIGS. 23A and 23B will then be displayed to the instructor.

Support

Finally, Support area 1614 sets forth links that will provide the instructor with various types of help. The On-line Support link 1670 will retrieve a web page with contact info for sending an e-mail to a support person. Selecting the On-line Manual link 1668 will retrieve an HTML based Instructor Manual in a separate browser window. Selecting the Contact System Administrator link 1672 will bring up a web page with contact info for sending an e-mail to an administrative contact.

Administrator Functionality

The System Admin tab 2401 provides various portal areas where a system administrator can perform various administrative functions. Courses area 2414 permits an administrator to perform various operation s with regard to a course. List/Modify Courses 2402 permits searching by a Course ID (or a few characters e.g., MEDI), Instructor (by User id or Name) or a key word in the Title or Course Description. Once created by using link 2436, courses can also be modified by using link 2402.

Create Course link 2436 permits a course to be created. A Create Course web page 2900 is shown in FIG. 29. The administrator will enter the requested information about the desired course; e.g., the course name, and ID, and a textual description on the web page. The administrator can then specify properties of the buttons that will be used along with the course to match his aesthetic concerns. The administrator can then specify various options, such as the subject area of the course, whether guests may access the course, if the course is currently available, if a course cartridge may be obtained and its URL and access key, and the instructor ID for the course.

Batch Create Courses link 2404 allows an administrator to add large numbers of courses. Using a batch file, courses are entered into system 100 quickly and without having to go through the Create Course 2436 link to add each course. Similarly, Batch Enroll Users in a Course link 2406 allows an administrator enroll large numbers of users into one or more courses.

Remove Course link 2408 allows an administrator to remove a course from system 100. Copy Course link 2410 creates a new course from an existing course. This link is useful when creating a new course that covers much of the same material or if the same course is offered under different Course IDs. An administrator may choose which course areas to copy, so not all course materials needs to transfer to the new course. Import Course link 2412 can be used to insert packaged course materials into a new course. Administrators create archive files, optionally saved in ZIP format, from the Export Course link 2416 permits achived course materials to be imported to an existing course. Exporting a course does not remove the course from system 100. The Archive Course link 2418 can be used to create a record of a course, optionally including user interactions. A course can be archived to recall student performance or interactions at later time. The archive can be saved as a .ZIP file. Restore Course link 2420 permits the archived course to be restored to its pre-archived condition. Settings link 2422 may lead to a menu of functions (not shown) that may be used to define parameters for all the courses on system 100. Images and Icons link 2424 permits an icon theme to be selected. Catalog link 2426 can be activated to bring up a list of courses offered in a particular subject area of discipline.

Organizations area 2428 provides functionality and links very similar to those provided in Courses area 2414. Organizations are 2428 may hold content and tools for institutional communities outside the scope of academic learning or training. Clubs, sports teams, and service organizations are all examples of communities that may benefit from their own Organization web site. In addition, Discussion Boards link 2430 enables an administrator to create and manage a Discussion Board that may appear for an organization. Messages may be posted on the Discussion Board that may be of interest to an entire organization. FIG. 25, generally at 2500, is an example of a page that can be used in connection with Organizations area 2428.

Figure 30A:
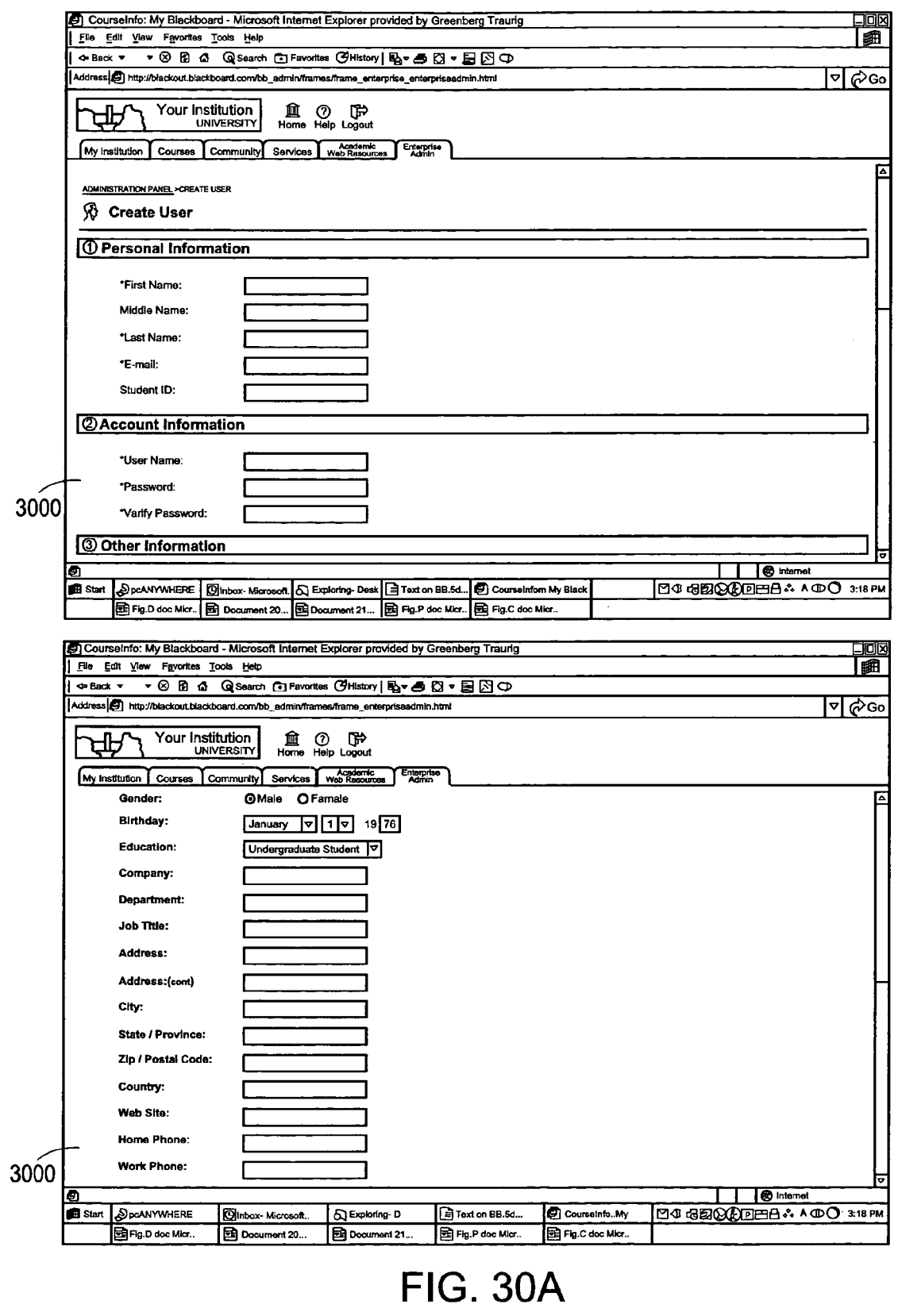
Figure 30B:
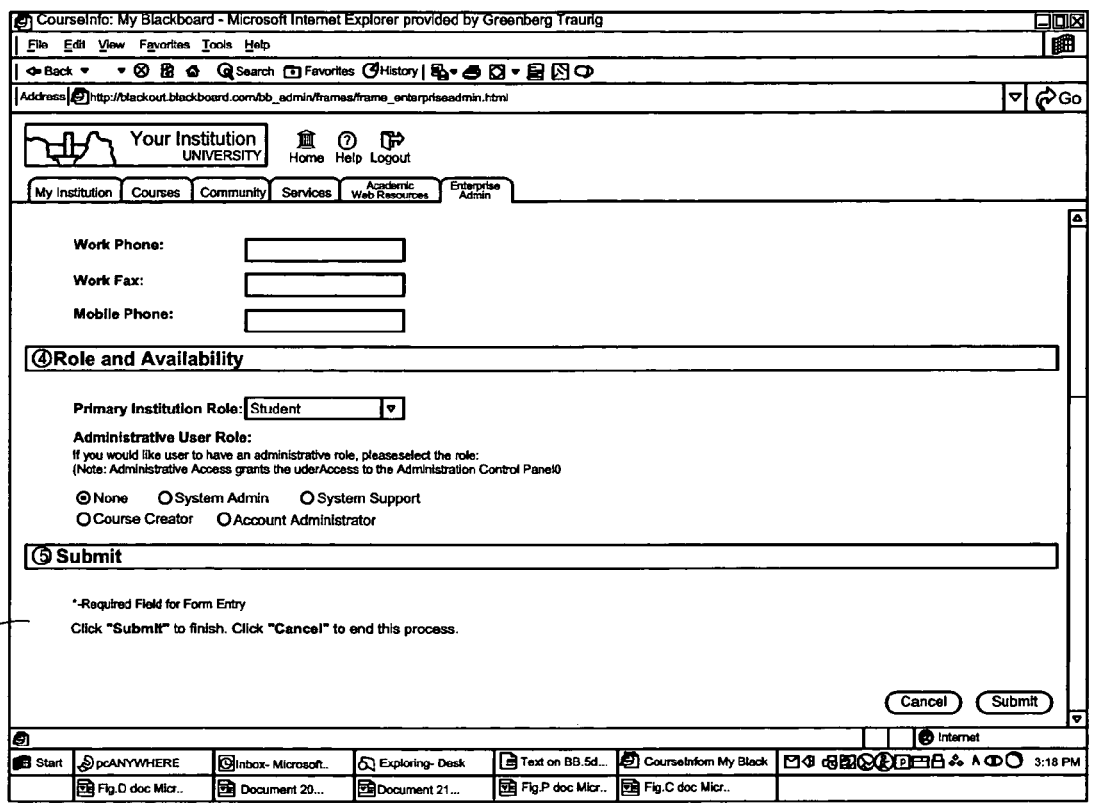

Users area 2432 provides a list/modify, create and batch processing capabilities similar to those provided for Courses area. For example, Create User link 2433 can take an administrator to a web page such as shown in FIGS. 30A and 30B, which enables an administrator to create a user by entering personal information, such as name, address, etc., and a user name and password. The access level of the user may be set at this time, which may be a Student, Faculty, Staff, Alumni, Guest, etc. Also, the user may be given an administrative access level at this point by selecting the appropriate option that is available, such as, None, System Admin, System Support, Course Creator, Account Admin). The role of the user will determine the access and control of the system that the user will have as explained throughout this document. Once a user is created, the Manage User web page allows listing, modification, and/or removal of users. The User Utilities link 2456 allows the system administrator to Batch Create Users, which will cause the uploading of a file of user data in pre-defined formats compatible with the system), Batch Enroll Users, which will cause the importing of a file to enroll users in courses and clubs that exist in the system), and Batch Remove Users, which will cause the importing of a file to remove users from the system).

In addition, Observer Management link 2434 permits users having a role of an observer to be managed. Observers are users who can view the same content as a user, but cannot modify or interact with content. The observer role can be used to let parents of a student or an academic advisor monitor progress.

Portal area 2437 allows an administrator to manage various system 100 tabs by using Manage Tabs link 2438. Standard tabs appear in various FIGs., such as FIG. 24 at 2402, and are used to navigate the screen displays in a conventional manner. Manage Tabs link 2438 allows an administrator to add tabs, rearrange the ordering of tabs on a particular display, or assign a particular functionality to a particular user or role. For example, privileges can be applied to roles so that, for example, users with a system role of Alumni could have access to a completely different set of common areas than users with a system role of Staff or Faculty. The Manage Tool Panel link 2440 allows an administrator to control how a tool, such as an external link, appears within a display. This link can be used to control the name and display position of an external link.

In System Options area 2442, from Manage System Extensions link 2444, an administrator can manage system extensions or plug-ins, as discussed with regard to FIGS. 45-51 herein. System Reporting link 2446 allows an administrator to monitor or review system usage. For example, a standard report can be provided that provides information on the number of courses, number of users, overall usage, and cumulative hits. An advanced reporting capability can also be provided that enables institutions to use data from predefined fields in a separate database, optionally dedicated to system data and/or statistics, to create and tailor reports to meet their specific needs. These reports assist in understanding and analyzing use of the system and can report information such as when different types of users access the system, how they use the system, and if the system improves student performance. Standard and advanced reports may also be exported and viewed as a text file or in a spreadsheet program.

System Config Info link 2448 can be invoked to display the date that the latest system 100 software was installed, the last date system 100 software was updated, and the current version of the system 100 software. This information is useful in determining if system 100 is running the latest patch or upgrade release.

Logs link 2450 can be provided to generate a number of logs to help an administrator with performance tuning, troubleshooting, and tracking matters. For example, a Send System Logs (not shown) feature can be provided that enables an administrator to view a log, without having to access the application file system on the Web/application server 1040 (shown in FIG. 1B). In addition, or alternatively, a Manage Log Rotation tool (not shown) can be provided that creates an archive file of all logs. Administrators can list Announcements by a post date, a user name who posted the announcement.

Figure 27:
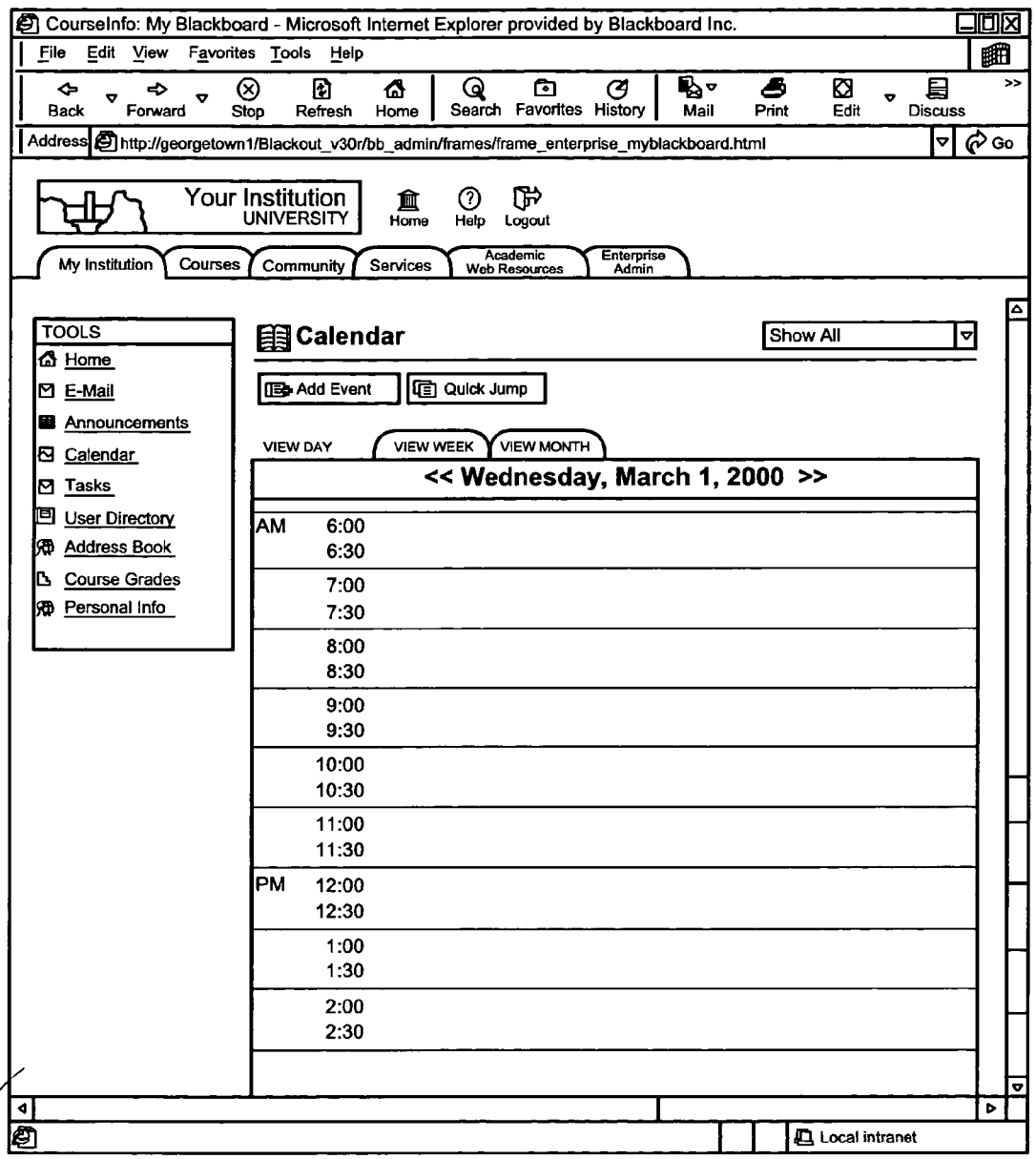
FIG. 27 is a screen display of a calendar web page according to the present invention.

Tools area 2452 permits an administrator to perform various operation s with regard announcements, calendars and e-mail. Announcements link 2454, upcoming and past events can be viewed daily, weekly, or monthly. Announcements link 2454 allows an administrator to add, modify, and/or delete messages from the institution on an Announcements page, such as shown in FIG. 5. Messages posted from the Announcements function on the can also optionally appear in an Announcements section of course Web sites, such as shown in FIG. 5 at 510. Institution Calendar link 2456 allows an administrator to manage institution events through an Institution Calendar, such as shown in FIG. 27 at 2700. From An event posted to Institution Calendar 2700, shown in FIG. 27, will display in all system 100 calendars. Administrators may specify a weekly, monthly, or yearly view. Send E-Mail link 2458 allows an administrator to e-mail lists instructors, students, or all users.

At Security and Integration area 2460, SSL Choice link 2462 can be chosen to have the system utilize the Secure Socket Layer (SSL). If server 1038 (FIG. 1B) is configured to support SSL, then the communication between users and system 100 can be configured using SSL Choice link 2462. SSL Choice link 2462 also optionally allows an administrators to determine if none, all, or some of the system 100 is secured with SSL.

Authentication Config link 2464 allows an administrator to view the authentication configuration of system 100. The authentication configuration allows an administrator, or system 100, with varying degrees of certainty and attendant security, to ascertain that a user logging in to system 100 is who the user purports to be.

Manage Context Encryption Key 2466 allows an administrator to set and use context passing APIs to allow system 100 to pass data to URLs requiring that data in a query string. For example, with system 100, the last portion of a URLs for a course can be /bin/common/course.pl?course_id=<unique_id>, where the <unique_id> is a variable that may be passed using the context passing APIs. Context passing is useful when implementing system 100 extensions that require content from system 100 to generate a URL. Base64Encoding can be used. For enhanced security, Cryptix™ may be used to protect the transfer of possibly sensitive data.

The Integration Password link 2468 is link that allows an administrator to change a password for an integration user. An integration user is a user account that is used by snapshot 1024 (FIG. 1B) and/or data integration APIs to process operations from a client machine using, for example, Simple Object Access Protocol (SOAP).

Customize Login Page link 2470 allows an administrator to download login page templates supplied with system 100 and configure them for their particular application.

Customize User Profile 2472 link allows an administrator to rename data fields for user accounts. In particular, the labels of the fields that store data can be changed, and an administrator can select whether or not users can view and edit data for each field. Once changes are made, they will appear on display screens and be presented to users. For example, if the name of default field named "Student ID" field is changed to "Identification™", the field name will appear as "Identification™" for all system displays.

User Privileges link 2474 allows an administrator to set the privileges assigned to system 100 roles, such as Student, Instructor, Teaching Assistant, Observer, and the like. For example, User Privileges link 2474 can take an administrator to a display (not shown) where a list of the privileges assigned to each role is provided, and allow the administrator to edit each privilege to include or exclude roles.

System Settings link 2476 allows an administrator to customize the appearance of a top frame, such as shown at 2490. For example, an administrator can select or provide a primary image for the institution 2491 can be added to the top frame, and the color of the background and text can be set. Also, the shape and colors of the navigation tabs 2401, 2403a, 2403b, 2403c and 2403d can be changed.

Gateway Options link 2478 allows an administrator to change the gateway page (not shown), which is the first page that a user sees when accessing system 100. An exemplary gateway page will allow a user top login to system 100, and optionally direct the user to a course catalog (such as shown in FIG. 6 at 612), Assistance area 2479 can be used by users to gain access to support services or information, such as an Online Admin Manual 2480, an Online Support Site 2482, and a Designate Local Support Contact 2484.

Other Utilities and Functions

One of the key elements to college and university life is the ability to socialize and take advantage of the human element on campus. The system's "Community" tab 2502 provides the web page 2500 shown in FIG. 25, which allows students to interact and be involved in all aspects of campus life from fraternities and sororities to off-campus communities that enhance the learning experience. Many campuses also provide rich services such as job availability through the community function. The Community center is the web equivalent of the student union building.

Most students are so conversant in on-line services that they prefer to have all campus administrative services available on the web. The system provides an enterprise level teaching and learning system that allows tight integration into student information systems and other campus systems to provide anytime, anywhere administrative services. The Services web page 2600 shown in FIG. 26, selected by tab 2602, enables users to register, add, drop, check records, or even pay parking tickets while on-line at anytime.

The system also provides a calendar 2700 that incorporates personal as well as institutional information in a single view, as shown in FIG. 27. The calendar utility gives students and teachers access to all calendar events for each of the courses they are enrolled in, as well as institutional calendar events.

Figure 28:
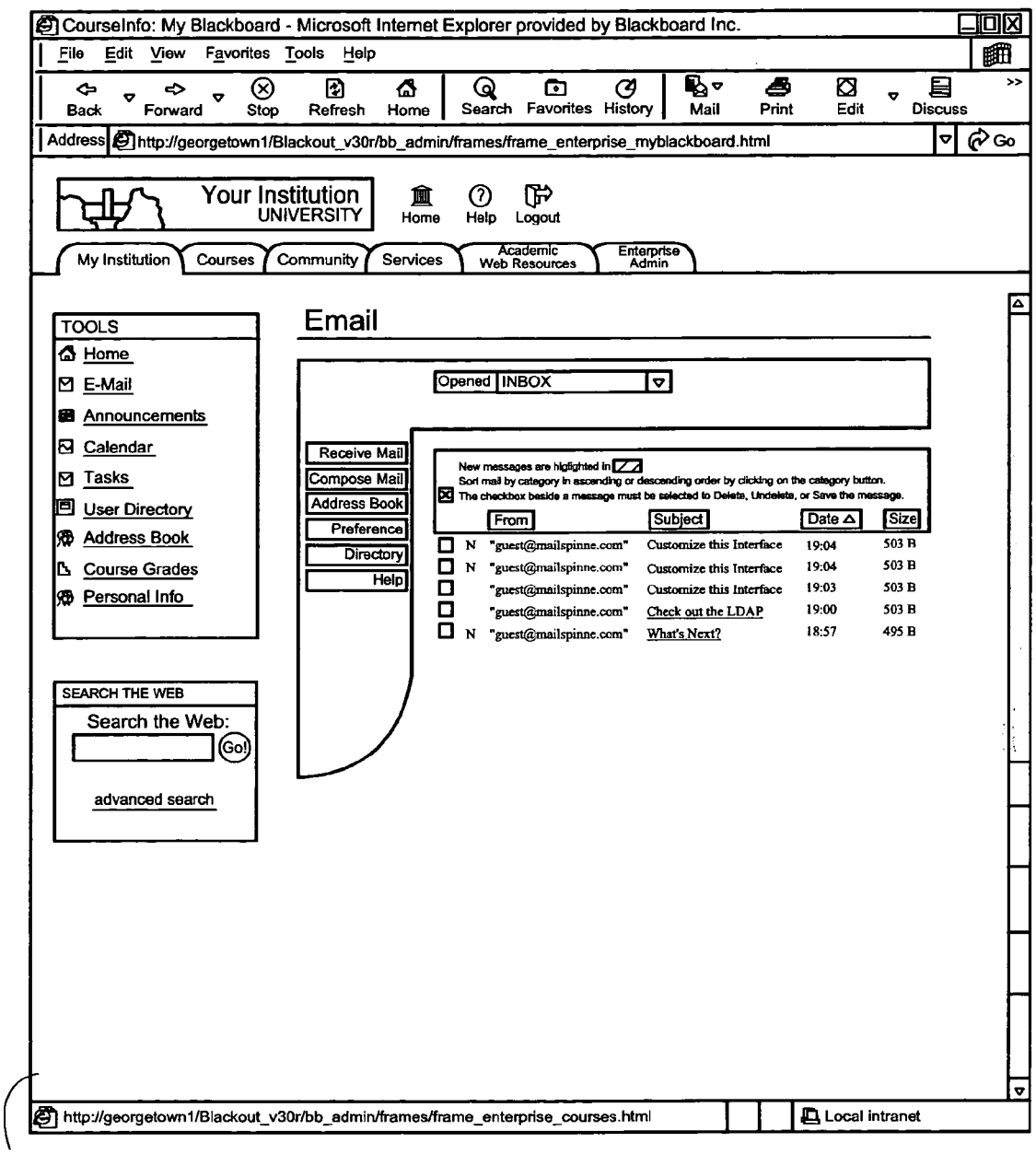
FIG. 28 is a screen display of an E-mail web page according to the present invention.

Since e-mail is a popular application on the Internet today, and the leading reason that many people purchase personal computers, e-mail has been integrated with the system, as shown by the web page 2800 in FIG. 28. Within a personalized home page, the user will be able to access complete e-mail capabilities. The e-mail system may utilize a standard Post Office Protocol (POP) or Internet Message Access Protocol (IMAP) server, and offer a web-based front end so that the user may access messages from any machine at any time.

Figure 31:
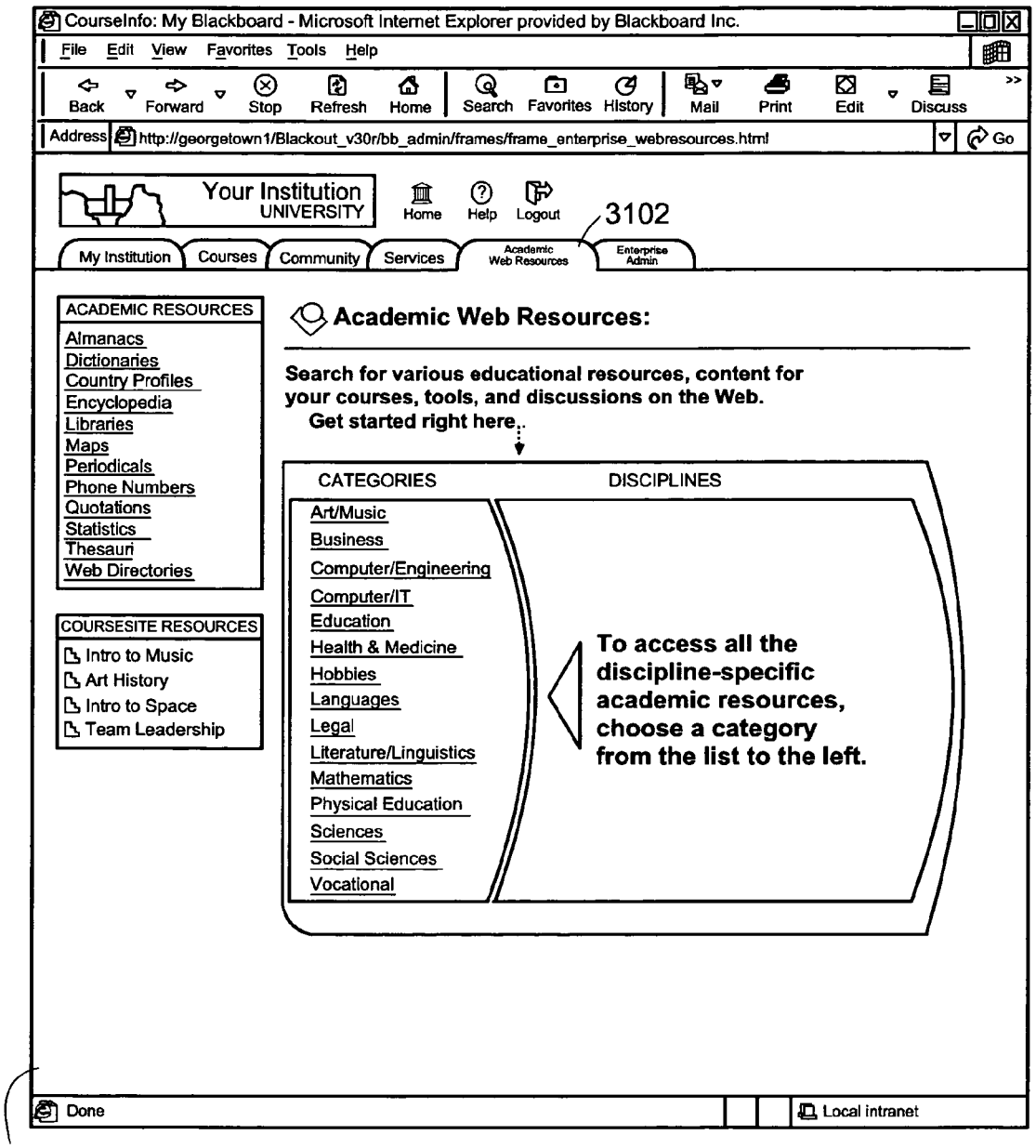
FIG. 31 is a screen display of a web resource web page according to the present invention.

FIGS. 31 and 32 show web pages 3100 and 3200 that can be accessed by tab 3102 to provide links that allow students and teachers to find and access academic resources and content. These resources are also context-sensitive to the course discipline. For example, if one accesses the academic web resources from an accounting course, he/she is automatically directed to news and information sources that are relevant to accounting. The user has access to news, web links, reference works, and search engines that enhance the ability to locate relevant information quickly.

In another aspect of the invention, provided is a system and method for applying E-commerce to education. Specifically, this aspect of the invention allows users visiting a web site to register and pay for courses provided by a college, university, or other institution.

FIG. 34 is a diagram illustrating information passed from a course registration server to a payment server. As a current or prospective student reviews courses offered by a college, university, or other institution, a student may add courses of interest to a list, or "shopping cart".

When a student has selected courses for which they would like to register, a student may proceed from a registration or review area (Block 100) to a "checkout" area (Block 110), as illustrated in FIG. 34. When a student proceeds to a checkout, information, such as, but not limited to, name, address, cost of courses, order identifier, order description, and a page to which a user is to be returned when an order is complete, is passed on. Information passed from a registration or review area may be used to generate a payment form.

FIG. 35, generally at 3500, shows a sample of a payment form. A payment form may consist of an introductory paragraph 3502, a purchase summary 3504, and a payment information area 3506. An introductory paragraph 3502 may be used to instruct a student in requirements at each stage of the payment process. A purchase summary 3504 may include services and products selected, per-unit prices, quantities requested, inventory numbers for each product or service selected, an invoice or purchase number, a total price, and other, similar information.

A payment information area 3506 can be used to collect payment information from a student. A student may be required to enter some information manually, such as, but not limited to, credit card type, credit card number, credit card expiration date, name on credit card, credit card billing address, check number, checking account number, bank routing number, debit card number, and personal identification number ("PIN code").

If a student has previously used the present invention, some information may be automatically entered based on previously submitted forms. Information transferred from a registration server may also be used to fill in some form fields. When a student has reviewed entered information, a form may be submitted for processing by activating a button or other interface element.

FIG. 36 at 3600 shows a block diagram illustrating interaction between a payment server and a payment validation server. After a student has entered necessary information into a payment form and submitted the form (Block 3602), some information, such as, but not limited to, amount of purchase, credit card number, name on credit card, check number, bank routing number, or billing address, may be transmitted to a payment validation server (Block 3604). A payment validation server may be maintained as part of the present invention, or payment validation servers may be maintained by one or more third parties, such as, but not limited to, CyberCash, Inc.

A payment validation server processes transmitted information, contacts a bank or other institution issuing the credit card or other payment form, and verifies that a payment of the amount requested is authorized. If payment of the requested amount is authorized, authorization information, including, but not limited to, a confirmation number, may be transmitted to a payment server. If payment of the specified amount is not authorized, other information, such as a declination code, may be transmitted to a payment server. If payment is not authorized, a payment error message similar to that shown at 3606 may be displayed. FIG. 37 at 3700 shows a sample of a payment information page. A student may print or otherwise record information displayed on a payment information page for his or her records. A payment information page can include a thank you, confirmation, or other message as shown at 3702. A payment information page may also include information such as, but not limited to, confirmation or declination information; goods, services, and classes purchased;, and total price charged as shown at 3704. In addition, a payment information page may include a button or other interface element which a user can activate to continue processing. The exact behavior of this interface element may be determined by the referring system through the URL or other data element which is illustrated in FIG. 34.

FIG. 38 at 3800 shows a block diagram illustrating post-order processing. As previously stated, a payment information page may also contain a button or other interface element which, when activated, causes a web page to be displayed or performs other processing steps. Activating the button or interface element may also cause some authorization/declination information to be transferred to a college, university, or other institution's accounting department for processing as shown at 3802.

Open Web Environment

The present invention may be used as an open platform environment, where anyone with access to the Internet may register as an instructor to create, administer, and make available a course to anyone else with Internet access. Thus, by entering a publicly available web-site such as www.blackboard.com, a user may register as an instructor and be provided with an instructor control panel for creating course as described herein. To create the course, the user will define course parameters, such as a description, enrollment options, announcements, assessments, and course materials, etc., and provide them in the various web pages as described above. The user can then let others know about the availability of the course on-line, and a potential student may access the publicly available web site to enroll in the course. In this manner, anyone can create a virtual classroom without the need to be affiliated with an institution, and disseminate knowledge through the course as previously unavailable.

Semi-Structured Content, and Flexible Text Handlers

Figure 39:
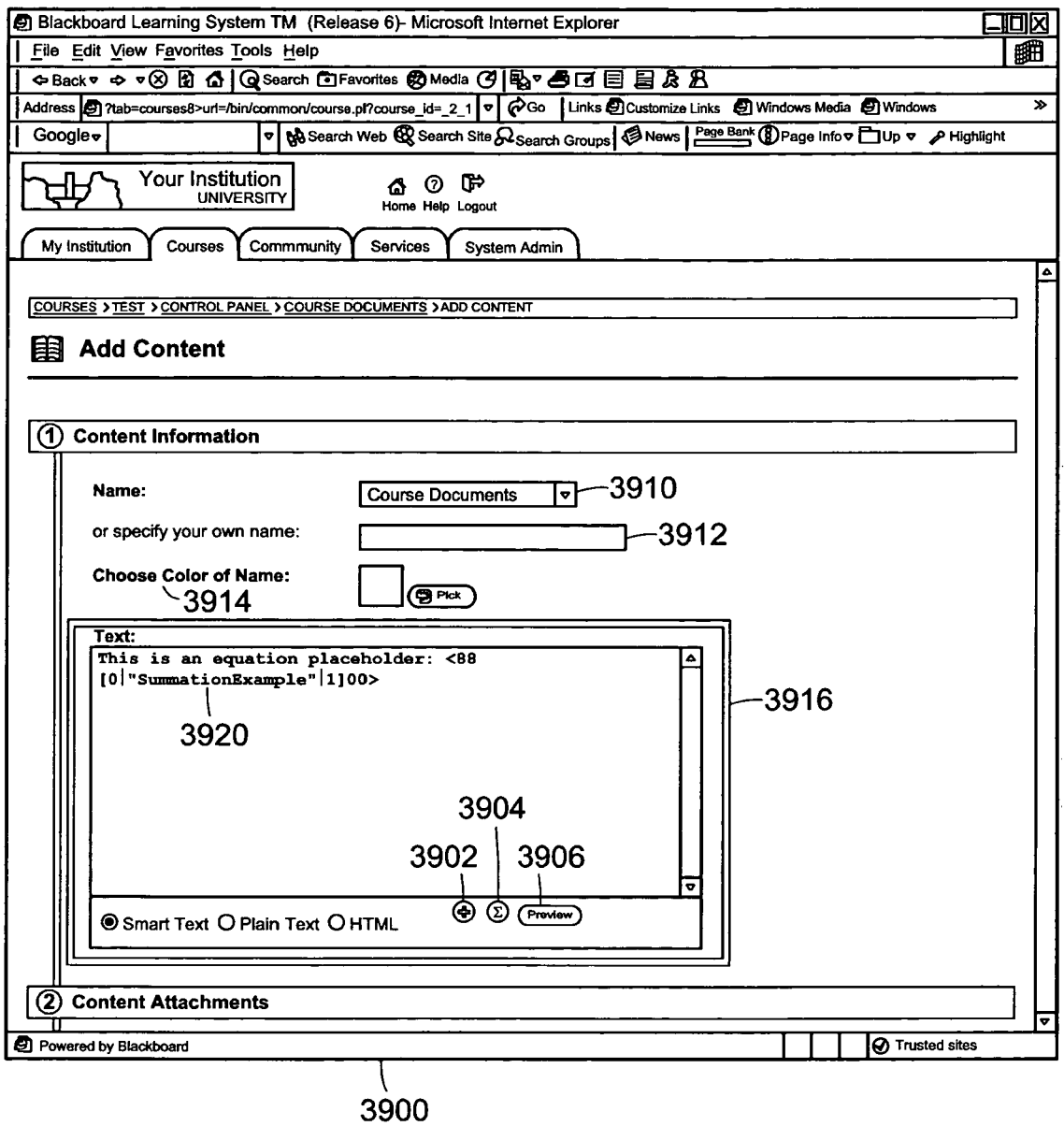
FIG. 39 shows an exemplary text editor with template that can be used in connection with the present invention.

FIG. 39 shows an exemplary text editor 3900 that can be used in connection with the present invention. Text editor 3900 can be used by an instructor, for example, to add content to a course, as indicated at pulldown menu 3910. Course Documents shown at pulldown menu 3910 can correspond to Course Documents button 1078 shown in FIG. 10. At field 3912, a user, such as an instructor, can also optionally specify his/her own name for content that is to be added.

Figure 40:
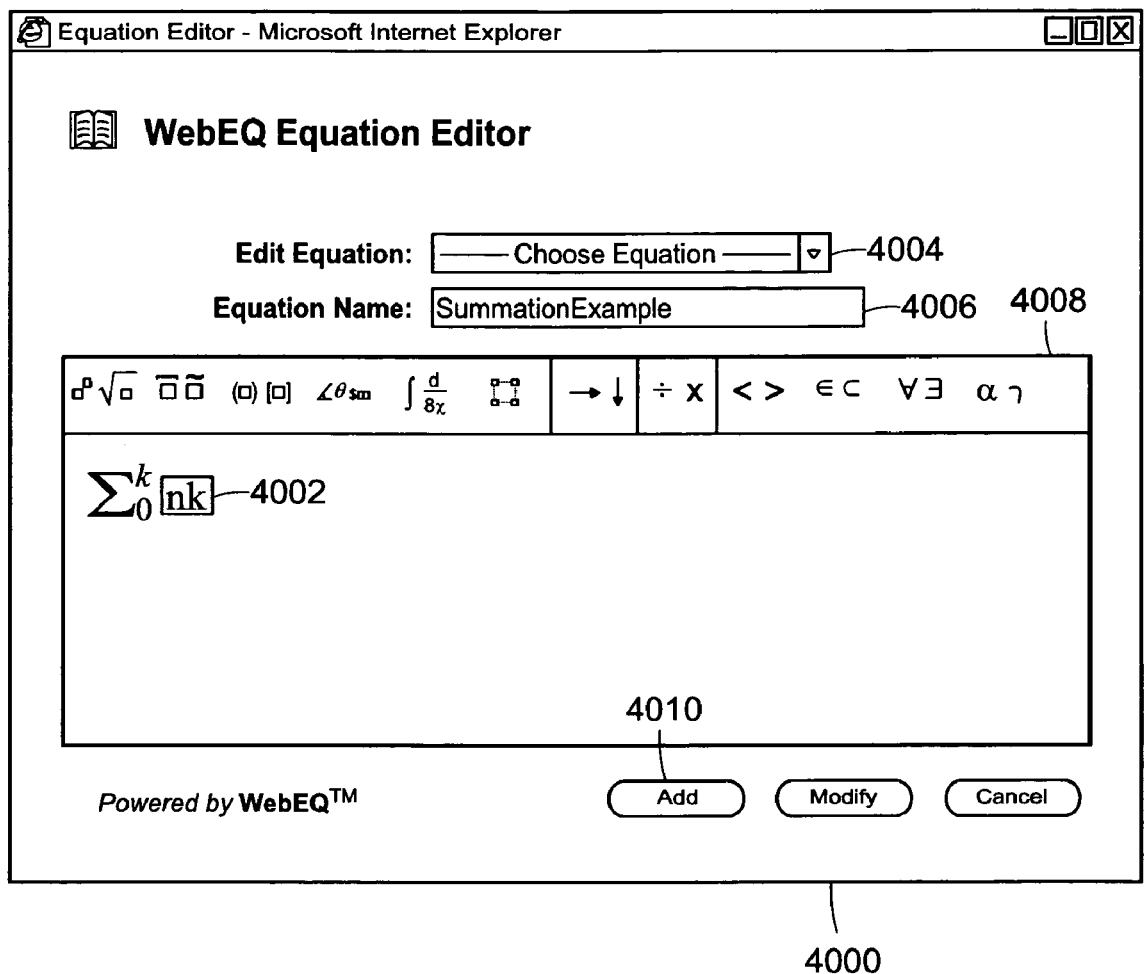
FIG. 40 shows an exemplary sample text tool that can be used in connection with the present invention.

In operation, a user can type in ASCII text, such as "This is an equation placeholder:", as shown in FIG. 39. The user can then click on a text tool icon, such as those shown at 3902 and 3904 to add text that is not natively supported by text editor 3900. When a user clicks on icon 3902, for example, the user may be taken to a graphic equation editor. If the user clicks on icon 3904, the user may be taken to a raw text editor. In this particular case, icons 3902 and 3904 are associated with a text tool, such as WebEq™ Equation Editor 4000, as shown in FIG. 40, although the icons can generally be associated with any editor or secondary application program. Preview icon 3906 can be used to view a display of the rendered display of text editor 3900 and a text tool 4000 such as shown in FIG. 40, as will be described herein. The data in text box 3916 can be referred to as a template, or template data.

A text editor 3900 can render one or more text tools, such as WebEq™ Equation Editor 4000. Text tools 4000 can be used as the editors for raw data blocks associated with a particular text tool 4000. Raw data blocks will typically not be known to text editor 3900. Each raw data block will generally have a unique identification ("id"), corresponding to or associated with "some_id," and a type, corresponding to or associate with a "type-spec," that associates the raw data with a text tool 3900.

FIG. 40 shows an exemplary text tool that can be used in connection with the present invention. By using a text tool such as shown in FIG. 40, the user can choose an existing equation as generically existing data which has been previously created, from pulldown menu 4004. The user can also type in a new equation name in "Equation Name:" field 4006 which represents generically new information in the generic text. The user can use toolbar 4008 to add and/or edit an equation, such as equation 4002. Additional toolbars (not shown) that follow this scheme can also be provided. When the user has finished editing the equation 4002, the "Add" icon 4010 can be pressed or activated to save the equation or generically new information.

The present invention includes logic and/or data structures that can map or associate equation 4002 with text editor 3900. In particular, the "<@@[0|"SummationExample"|1]@@>" shown at 3920 in FIG. 39 is a placeholder that maps or associates equation 4002 with text editor 3900. The particular syntax of the "<@@[0|"SummationExample"|1]@@>" placeholder in FIG. 39 is not important to the system and method of the present invention. What the present invention provides is a mapping or association between text, such as an equation, typed in a text tool 4000, such as WebEq™ Equation Editor, and a specific text editor such as the one at 3900. The mapping enables text editor 3900 to render the text entered by the user directly in text editor 3900 and the text entered by the user in a text tool 4000, such as shown in FIG. 40.

Figure 41:
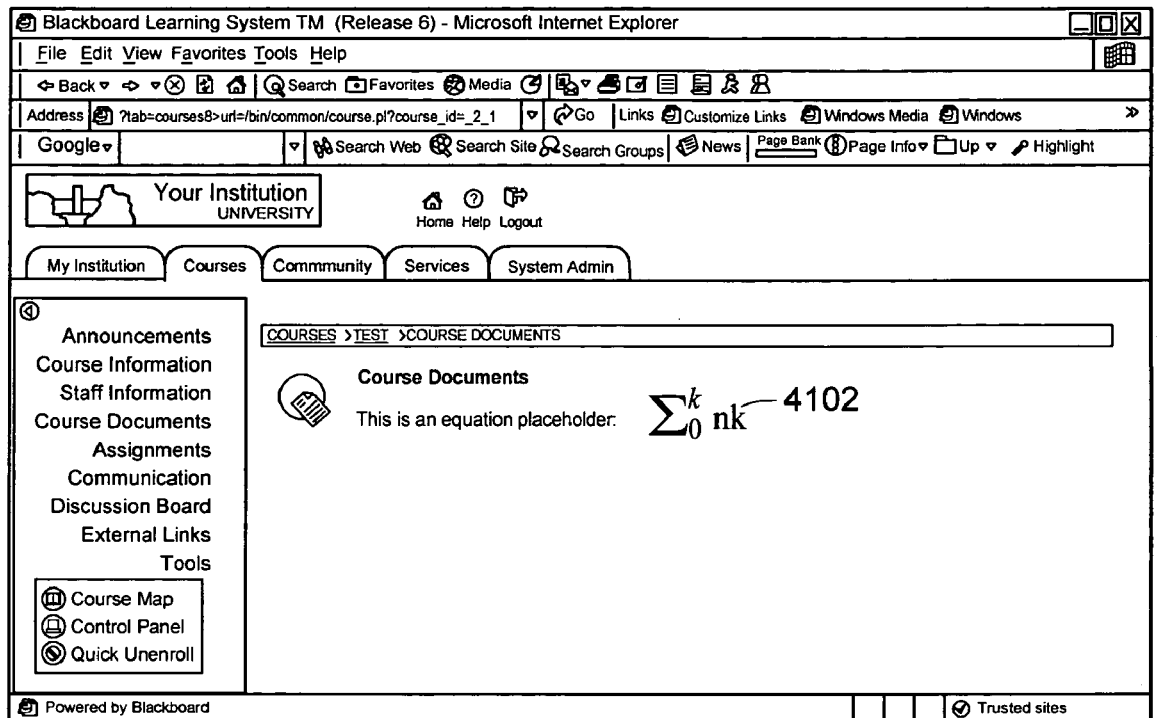
FIG. 41 shows an exemplary screen display of rendered data.

FIG. 41, generally at 4100, shows a rendered version 4102 of the "This is an equation placeholder:" typed in by a user in FIG. 39, and equation 4002 input by the user using text tool 4000. In general, elements within @X@ delimiters can be a pointer to data associated with a text tool 4000, that is displayed to a user in a text box (or template) 3916 and/or a rendered display such as shown in FIG. 41.

Figure 42:
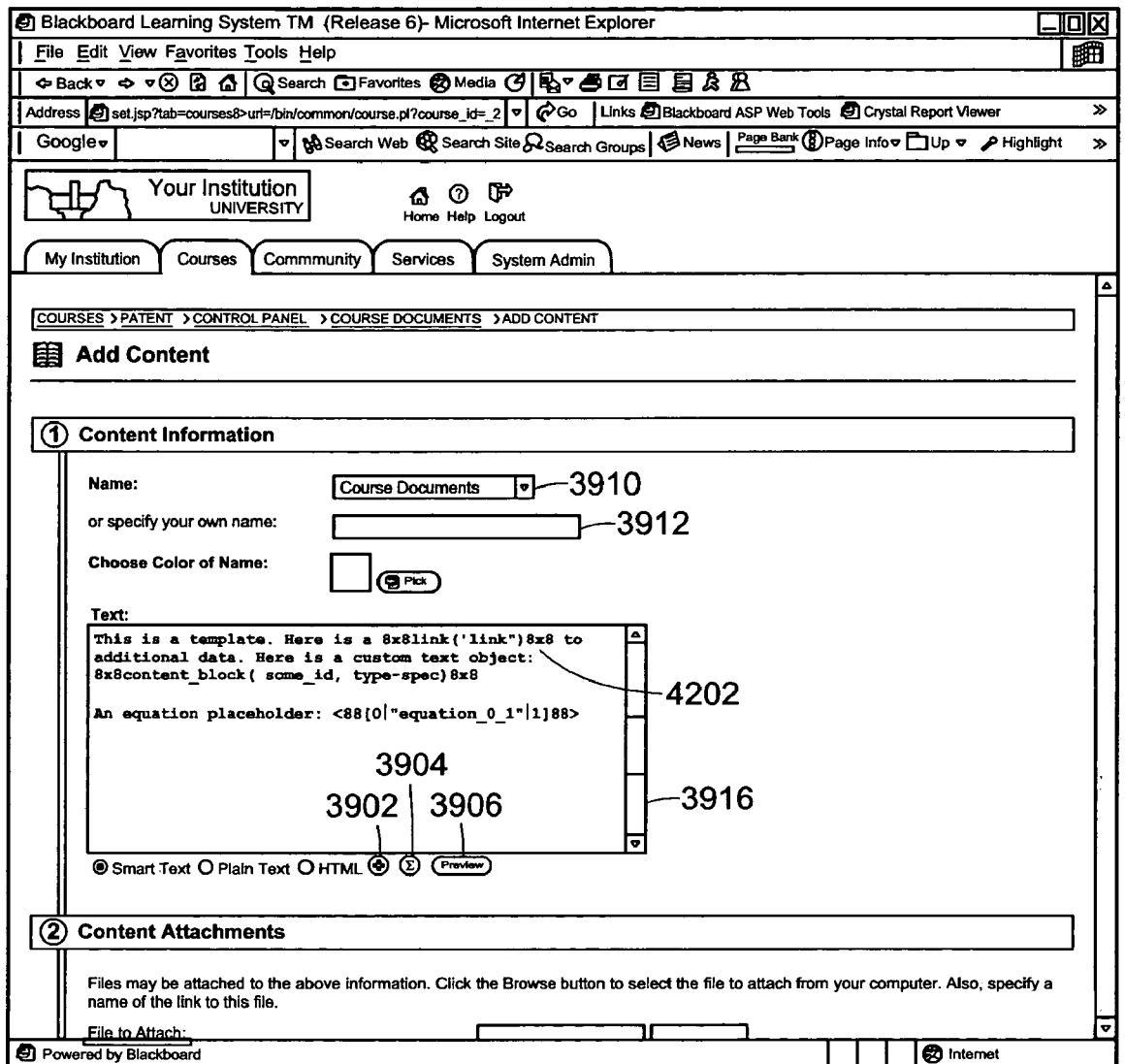
FIG. 42 shows the exemplary text editor with another template.

FIG. 42, generally at 4200, shows text editor 3900's processing template data shown in text box 3916. The "This is a template. Here is a" at 4202 shown in text box 3916 is entered by a user. In an embodiment, the @X@ delimiters can be placeholders for elements, stored as presentation data in database 1020 shown in FIG. 1B and/or database 140 shown in FIG. 1C, that can be displayed to the user. The link("link") between the @X@ delimiters is a placeholder inserted by a text tool 3902 or 3904. The placeholder can be a pointer to the data associated with a text tool 4000.

Still referring to text box 3916 of FIG. 42, the "to additional data. Here is a custom text object:" is also entered by a user. The data associated with "content_block(some_id, type-spec)" can be raw data, such as equation 4002, associated with a text tool 3902, 3904 that can be stored for run-time resolution and displayed to the user. There may be one or more raw data blocks that correspond to, or are associated with a "content_block." When a user submits, for example, an HTML web form, presentation data can be queried from each provider on one or more servers because each "content_block (some_id, type-spec)" can represent an identifier that can be generated by text editor 3900. "some_id" can represent a pointer to the data, and "type-spec" can refer to the application, such as a WebEQ™ Equation Editor associated with the data.

In accordance with at least one embodiment of the present invention, template 3916 can also be used to retain positioning information of the text without having to know details of the individual text type's presentation format. As used herein, positioning information pertains to the positioning of the rendered (displayed) or printed output, such as shown in FIG. 41. In FIG. 41, equation 4002 (FIG. 40), is positioned at 4102 where the placeholder appears in the template.

In practice, the rendering engine for the WebEQ™ Equation Editor 4000 may be a standard Applet. In general, finding an Applet reference and parsing its relevant data is more complex than simply providing a placeholder that contains pointer information to where the raw data associated with the WebEQ™ Equation Editor 4000 physically resides, such as a file location. Text tools 3902 and/or 3904 can also use a syntax, structure or format other than "content_block (some_id, type-spec)" to achieve the stated objectives and still be within the scope of the present invention.

The contents of template 3916 shown in FIG. 42 (or any template 3916) may be converted, optionally at save time, into pure, or substantially pure, renderable HTML, an example of which is shown below:

```
<P>This is a template. Here is a
@X@link("link")@X@ to additional data. Here is a
custom text object: <applet code= "webeq.Main"
```

-continued
```
archive= "webeq.jar"><param name= "eq"
value="<mathml>...</mathml>"></applet>
```

The "@X@content_block(some_id, type spec) @X@" shown in FIG. 42 corresponds to the "<applet code="webeq.Main" archive="webeq.jar"><param name="eq" value="<mathml> . . . </mathml>"></applet>" above.

The schema could also be converted by creating an additional text/Character Large Object (CLOB) field referred to as raw_data, to store the structured data in, for example, XML format, as shown below:

```
<bb:contentData>
    <bb:template>This is a template. Here is a
@X@link("link")@X@ to additional data. Here is a custom text
object: @X@content_block( some_id, type_spec
)@X@.</bb:template>
    <bb:rawBlock id="some_id" type="type_spec">
        <x:mathml> ... </x:mathml>
    </bb:rawBlock>
</bb:contentData>
```

As shown in the XML code above, the "content_block (some_id, type_spec)" is an implementation of a mapping and interpretation of what has been put in place by text tool 4000. Generally, smaller raw data blocks that can be associated with equation 4002 or its equivalent. Raw data blocks can be provided for association with one or more text tools 3902 and 3904 associated therewith. For example, a WebEq™ Equation Editor shown in FIG. 40 can be used with a Mathematical Markup Language (MathML™).

The use of "structured data" generally provides a way to abstract content data in a manner that allows or facilitates arbitrary or substantially arbitrary data formats to be, for example, embedded in content objects. In a web-based learning system, this can include data entities such as Course Documents, Announcements and/or Assessment Questions. Systems other than web-based learning systems may implement this structural data.

In an embodiment of the present invention, declarative data can be stored on a server, such as server 1050 shown in FIG. 1B or core subsystems 150 shown in FIG. 1C. The declarative data will interact with (or utilize) one or more Application Program Interfaces (APIs) on web browser 120 shown in FIG. 1C using, for example, JavaScript, that allows text editor 3900 to be integrated into system 100.

Figure 43:
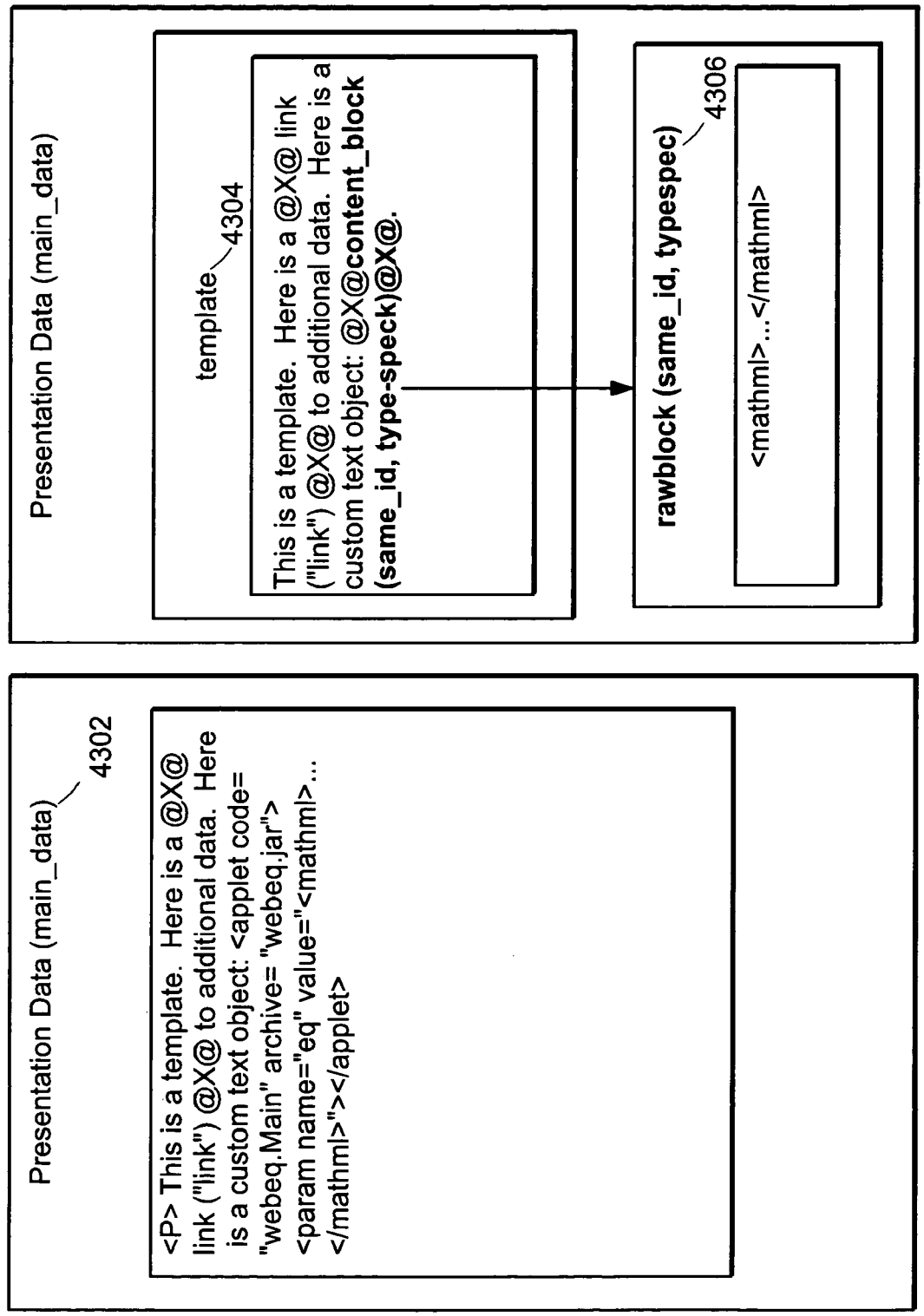
FIG. 43 shows an exemplary data layout format that can be used in accordance with the present invention.

FIG. 43, generally at 4300, provides an exemplary data layout for a text tool 4000. The "Presentation Data (main_data)" shown at 4302 can be viewed as a translated template that can be stored in a database, such as database 1020 shown in FIG. 1B, and displayed to a user. The "Raw Data (raw_data)" shown at 4304 in conjunction with raw block "(some_id, type-spec)" 4306 maps to or corresponds with the XML representation described above.

In an embodiment of the present invention using a secondary text editor 4000, the processing model as described above can perform or substantially perform the template-to-presentation transformation. When a template with raw data is submitted, text editor 3900, with attached raw data, provides a presentation representation, which is inserted into a primary presentation stream. Thus, with regard to FIGS. 42-43 above, an exemplary processing method in accordance with the present invention is shown in FIG. 44.

Figure 44:
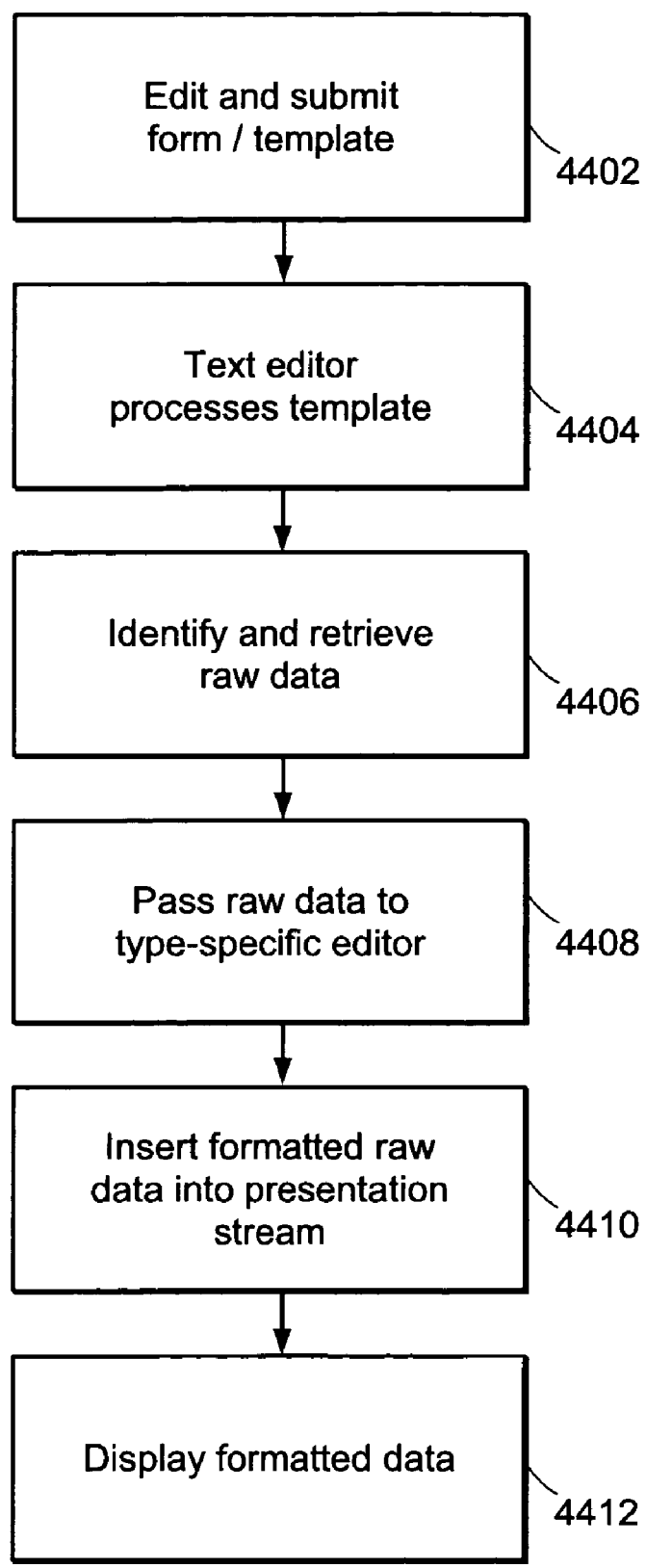
FIG. 44 shows a flow diagram for effecting use of a secondary text tool in accordance with the present invention.

Referring to FIG. 44, at step 4402, a user submits a form such as shown in FIG. 39 in any known conventional manner. For example, the user can click on an Add icon or button 4010 such as shown in FIG. 40. In addition or alternatively, a user can click on preview icon 3906, which can display another Add icon (not shown) for the user to click.

At step 4404, logic in text editor 3900 begins processing the template, such as shown at 4304 in FIG. 43. At step 4406, when a raw data identifier is reached, such as the @X@ delimiter, the processor can use the identifier, such as "some_id," as indicated by, for example, the "type-spec" specifier to look up the associated raw data.

At step 4408, the raw data is passed to the associated type-specific editor 3902, 3904, which provides, for example, a getPresentationFormat( ) method.

At step 4410, the return of the getPresentationFormat( ) method is inserted into a presentation stream for display, such as shown at 4302 in FIG. 43. Thereafter, at step 4412, the data is formatted for display, as shown in FIG. 44. FIG. 41 shows the resulting data 4102 that is rendered from the data referenced by placeholder 3920.

Declaring Security Attributes in Modular, Extensible Components

One or more embodiments of the present invention also provide a mechanism to extend system functionality by including security attributes for the hyperlinks. More particularly, one or more embodiments of the present invention can be deployed in a web-based environment, in which administrators (or others) may remotely upload (or otherwise provide) system 100 package(s) that contain a descriptor, called a manifest. As known to those skilled in the Java programming language, a manifest is a member file inside a Java Archive File (JAR) file that describes the contents of the JAR archive. Other analogous or similar techniques can be used in other high level programming languages.

In one or more embodiments of the present invention, a framework for developing external applications and "hooking" them directly into system 100 is provided. More specifically, the APIs 1040e (FIG. 1B) provide application program interfaces for packaging and deploying extensions 1040d within system 1000. The APIs 1040e allow, for example, third-party vendors, developers, and institutions to build extensions 1040d, such as new applications, extend existing technologies, and integrate them into system 1000. In one or more embodiments of the present invention, APIs 1040e allow third parties to provide extensions 1040d (FIG. 1B) that enhance system 1000 functionality. The API's facilitate installation of the plug-ins 4514 into system 1000 for use in areas such as course announcements, documents and membership, security, calendars, announcements and gradebooks, as will be subsequently discussed. An extension 1040d can be developed utilizing the Java Servlet 2.2.x specification, which is incorporated herein by reference. In one or more embodiments of the present invention, extensions 1040d can be a collection of JavaServer Pages (JSP) (plug-ins). However, any individual(s) or organization(s) can develop the plug-ins. This feature of the present invention advantageously enables third parties to provide additional functionality that can be integrated with system 1000 in a manner that does not impact or affect system 100 development cycles.

As used herein, an exemplary plug-in can be implemented as a set of scripts that are installed on server 161 shown in FIG. 1C or on server 1040 at Extension 1040d shown in FIG 1B. The scripts may be invoked via Uniform Resource Locators (URLs). Plug-ins generally access to the supported APIs, and may query or modify any data accessible via these interfaces. Scripts, such as a configuration script and a launch script, can be utilized as entry points for managing and interacting with plug-ins.

One or more embodiments of the present invention utilize, for example, a standard Java manifest to include (or contain) information about the hyperlinks available within the extension(s) 1040d provided to system 1000. Once the manifest is installed, the system 100 shown in FIGS. 1A and 1C, and system 1000 shown in FIG. 1B, can utilize those requirements provided in the manifest by, for example, evaluating the role of the user accessing a particular hyperlink.

In one or more embodiments, each link entry in a manifest can contain information about user roles that determine whether the user has access to a hyperlink. Standard hyperlinks are used on various FIGs. of the present application, such as FIG. 11 at hyperlinks 1102, 1104, and FIG. 16 at hyperlinks 1616, 1618, 1620, 1622, 1624, and 1626. Other hyperlinks on these and other FIGs. are too numerous to cite individually, but are considered within the scope of the present invention.

Figure 45:
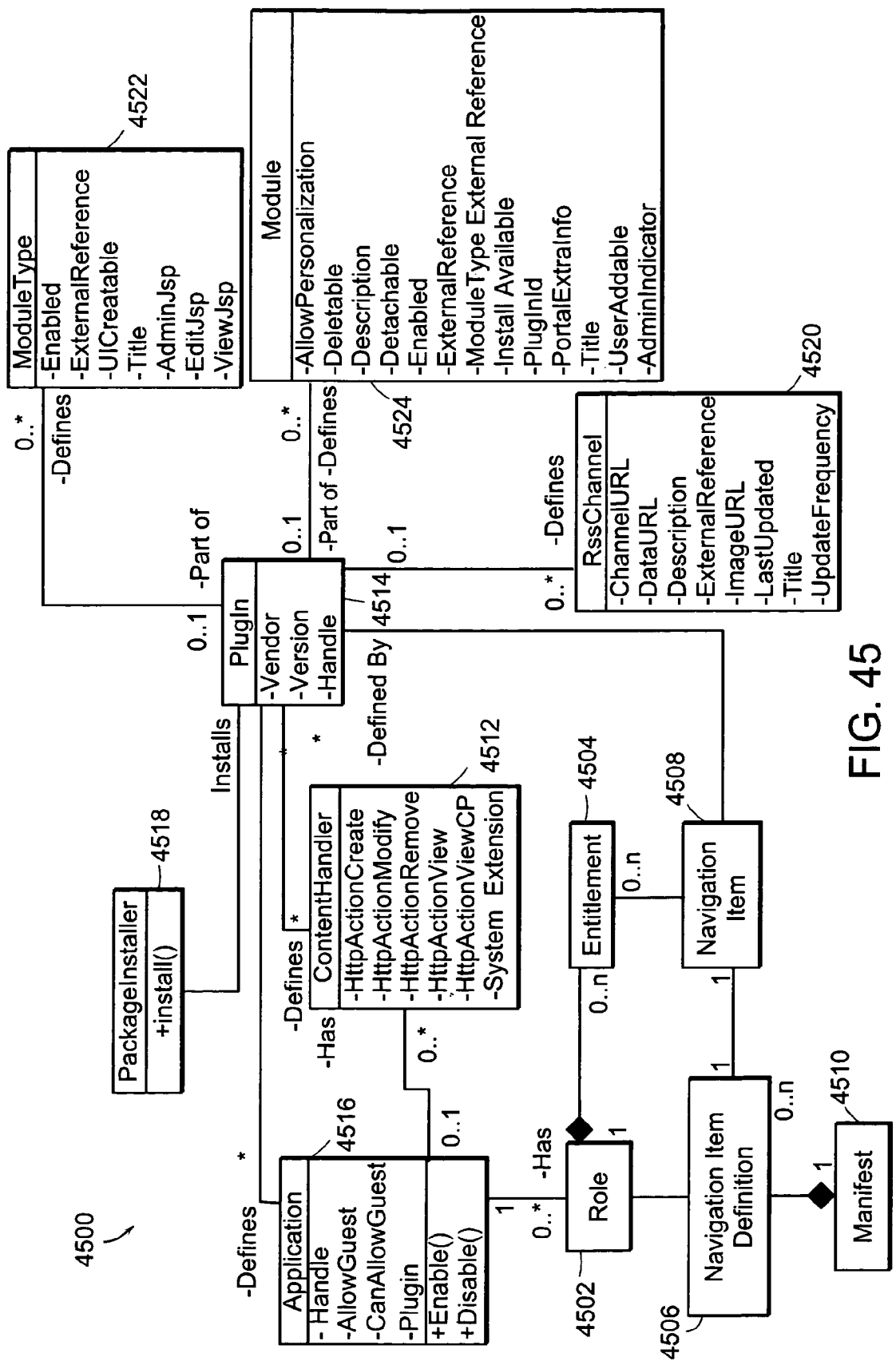
FIG. 45 shows an embodiment of data entities that can be used to provide system extensibility in accordance one or more embodiments of the present invention.

FIG. 45 shows an exemplary embodiment of data entities that can be used in accordance one or more embodiments of the present invention to model plug-ins 4514 and how they relate to both functional subsystems, and user interface components. The data entities are as follows:

Role. A role 4502 is an attribute assigned to users of system 100, 1000 that determines the user's access rights with respect to the system 100, 1000. Alternatively, or in addition, system 100, 1000 is provided a level of security with respect to a user's role. Exemplary roles are provided as follows:

A—User Administrator
C—Course Administrator
H—System Support
O—Observer
S—Support
Y—Portal Administrator
Z—System Admin
B—Course Builder
I—Instructor
T—Teacher's Assistant Navigation Item. An exemplary navigation item 4508 can be defined as data that pertains to or describes a hyperlink that is recognized by and/or can be stored in connection with system 100, 1000. Navigation Items 4508 model the navigation framework of system 100, 1000. They can be used to render links to various system 100, 1000 web pages, as well as render the 'entry points' for plug-ins 4514. As used herein, an entry point is a hyperlink that can be rendered as part of an uploaded (or otherwise installed) system extension. Plug-ins 4514 should be recorded and tracked in a standard registry for administrative control. A view of the registry can be used to render the entry points for each plug-in's configuration scripts.

Navigation items can be stored in system 100, 1000, such as at database 1020 shown in FIG. 1B. For example, once the system 100, 1000 has a manifest installed by using plug-in manager 1014 shown in FIG. 1B, database 1020 may be updated to indicate one or more hyperlinks, and the roles associated with the hyperlinks.

Navigation Item Definition. A navigation item definition 4506 is a description of a navigation item contained in a manifest. Each navigation item definition can contain information pertaining to the navigation item, and roles that are allowed to access the navigation item. With respect to the sample code shown below, an embodiment of the navigation item definition can include, for example, a link label (indicated by lines (a1) and (a2) below) that indicates a new URL is being provided (indicated by line (c) below), a description of the plug-in (indicated by lines (b1) and (b2) below), and role information (indicated by line (d) below).

In addition, the navigation item definition 4506 can include a type value (indicated by line (e) below) that indicates the type of the tool, such as a communication tool, a system tool, and the like. Line (f) below can include a string indicating the vendor (in this case, Bb) and the vendor's name for the tool (in this case, Sample Explicit Roles Tool). Line (g) below can indicated the vendor's name for the plug-in handle that can be used with a particular manifest syntax, as will be described herein. Finally, lines (h1)-(h3) below can provide a standard container element for individual icon definitions. Icons provide additional visual context in the application, and allow plug-ins 4514 to be branded within the look and feel of system 100, 1000. Plug-ins 4514 can optionally provide a set of icons for each content handler they support. Collaboration plug-ins can provide a single set of icons.

```
<link>                                                  (a1)
    <type value="system_tool:system_tools"/>            (e)
    <name value="Bb Sample Explicit Roles Tool"/>       (f)
    <handle value="system_tool_with_roles_hook"/>       (g)
    <roles value="Z,H" />                               (d)
    <url value="links/tool2.jsp?mode=73" />             (c)
    <description value=                                 (b1)
        "Demonstrates adding tools to the system        (b2)
        administration panel" />
    <icons>                                             (h1)
        <listitem value="images/icon.gif"/>             (h2)
    </icons>                                            (h3)
</link>                                                 (a2)
```

Entitlement. Entitlement 4504 is one of the security attributes required to access a given navigation item 4508. An entitlement encodes a specific operation for a type of object. For example, the entitlement of course.MODIFY can indicate that the user can modify the properties of a given course object.

Content Handlers. A content handler 4512 is an entity that ties content to a script processor, and by extension, custom business logic. A plug-in 4514 may define one or more content handlers 4512. There are 'built-in' handlers that system 100, 1000 uses to manage the basic content of a course. Content handlers 4512 can also be capable of over-riding the built-in content handlers.

Content handlers 4512 have a 'handle' that is used to associate the content handler 4512 with, for example, course documents. The handle may be a semi-descriptive string identifier that can be similar to, for example, a MIME type identifier. Handles can also be used in the import/export process to determine the type of a resource in the exported course package.

Handles can define a course document's 'type,' such as a .pdf file or a .doc file, and are preserved even if a content handler 4512 is not installed on the system, or has been removed. This means that content can advantageously be re-associated with a handler if one is removed, or imported into a system that does not have the content handler 4512 installed. The content is preserved so that a handler can be installed at a later time.

Manifest. A manifest 4510 is a member file inside a Java Archive File (JAR) file that describes the contents of the JAR archive. The manifest is a record of the plug-in 4514 and its components.

Figure 46:
FIG. 46 shows an exemplary data structure that can be used to store user names, and their associated role(s) and system entitlement(s).

To install a manifest file, a JAR file is uploaded or otherwise provided to system 100, 1000. Plug-in manager 1014 (FIG. 1B) can read the package definition, which can be done in a conventional manner. For each navigation item definition 4506 in the package, system 100, 1000 can read any required roles, create a new entitlement for appropriate users, and link required roles to new entitlements. Any new entitlements and linkage of roles to new entitlements can be stored in database 1020 in a format such as shown in FIG. 46 at 4600. Either a flat file database or a relational database can be used. The result is that the security structure of the system is dynamically modified and/or adapted to accommodate the contents of a JAR file.

An example of a formal composition of a manifest is as follows:

| | | |
|---|---|---|
| <manifest> | → | <plugin> |
| <plugin> | → | <name><deployment><handle><description><vendor><version><requires><http-actions><links>?<content-handlers>?<application-defs>?<module-defs>?<permissions>? |
| <deployment> | → | none \| ( webapp \| module )* |
| <vendor> | → | <id><name><url><description> |
| <name> | → | string |
| <id> | → | string |
| <url> | → | fully qualified url |
| <description> | → | string |
| <version> | → | string of the form n.n.n, where n is a non-negative number, e.g., 1.0.1 |
| <requires> | → | <bbversion> |
| <bbversion> | → | string of the form n.n.n, where n is a non-negative number, e.g., 1.0.1. Corresponds to the required Blackboard version (e.g., 5.5.0) |
| <http-actions> | → | (<config><remove>?) \| (<create><modify><remove>) |
| <config> | → | relative path |
| <remove> | → | relative path |
| <create> | → | relative path |
| <modify> | → | relative path |
| <icons> | → | (<listitem>\|<toolbar>)+ |
| <listitem> | → | relative path |
| <toolbar> | → | relative path |
| <content-handlers> | → | <content-handler>+ |
| <content-handler> | → | <name><handle><http-actions><icons> |
| <links> | → | <type><name><url><description><icons> |
| <type> | → | tool \| communication |
| <roles> | → | A \| C \| H \| O \| S \| Y \| Z \| B \| I \| T |
| <application-defs> | → | <application>+ |
| <application> | → | <handle><name><label><app-type><links><use-ssl>?<can-allow-guest>?<large-icon><can-relabel>? |
| <app-type> | → | system \| course \| shared |
| <use-ssl> | → | true \| false |
| <can-allow-guest> | → | true \| false |
| <can-relabel> | → | true \| false |
| <large-icon> | → | relative path |
| <module-defs> | → | <module>+\|<rss-channel>+\|<module-type>+ |
| <module> | → | <type><isadmin><useraddable><isdeletable><title> |
| <rss-channel> | → | <data-url><link-url> |
| <module-type> | → | <jsp-dir><jsp> |
| <jsp> | → | <view><edit><admin> |
| <permissions> | → | <permission> |
| <permission> | → | <name><actions> |

The table below describes the relationship between the manifest definition, and the XML used to encode the manifest. The following table thus describes the format of an XML file that, for example, a third party or other developer could provide as part of a JAR.

TABLE 1

| Element | Attributes | Description | Contains |
|---|---|---|---|
| | | XML Binding | |
| manifest | None | Root element | plugin |
| plugin | | Container element for the plug-in definition. | name, handle, description, version, requires, vendor, http-actions, content-handlers, links |
| name | Value | Name of the plug-in | |
| handle | Value | Plug-in handle. The vendor id, plug-in handle, and plug-in version uniquely identify plug-ins in a system. | |
| description | Value | A description of the plug-in | |
| vendor | None | Element containing vendor information | id, name, url, description |
| id | Value | Four-character id for the vendor assigned by Blackboard | |
| name | Value | Vendor name. | |
| url | Value | Vendor web site URL. | |
| description | Value | A description of the vendor | |
| version | Value | String indicating version. This should be of the form major.minor.patch. All components should be numeric. | |
| requires | | Indicates system requirements. Bbversion is the Blackboard product version. | bbversion |
| bbversion | Value | Blackboard product version required for plug-in. | |
| icons | None | Container element for individual icon definitions | |
| toolbar | Value | Definition for a tool bar icon. Currently not used in the application. | |
| listitem | Value | Definition for a list item icon. Value is a relative path to the icon file. It is evaluated in the same manner as the script path. | |
| content-handlers | | The collection of content-handler objects. | |
| content-handle | | An entity for managing custom content types. | name, handle, http-actions, icons |
| links | | The collection of links used to define student/instructor tools and communication tools. | link |
| link | | Defines the entry point for the plug-in if it provides a 'tool' | type, name, url, description, icons |
| type | Value | Defines the type of tool. Value is one of communication or tool | |
| url | Value | Defines the link to render for the tool. The link may include template information, as defined in the Context Passing specification. | |
| roles | Value | Defines roles that may have access to this link. Possible values include:<br>A - User Administrator<br>C - Course Administrator<br>H - System Support<br>O - Observer<br>S - Support<br>Y - Portal Administrator<br>Z - System Admin<br>B - Course Builder<br>I - Instructor<br>T - Teacher's Assessment | |
| http-actions | | Defines the collections of HTTP scripts that can be invoked for particular functions. | Create, modify, remove, config |
| create | Value | Used to create custom content | |
| modify | Value | Used to modify custom content | |
| remove | Value | Used to remove custom content in the content-handler context. Also used as an entry to assist in removing the plug-in, in the plugin context. | |
| config | Value | Link to the script for plug-in configuration | |

The code below is an example of code that can be developed using Table 1 above.

```
<manifest>
  <plugin>
    <name value= "Sample Plugin"/>
    <handle value= "plgnhndl"/>
    <description value= "This plugin is a sample."/>
    <version value= "1.2.3"/>
    <requires>
      <bbversion value="5.0.0"/>
    </requires>
    <vendor>
      <id value="smpl"/>
      <name value="Sample Vendor"/>
      <url value="http://www.samplevendor.com/" />
      <description value="The description of the sample vendor goes here." />
    </vendor>
    <http-actions>
      <config value="admin/config.jsp"/>
      <remove value="admin/remove.jsp"/>
    </http-actions>
    <content-handlers>
      <content-handler>
        <name value="Blackboard Sample Plug-in: HTML Block"/>
        <handle value= "resource/x-smpl-type1"/>
        <http-actions>
          <create value="ch1/create.jsp"/>
          <modify value="ch1/modify.jsp"/>
          <remove value="ch1/remove.jsp"/>
        </http-actions>
        <icons>
          <toolbar value="/images/add_ch1.gif"/>
          <listitem value="/images/icon.gif"/>
        </icons>
      </content-handler>
      <content-handler>
        <name value="Blackboard Sample Plug-in: Text Block"/>
        <handle value= "resource/x-smpl-type2"/>
        <http-actions>
          <create value="ch2/create.jsp"/>
          <modify value="ch2/modify.jsp"/>
          <remove value="ch2/remove.jsp"/>
        </http-actions>
        <icons>
          <toolbar value="/images/add_ch2.gif"/>
          <listitem value="/images/icon.gif"/>
        </icons>
      </content-handler>
    </content-handlers>
    <application-defs>
      <application>
        <links>
          <link>
            <type value="tool"/>
            <name value="Sample Tool 1"/>
            <roles value="Z,H"/>
            <url value="links/tool1.jsp" />
            <description value="The description of Sample Tool 1." />
            <icons>
              <listitem value="/images/icon.gif"/>
            </icons>
          </link>
          <link>
            <type value="communication"/>
            <name value="Sample Communication Tool 2"/>
            <url value="links/tool2.jsp?mode=73" />
            <description value="The description of Sample Communication Tool 2." />
            <icons>
              <listitem value="/images/icon.gif"/>
            </icons>
          </link>
        </links>
      </application>
    </application-defs>
    <module-defs>
```

-continued

```
      <rss-channel ext-ref="" title="Blackboard News">
        <data-url>http://p.moreover.com/cgi-local/page?c=Sports%3A%20ice%20hockey%20news&o=rss</data-url>
      </rss-channel>
        <module type="portal/includetext" isadmin="true" useraddable="true" isdeletable="true" title="Sample Plug-In Module">
          <description>Sample uploaded module</description>
          <ExtraInfo>
            <property key="body.text" type="String">This module was installed as part of the sample plugin. It uses the basic 'includetext' module type.</property>
          </ExtraInfo>
        </module>
    </module-defs>
    <permissions>
      <permission type="attribute" name="user.firstname" actions="read"/>
    </permissions>
  </plugin>
</manifest>
```

Plug-In. A plug-in 4514 is a unit of extension to the system 100, 1000. A plug-in 4514 may have zero or more associated navigation items 4508, and may define zero or more content handlers 4512.

Plug-ins 4514 may make use of a collection of APIs 1040e (FIG. 1B) and/or other system 100, 1000 interfaces to facilitate interaction with system 100, 1000 data and services. Plug-ins 4514 can utilize APIs 1040e to facilitate the following types of interactions with system 100, 1000. A content API can be used to create, modify and/or remove course documents, and to create a visual presence, such as HTML, for custom content types to be included in the rendering of a course document. A session API 1040e can be used to query user authentication status and/or to query session information.

An authorization API 1040e can be used to verify a user's system role or assigned entitlements and/or to verify a user's role in course. A Gradebook API 1040e can be used to allow custom content types and/or collaboration tools to interact with the grade repository for a given course.

A context interface can be used to pass predefined information via URL parameters. For a user interface, tag libraries are provided to render HTML conforming to the look and feel of system 100, 1000.

Plug-ins 4514 may define a module 4524, similar to modules 510 in FIG. 5. ModuleType 4522 may be used to define additional module 4524 characteristics and behaviors, such as rendering custom data. Additionally, plug-ins 4514 may define applications 4516 used in the course context, such as shown in FIGS. 8-13, including generic course and communication tools.

Content. Content plug-ins 4514 can provide the ability to add custom content types and extensions. Content plug-ins 4514 can be used by course instructors in the content areas to create and display custom content types. When installed, a content plug-in 4514 can provide custom content that may appear, for example, in FIG. 9.

Communication. Communication plug-ins 4514 are preferably made available to students and instructors via the "Communication" section of a course. Such plug-ins can provide additional capabilities in, for example, a chat/whiteboard environment and/or a virtual biology lab. When installed, a communication plug-in 4514 may appear as one of items 1202, 1204, 1206, 1208, 1210 or 1212 shown in FIG. 12.

Student Tool. A student tool plug-ins can provide supplemental capabilities. When installed, a student tool plug-in 4514 may appear, for example, in FIG. 14 as one or more of items 1402, 1404, 1406, 1408, 1410, 1412, 1414, 1416, 1418.

Course Tool. A course tool plug-in 4514 can be provided to a student or instructor in, for example, Course Tools, as shown in FIG. 16, at Course Tools area 1606.

System Tool. A system tool plug-in can be provided to a system administrator using, for example, the System Admin tab 506 shown in FIG. 5.

Application. Application objects 4516 tie together tool entry points so that they can be managed through a central entity. Plug-ins 4514 define zero or more applications. If no applications 4516 are explicitly defined, one is created by default. If one or more applications 4516 is defined in the plug-in manifest 4510, then no default application 4516 is created.

Package Installer. Package installer 4518 can be implemented as an installation script that reads the manifest 4510, records the database 1020 entries, and copies files to locations defined by file system rules.

A plug-ing 4514 package can be extracted into a plug-ins directory, such as C:\blackboard\plugins\, using the internal plug-in handle plus additional virtual installation information. For example, a plug-in with the handle qmrk-perception may be expanded into <blackboard>/plugins/qmrk-perception-vuid, where vuid is a virtual installation unique identifier.

For new plug-in 4514 installations, different actions can be taken during installation based on plug-in type. In most cases, an entry is preferably made in the plug-in registry on server 1040 (FIG. 1B). After copying files to the appropriate locations, a configuration script may be launched. Some plug-ins may require additional, manual configuration steps, such as modifying library paths, and a re-start of the application server. Configuration scripts can still respond to the initial configuration request, if even to display additional directions and notify the user a re-start is necessary. This means that configuration scripts can provide a mechanism to recover from missing libraries, etc.

Plug-in 4514 upgrades may be recognized if, for example, the plug-in 4514 name matches that of an installed plug-in 4514, and the version is greater than the version of the currently installed plug-in 4514. Plug-ins can also be removed from the system 100, 1000 in a standard manner.

A plug-in 4514 installation package can be provided in the form of, for example, a ZIP file containing two parts: a manifest 4510 and a file collection. The manifest may be an XML file named, for example, bb-manifest.xml conforming to the below definition. The file collection contains the files (scripts, icons, libraries, and the like) specified in the manifest and web application definition.

For Java-based plug-ins 4514, the installation package can be provided in the form of a .war (web archive) file, which includes the manifest in the following location: WEB-INF/bb-manifest.xml.

A manifest can include one or more plug-in definitions:

a) plugin is the root component of a plug-in definition.

b) vendor is a collection of elements used to provide information about the vendor providing the plug-in.

c) Deployment is an attribute that defines what the physical processing of the package is. A value of none can indicate that the manifest only defines links to external system. A value of webapp can indicate that the package needs to be expanded into the extensions directory.

d) id is a (optional four-character) string assigned by Blackboard to help avoid file system collisions, etc.

e) name is the name of the plug-in.

f) url is a home page for the vendor.

g) description is a human readable description for the vendor.

h) version is the vendor-defined version string for of the plug-in. A version may be in a form such as major.minor.patch (e.g., 6.2.1).

i) requires indicates what software versions are required for the installation.

j) bbversion is the component to indicate the version of the system 100, 1000 platform required for the plug-in to operate. Once installed into the system 100, 1000, the relative paths can be evaluated to URLs. The plug-in has a home URL, which can be defined as /plugins/<plugin-id>, where <plugin-id> the string created by combining the vendor id and the plug-in handle. For example, with vendor id named smpl, and a plug-in handle of plgnhndl, the home URL would be /plugins/smpl-plgnhndl/.

k) config references a script (via a relative path) used for configuring the plug-in.

l) Create references a script used to create custom content types.

m) Modify references a script used to modify custom content types.

n) Remove references a script (via a relative path) used to remove the plug-in, or to remove custom content types. The management infrastructure of the system 100, 1000 actually handles removing the plug-in, but the remove script is invoked to allow the plug-in to perform any clean up, such as notifying an external system. Likewise, the content subsystem handles removing the content, but the remove script may also perform additional clean up tasks, such as decrementing a reference count on an external server.

The icons element represents a collection of icon elements used when rendering the entry points.

listitem is the icon definition for a list item icon. The value preferably is a relative path.

toolbar is the icon definition for a toolbar icon.

content handlers are the entities that can define custom content types in the system content-handler is the actual definition of a custom content type.

name is used to provide a human readable identifier for the content handler. This can be displayed to the user when rendering the "Add Other" content type screen.

handle is overloaded for content handlers to define a string to associate the type with a course document.

http-actions, in the context of a content-handler, define the scripts associated with custom content. Valid sub-elements are, for example, create, modify, and remove.

The Java™ Servlet API Specification, versions 2.2 and higher, by Sun Microsystems, Inc. can define the layout of file systems within the .war file. The Java™ Servlet API Specification, versions 2.2 and higher, are incorporated herein by reference in its entirety.

A description of the various sub-directories that may be included in WEB-INF is as follows:

TABLE 3

WAR File Layout

| Directory/File | Description |
| --- | --- |
| WEB-INF/classes/ | Expanded class files. |
| WEB-INF/lib/ | JAR files for an application. JAR files may include developed libraries and/or third party libraries included as utilities. |
| WEB-INF/web.xml | The web application deployment descriptor |
| WEB-INF/bb-manifest.xml | A proprietary package definition (required by a proprietary package specification) |
| / | The root directory for any plug-in files. The root directory may include plug-ins JSP scripts, images, and the like. |

A plug-in 4514 can also be used to create a new module type, in addition to the six modules shown in FIG. 24. A plug-in 4514 can be used to change an existing module, such as modules 2414, 2428, 2432, 2437, 2442, 2452, 2460 and/or 2479 shown in FIG. 24. For example, a plug-in 4514 can allow an existing module to be personalized.

A plug-in 4514 can also define a standard Rich Site Summary (also known as RDF Site Summary) (RSS) 4520, which is a content format that enables site owners, and other content producers, to make information available to others. In particular, RSS is a method of describing news or other web content that is available for "feeding" (distribution or syndication) from an online publisher to web users. RSS is an application of XML that adheres to the World Wide Web Consortium's Resource Description Framework (RDF). RSS can be used to describe news or other web content that is available for "feeding" (distribution or syndication) from an online publisher to Web users. For example, RSS allows one web site to acquire or display material from another site, or an application called an aggregator to show a user what information is available for retrieval.

Plug-in 4514 entry points can be exposed by navigation items 4508 and content handlers 4512. The http-actions defined in the manifest 4510 can be used to render content handlers 4512. Navigation items 4508 in the family "communication" can be used to render collaboration plug-ins. The "tool" family can be used to render student/instructor tools. Table 3 below provides examples of rendering context, the rendering, and elements.

TABLE 5

Navigation Item Rendering

| Rendering Context | What is Rendered | Applies to |
| --- | --- | --- |
| Control Panel Content Area, Action Bar | Content handlers title. | Content Handler |
| Control Panel Content Area, list content view | Modify and Remove buttons rendered as links to modify and remove scripts, respectively. Content item Title rendered as a link to http-action-cpview, if defined. | Content Handler |
| Content Area, display | Content item Title rendered as a link to http-action-view, if defined. Content item body rendered by Course Document renderer (see below), with content-handler's list icon. | Content Handler |

TABLE 5-continued

Navigation Item Rendering

| Rendering Context | What is Rendered | Applies to |
| --- | --- | --- |
| Admin Panel, Manage Plug-ins | Displays built-in Properties and Remove icons, linking to "config" script | Content, Communication, Tool |

Figure 47:
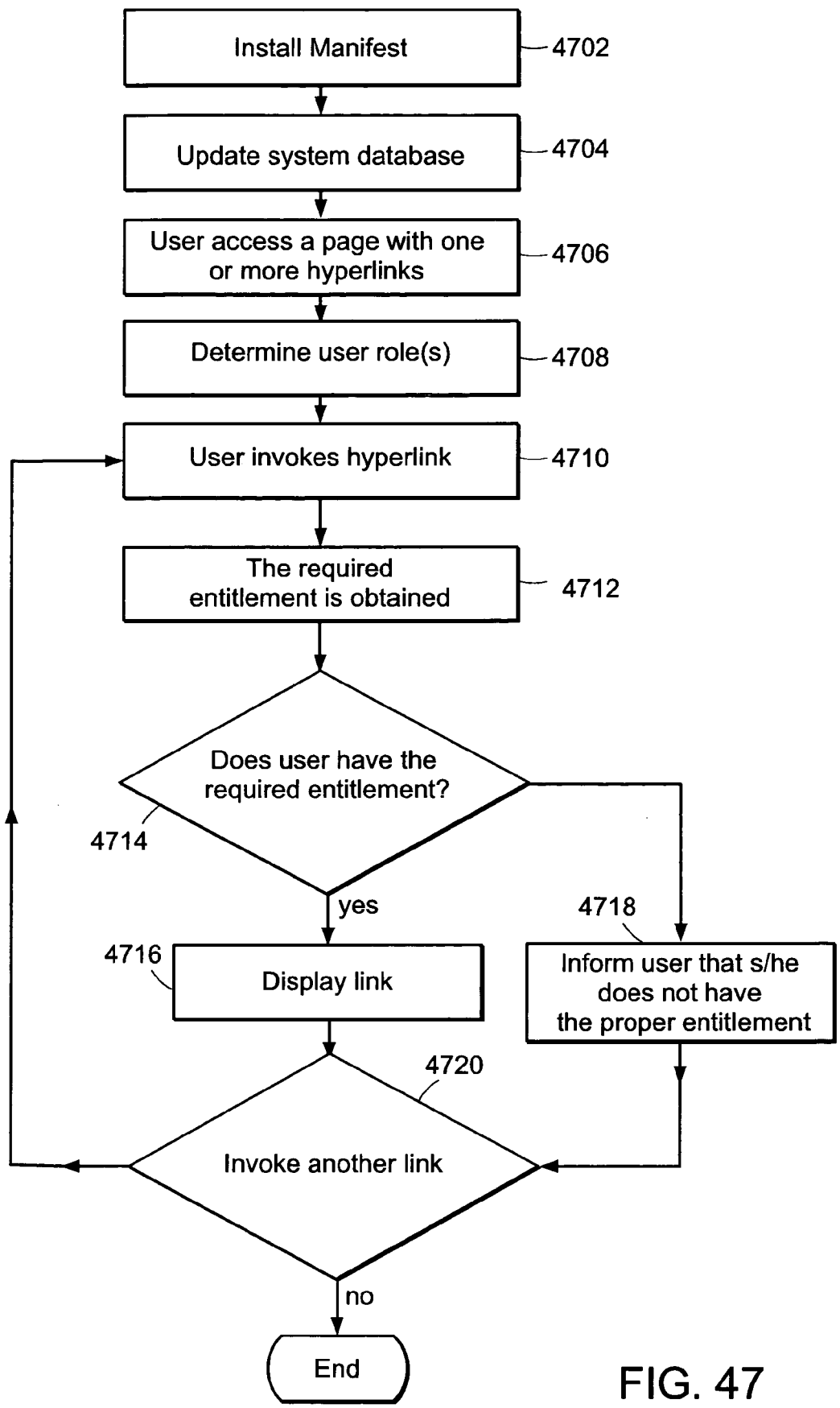
FIG. 47 is a flow diagram that can be used to provide system extensibility.

FIG. 47, generally at 4700, shows an exemplary method in accordance with one or more embodiments of the present invention. At step 4702, a manifest, optionally provided by a third party, is installed on system 100, 1000, as described above. At step 4704, a system 100, 1000 database is updated in accordance with manifest contents, as indicated by FIG. 46.

At step 4706, a user accesses a page displaying one or more hyperlinks registered to (or with) system 100, 1000. At step 4708, information from the request (the user clicking on a hyperlink) can be used to determine the user's role. The hyperlink can be displayed in a standard manner by web browsers implementing the HTTP and HTML standards. A conventional cookie, for example, can be used in a browser to identify a user. The cookie can be generated, for example, when the user accesses or logs into or provides credentials to system 100, 1000.

At step 4710, a user invokes a hyperlink by using, for example, a standard mouse. At step 4712, the system 100, 1000 determines the entitlement for the hyperlink. For example, in accordance with one or more embodiments of the present invention, line (d) of the code above indicates that the URL has roles Z and H associated therewith. At step 4712, the system 100, 1000, for each user, can provide predetermined associations between roles and entitlements, thereby determining if the user is able to access the hyperlink based on the user's role. The associations, such as shown in FIG. 46, can be stored in database 1020.

At decision step 4714, a determination is made whether the user has the required entitlement to invoke or access the hyperlink. If it is determined that the user has the required entitlement, the hyperlink and/or any content associated therewith is displayed at 4716. In this case, if the user is assigned a role of Z or H, the user would be entitled to access the hyperlink. At decision step 4720, if the user chooses to invoke another hyperlink, the user is returned to step 4710. If no additional hyperlinks are invoked, the process ends.

If at decision step 4714 it is determined that the user does not have the required entitlement, at step 4718 the user is informed that s/he does not have the proper entitlement to access this link. At decision step 4720, the user can invoke another hyperlink at step 4710, as described above.

Figure 49:
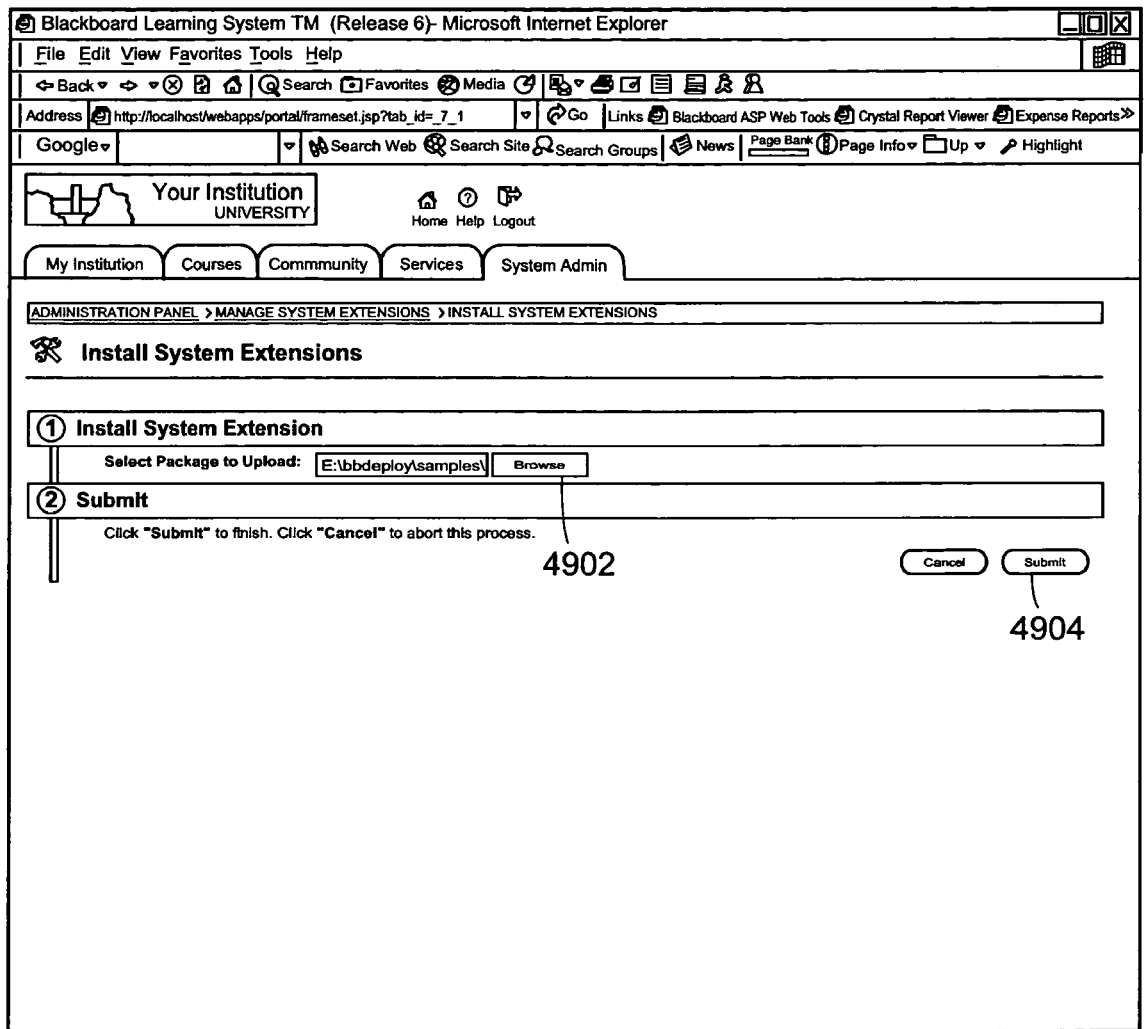
FIG. 49 is an install system extensions screen display that enables a plug-in to be installed in the system.

In accordance with the method and techniques described above, FIGS. 24 and 48-52 are screen displays that illustrate how installation of a plug-in can affect system 100, 1000 screen displays. In particular, FIG. 24 is an administration screen display before a plug-in 4514 is installed in system 100, 1000. FIG. 48, generally at 4800, shows a system extensions administration screen display before a plug-in 4514 is installed in system 100, 1000 by using plug-in manager 1014 (FIG. 1B). By clicking on link 4802, an administrator is taken to a screen display such as shown in FIG. 49, which enables a plug-in to be installed in system 100, 1000. Clicking Browse button 4902 allows an administrator to select the name of the plug-in 4514 to be installed. Once the plug-in 4514 is selected, the Submit button 4904 can be selected to install plug-in 4514.

Figure 50:
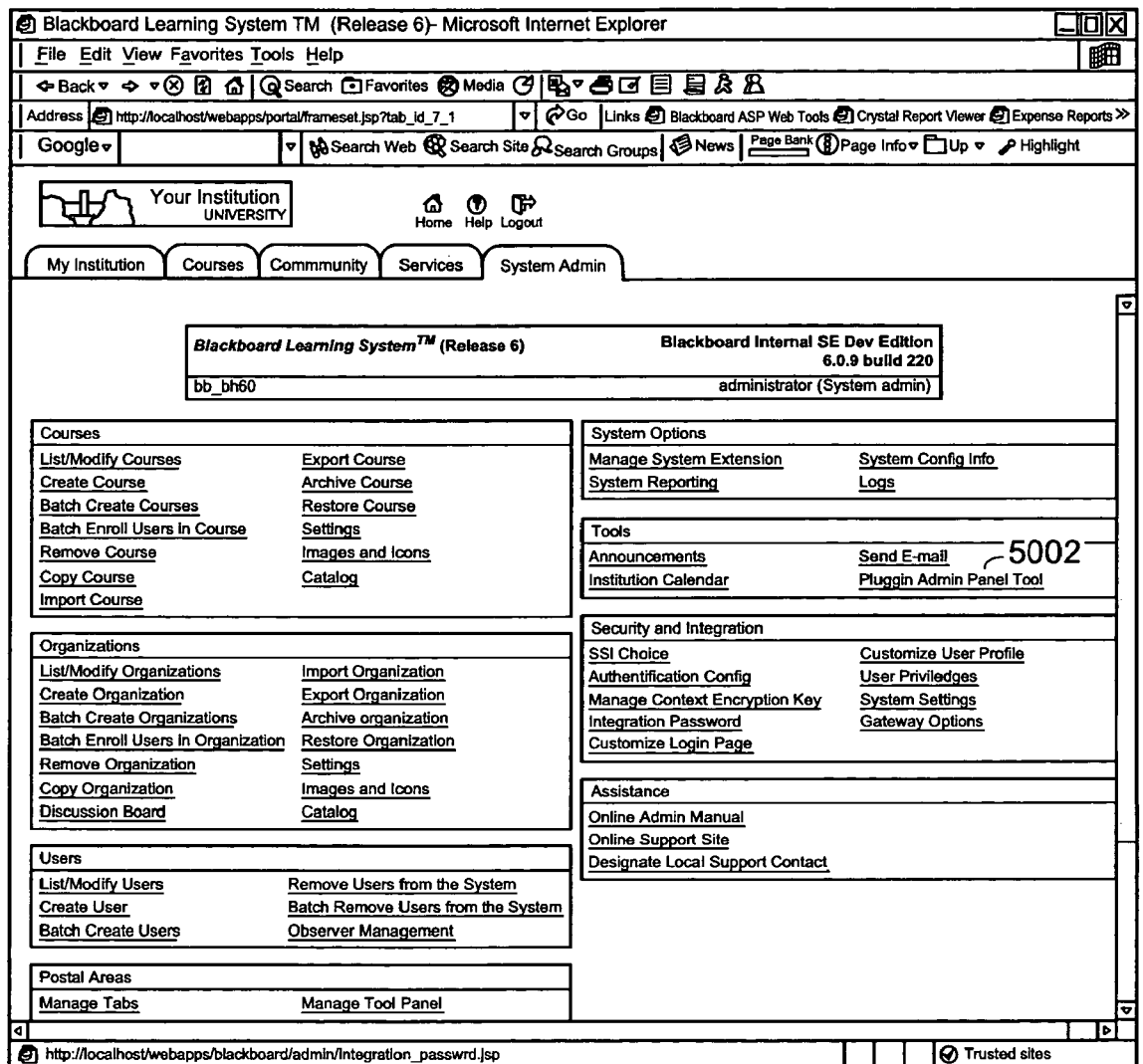
Figure 51:
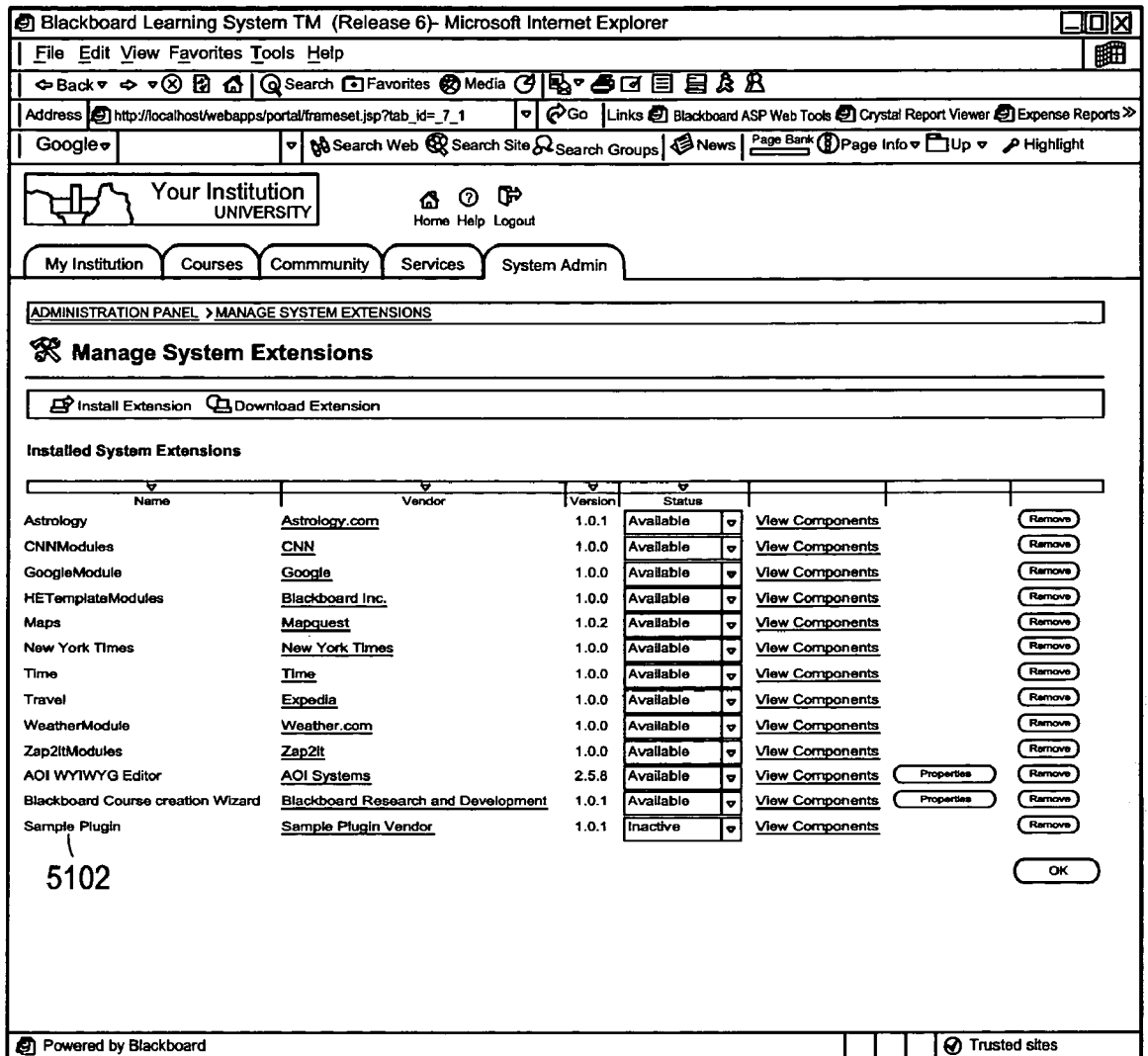

FIG. 50, generally at 5000, shows a modified version of FIG. 24 subsequent to the installation of the plug-in 4514. Note that Plugin Admin Panel Tool link 5002 is present in FIG. 50, but is not present in FIG. 24. Similarly, FIG. 51, generally at 5100, shows the system extensions administration screen display shown in FIG. 48, subsequent to installation of the plug-in 4514. In particular, Sample Plugin 5102 is present in FIG. 51, but is not present in FIG. 48.

While various embodiments of the invention have been disclosed and described in detail herein, it may be apparent to those skilled in the art that various changes in form and detail may be made therein without departing from the spirit and scope thereof. In addition, titles and descriptions included in the Figures are included to disclose the best mode contemplated by the inventor at the time of filing, and should not be construed as limiting the invention.

What is claimed is:

1. A method for providing an extensible educational system having educational content, the method comprising the steps of:
    providing a user interface;
    installing on a server a file compatible with a known application program interface (API), wherein the installed file utilizes the known API to modify the user interface for at least one user of the system;
    invoking an enhanced system functionality by using the modified user interface, the enhanced system functionality providing an additional ability to edit the educational content;
    specifying in the file one or more roles of a user that can utilize the enhanced system functionality;
    determining if the user has rights to utilize the enhanced system functionality based on the role of the user; and
    if the user has rights to utilize the enhanced system functionality based on the role of the user, then granting access to the user to use the additional ability provided by the enhanced system functionality to edit the educational content.

2. The method according to claim 1, further comprising the step of storing the one or more roles into a system data repository.

3. The method according to claim 1, wherein the enhanced system functionality is provided by at least one of a hyperlink and an icon.

4. The method according to claim 1, wherein the one or more roles comprise at least one of: user administrator, course administrator, system support, observer, support, portal administrator, system administrator, instructor, student and teacher's assistant.

5. The method according to claim 1, further comprising the step of denying access to the enhanced system functionality if the user does not have access rights.

6. The method according to claim 1, wherein the file is installed on the server by using a Java archive file.

7. An extensible educational system having educational content comprising:
    a computer-readable memory configured to store a user interface;
    a plug-in manager configured to install a file compatible with an application program interface (API),
    wherein the installed file utilizes the known API to add new functionality to the extensible education system by modifying the user interface, the new functionality invoked by the modified user interface to provide an additional ability to edit the educational content, and
    wherein the file specifies one or more roles of a user that can utilize the enhanced system functionality; and
    an authentication user interface configured to verify a role of a user in the extensible educational system, and grant or deny the user access, based on the role of the user in the extensible educational system, to use the additional ability provided by the new functionality to edit the educational content, wherein the role of a user comprises at least one of: user administrator, course administrator, system support, observer, support, portal administrator, system administrator, instructor, student and teacher's assistant.

8. The system of claim 7, wherein the plug-in manager and the authentication user interface are invoked using the user interface.

9. A method for providing an extensible educational system having educational content, the method comprising:
    displaying a user interface;
    invoking a plug-in manager configured to install a file compatible with an application program interface (API),
    wherein the installed file utilizes the known API to add new functionality to the extensible education system by modifying the user interface, the new functionality invoked by the modified user interface to provide an additional ability to edit the educational content, and
    wherein the file specifies one or more roles of a user that can utilize the enhanced system functionality; and
    invoking an authentication user interface configured to verify a role of a user in the extensible educational system, and grant or deny the user access, based on the role of the user in the extensible educational system, to use the additional ability provided by the new functionality to edit the educational content.

10. The method of claim 9, wherein the role of a user comprises at least one of: user administrator, course administrator, system support, observer, support, portal administrator, system administrator, instructor, student and teacher's assistant.

11. The method of claim 9, wherein the plug-in manager and the authentication user interface are invoked using the user interface.

12. The method of claim 9, wherein the user interface is displayed by installing one or more files on a server.

13. A Non-transitory computer readable medium, which when executed on a computer performs a method for providing an extensible educational system having educational content, the method comprising:
    displaying a user interface;
    invoking a plug-in manager configured to install a file compatible with an application program interface (API),
    wherein the installed file utilizes the known API to add new functionality to the extensible education system by modifying the user interface, the new functionality invoked by the modified user interface to provide an additional ability to edit the educational content, and
    wherein the file specifies one or more roles of a user that can utilize the enhanced system functionality; and invoking an authentication user interface configured to verify a role of a user in the extensible educational system, and grant or deny the user access, based on the role of the user in the extensible educational system to use the additional ability provided by the new functionality to edit the educational content.

14. The computer readable medium of claim 13, wherein the role of a user comprises at least one of: user administrator, course administrator, system support, observer, support, portal administrator, system administrator, instructor, student and teacher's assistant.

15. The computer readable medium of claim 13, wherein the plug-in manager and the authentication user interface are invoked using the user interface.

16. The computer readable medium of claim 13, wherein the user interface is displayed by installing one or more files on a server.

* * * * *